(12) United States Patent
Mason

(10) Patent No.: US 11,234,409 B2
(45) Date of Patent: Feb. 1, 2022

(54) AGRICULTURAL STRUCTURE FOR HOUSING LIVESTOCK ON AN INCLINED FLOOR

(71) Applicant: Big Box Dairy LLC, Amarillo, TX (US)

(72) Inventor: Dean Mason, Amarillo, TX (US)

(73) Assignee: Big Box Dairy LLC, Amarillo, TX (US)

( * ) Notice: Subject to any disclaimer, the term of this patent is extended or adjusted under 35 U.S.C. 154(b) by 48 days.

(21) Appl. No.: 14/996,713

(22) Filed: Jan. 15, 2016

(65) Prior Publication Data

US 2016/0366849 A1     Dec. 22, 2016

Related U.S. Application Data

(60) Provisional application No. 62/242,187, filed on Oct. 15, 2015, provisional application No. 62/103,986, filed on Jan. 15, 2015.

(51) Int. Cl.
*A01K 1/00*     (2006.01)
*E04D 13/03*    (2006.01)
(Continued)

(52) U.S. Cl.
CPC ............... *A01K 1/0052* (2013.01); *A01J 7/00* (2013.01); *A01K 1/00* (2013.01); *A01K 1/0047* (2013.01);
(Continued)

(58) Field of Classification Search
CPC ...... A01K 1/00; A01K 1/0047; A01K 1/0052; A01K 1/0058; A01K 1/12; A01K 1/126;
(Continued)

(56) References Cited

U.S. PATENT DOCUMENTS 1,730,645 A     10/1929   Cory ............................ 414/267
1,981,418 A  *  11/1934   Kreutzer ................... E04H 5/08
                                                        119/436

(Continued)

FOREIGN PATENT DOCUMENTS

CN     203313839     12/2013
CN     103918562      7/2014
(Continued)

OTHER PUBLICATIONS

International Search Report and Written Opinion issued in PCT/US2016/013621, dated May 3, 2016.
(Continued)

*Primary Examiner* — Brady W Frazier
(74) *Attorney, Agent, or Firm* — Norton Rose Fulbright US LLP

(57) ABSTRACT

Agricultural structures for housing livestock and/or agricultural commodity, the structure having a floor that is inclined between first and second walls and a roof that is substantially parallel to the floor. In some aspects, the floor is configured such that a bottom of the first wall is vertically higher than a bottom of the second wall with the bottoms of the first and second walls being level with the underlying ground. In some aspects, a first portion of the floor adjacent to the first wall is at a first elevation, a second portion of the floor adjacent to the second wall is at a second elevation that is vertically lower than the first elevation, and a bottom of the first wall is at a third elevation that is equal to or lower than the first elevation.

20 Claims, 42 Drawing Sheets

(51) Int. Cl.
  *E04D 13/17* (2006.01)
  *A01K 1/12* (2006.01)
  *A01J 7/00* (2006.01)
  *B65G 67/04* (2006.01)

(52) U.S. Cl.
  CPC .............. *A01K 1/0058* (2013.01); *A01K 1/12* (2013.01); *A01K 1/126* (2013.01); *B65G 67/04* (2013.01); *E04D 13/0325* (2013.01); *E04D 13/17* (2013.01)

(58) Field of Classification Search
  CPC ........ A01J 7/00; B65G 67/04; E04D 13/0325; E04D 13/17; E04H 6/00; E04H 6/10
  USPC .......... 119/14.02; 52/169.1, 169.4, 174, 175, 52/234, 236.3, 236.4
  See application file for complete search history.

(56) References Cited

U.S. PATENT DOCUMENTS

| | | | | | |
|---|---|---|---|---|---|
| 2,358,000 | A | * | 9/1944 | Cornell | A01K 1/12 119/14.04 |
| 3,059,616 | A | * | 10/1962 | Cline | A01K 1/12 119/14.03 |
| 3,556,055 | A | * | 1/1971 | Wenger | A01K 1/00 119/436 |
| 3,699,922 | A | * | 10/1972 | Holm | A01K 1/12 119/14.03 |
| 4,355,568 | A | * | 10/1982 | Steckley | A01K 1/0047 454/237 |
| 4,986,469 | A | * | 1/1991 | Sutton, Jr. | A01K 1/0064 236/49.3 |
| 5,259,334 | A | * | 11/1993 | Peacock | A01K 1/12 119/14.03 |
| 5,177,913 | A | * | 12/1993 | Erel | A01K 1/0029 119/448 |
| 5,361,722 | A | * | 11/1994 | Tecza | A01J 5/044 119/14.03 |
| 5,666,905 | A | * | 9/1997 | Mackin | A01K 1/0047 119/448 |
| 5,960,738 | A | * | 10/1999 | Sanford | A01J 5/041 119/14.45 |
| 6,321,687 | B1 | * | 11/2001 | Lemmon | A01K 1/0047 119/448 |
| 6,779,484 | B2 | * | 8/2004 | Guo | A01K 1/12 119/14.03 |
| 6,854,424 | B2 | * | 2/2005 | Bauman | A01K 1/034 119/436 |
| 9,675,043 | B2 | * | 6/2017 | Eriksson | A01K 1/126 |
| 2003/0009955 | A1 | * | 1/2003 | Sellers | A01K 1/00 52/90.1 |
| 2003/0154925 | A1 | * | 8/2003 | Van Den Berg | A01J 5/003 119/14.02 |
| 2004/0011294 | A1 | * | 1/2004 | Guo | A01J 5/0175 119/14.02 |
| 2004/0011295 | A1 | | 1/2004 | Guo | |
| 2010/0064978 | A1 | | 3/2010 | Hoefling et al. | 119/436 |
| 2010/0116211 | A1 | | 5/2010 | Sundborger | 119/14.02 |
| 2010/0186319 | A1 | * | 7/2010 | Magee | B65G 69/008 52/173.2 |
| 2010/0300362 | A1 | * | 12/2010 | Danneker | A01J 5/0175 119/14.02 |
| 2011/0146582 | A1 | * | 6/2011 | Lemmon | A01K 1/0047 119/448 |
| 2011/0155066 | A1 | * | 6/2011 | Leyrit | A01K 1/12 119/14.03 |
| 2012/0055414 | A1 | * | 3/2012 | Correa | A01K 1/0029 119/448 |
| 2012/0097107 | A1 | * | 4/2012 | Torgerson | A01J 5/007 119/14.02 |
| 2013/0052935 | A1 | * | 2/2013 | Priest | A01K 1/0047 454/338 |
| 2014/0096719 | A1 | * | 4/2014 | Klocke | A01K 1/0047 119/448 |
| 2015/0342140 | A1 | * | 12/2015 | Obermuller | A01J 5/017 119/14.02 |
| 2016/0183493 | A1 | * | 6/2016 | Waybright | A01K 1/12 119/14.02 |
| 2016/0361849 | A1 | | 12/2016 | Gehring et al. | |

FOREIGN PATENT DOCUMENTS

| | | | |
|---|---|---|---|
| CN | 103999784 | | 8/2014 |
| CN | 203762019 | | 8/2014 |
| CN | 207400147 | | 5/2018 |
| DE | 2606973 A1 | * | 9/1976 ............... A01K 1/00 |

OTHER PUBLICATIONS

Office Action Issued in Corresponding Eurasian Patent Application No. 201791606, dated Oct. 17, 2019 (English translation provided).
Office Action issued in corresponding Chinese application No. 201680016165.5, dated Mar. 2, 2020. (English Translation).

* cited by examiner

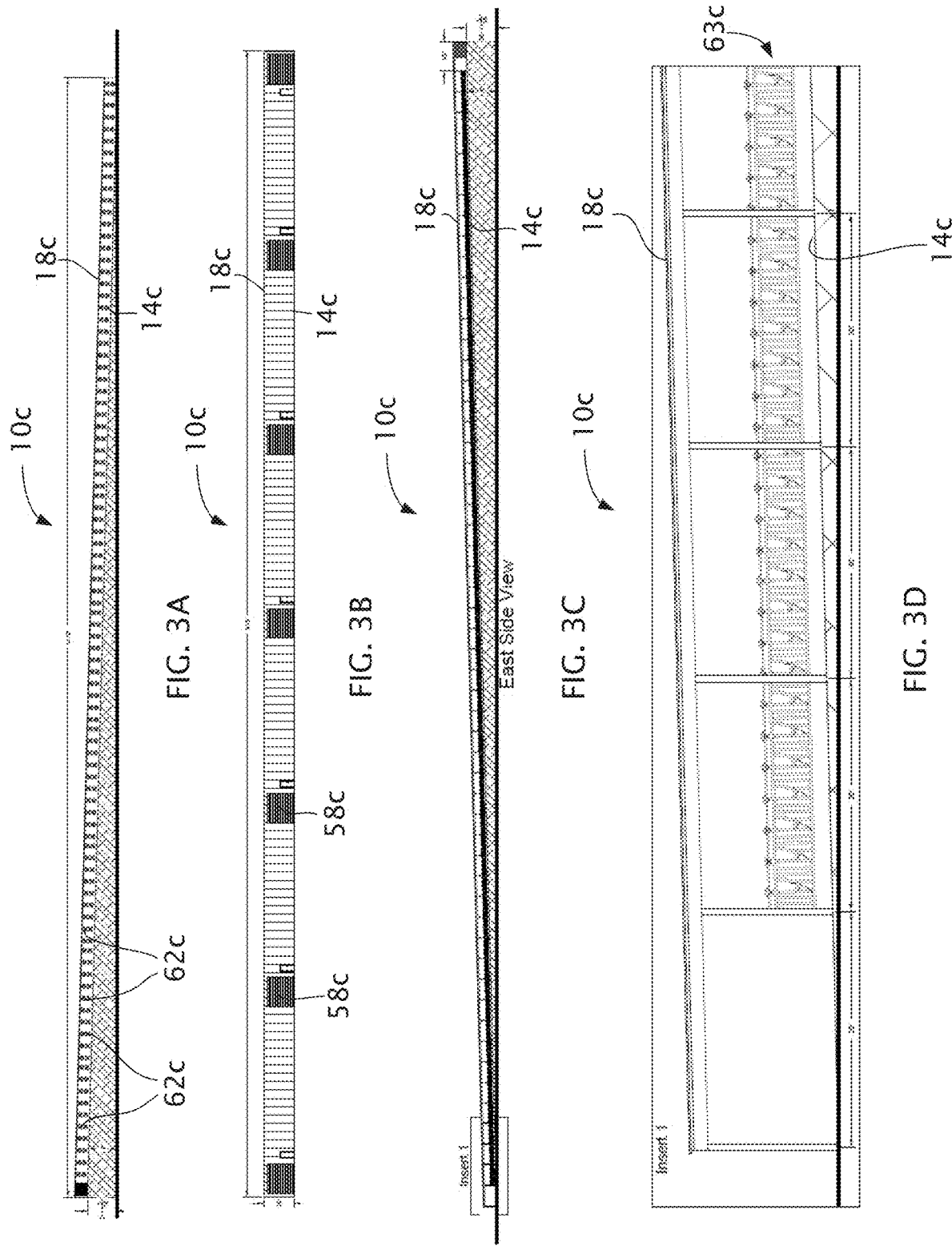

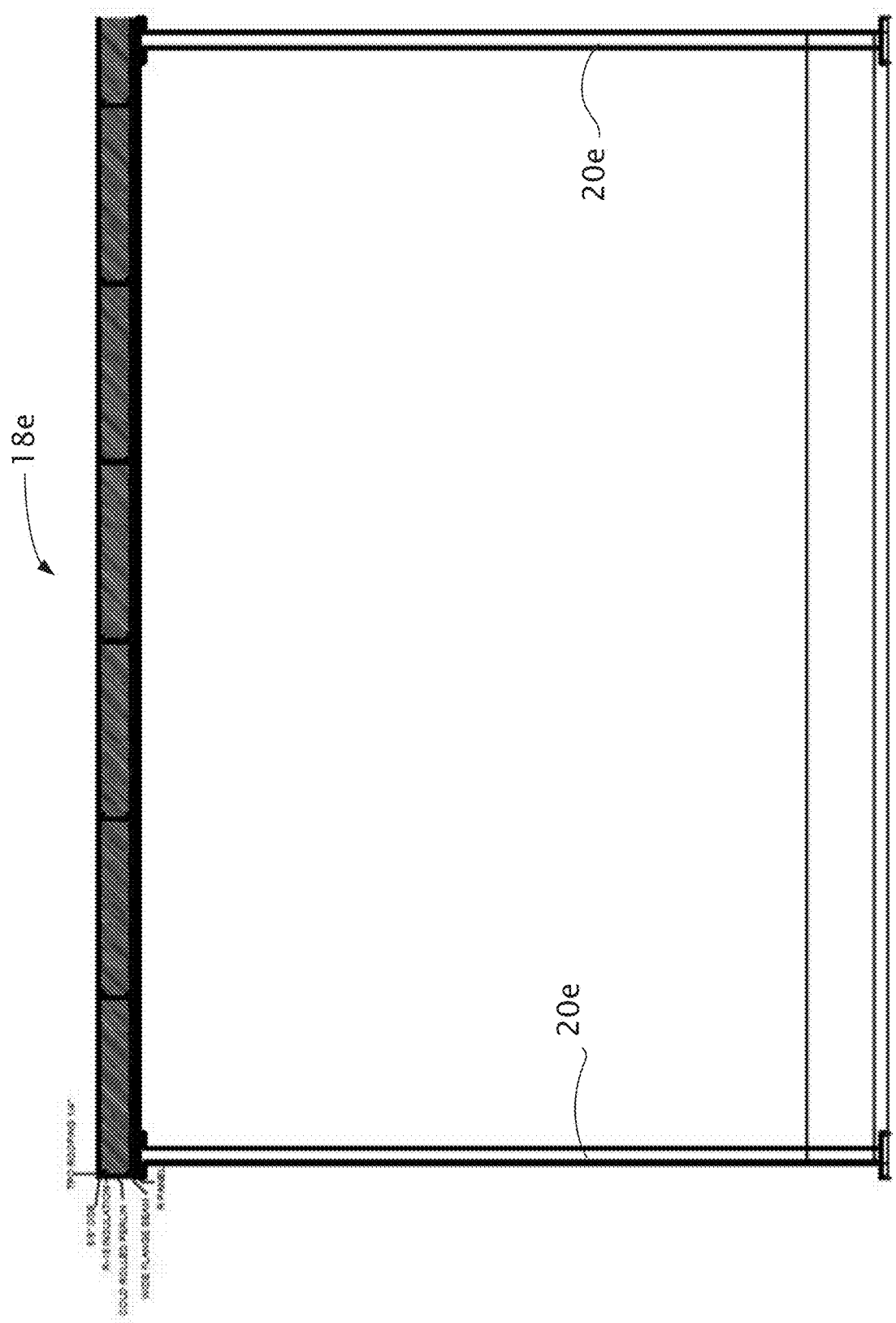

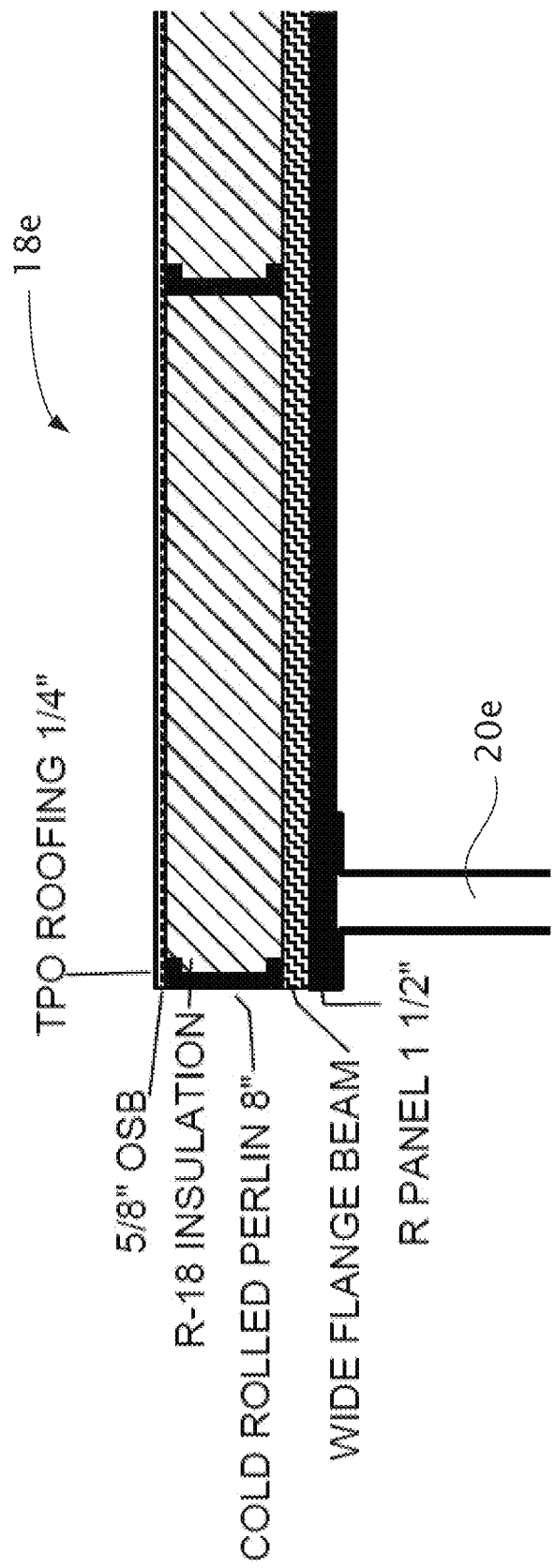

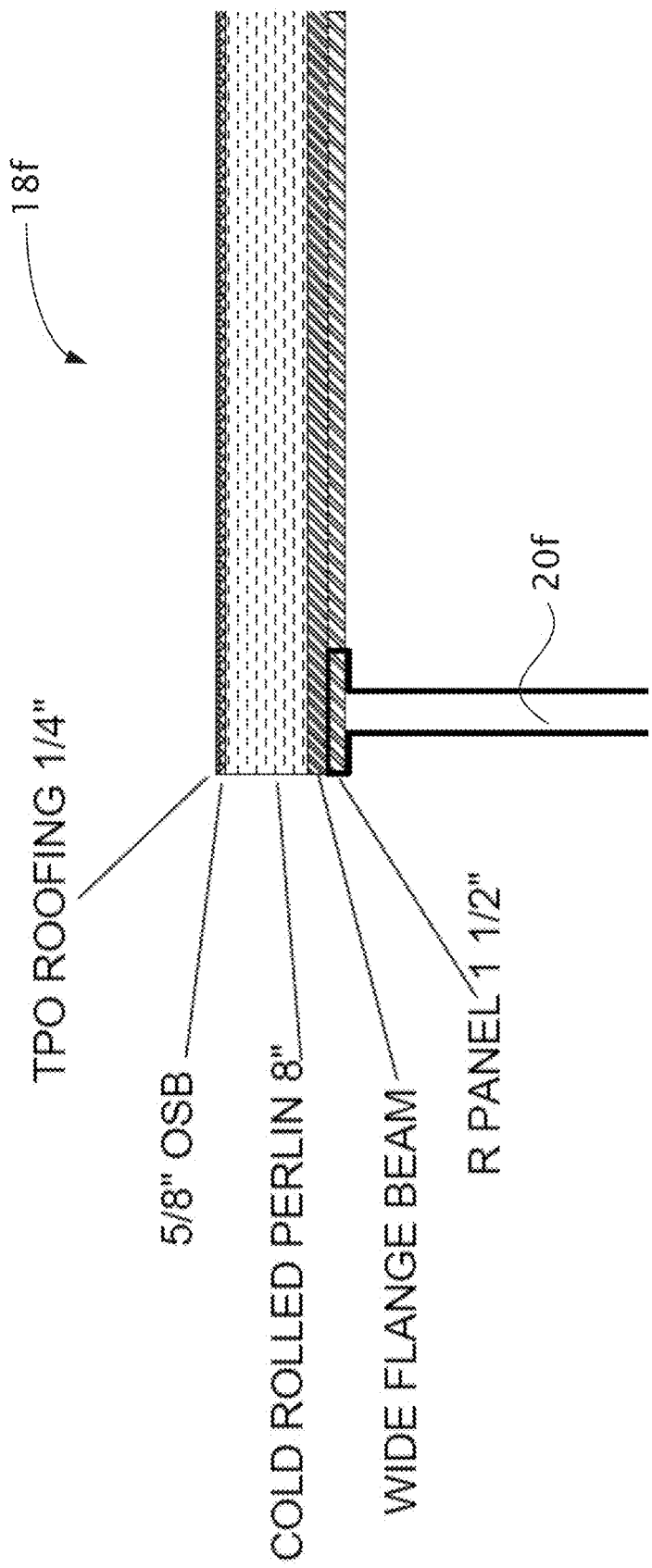

AGRICULTURAL STRUCTURE FOR HOUSING LIVESTOCK ON AN INCLINED FLOOR

CROSS-REFERENCE TO RELATED APPLICATIONS

This application claims priority to (1) U.S. Provisional Patent Application No. 62/103,986, filed Jan. 15, 2015, and (2) U.S. Provisional Patent Application No. 62/242,187, filed Oct. 15, 2015. These applications are incorporated by reference in their entireties.

BACKGROUND

1. Field of the Invention

The present invention relates generally to livestock structures and methods, such as those, for example, for accommodating and/or milking livestock.

2. Description of Related Art

Examples of livestock structures can be found, for example, at U.S. Pat. No. 4,986,469 and U.S. Patent Publication No. 2013/0052935.

SUMMARY

The structures of this disclosure, and features thereof, provide numerous efficiencies and advantages over preexisting structures. As will be described in detail below, the present structures can accommodate large numbers of livestock (e.g., cows, goats, sheep, hogs, poultry, camels, and the like) due to the size of the structures. For example, in some embodiments, one to 100,000 head of livestock, or more, can be accommodated and/or milked (if applicable) in the present structures. The unique features of the present structures enable large numbers of livestock to eat, drink, sleep, and, if applicable, be milked, while maintaining a desired temperature throughout the structure to provide the necessary comfort to the livestock. A desired temperature may vary based on season and/or geography; however, in some instances, structures can be maintained from 66 degrees Fahrenheit to 78 degrees Fahrenheit, and, more specifically, at approximately 72 degrees Fahrenheit.

For example, some embodiments of structures of the present disclosure include structures having a flat roof. In some embodiments, a flat roof includes a roof a majority of which is substantially parallel to the floor, which is at least in part distinguishable from a structure in which a majority of the roof is substantially non-parallel to the floor, such as with a gable roof. In some embodiments, a flat roof includes a roof where a majority of the roof occupies substantially the same plane (e.g., a majority of the roof is positioned at substantially the same angle). In some embodiments, a flat roof comprises a roof with a pitch from zero to 12:12 (e.g., measured in feet). The pitch of the roofs of the present structures can be selected based on topography, enabling the present structures to be located on previously unsuitable topography, and/or enabling the selection of a desired point for precipitation runoff and, in some cases, collection. Further, a flat roof configuration enables increased cooling efficiencies within the structure, for example, because less cubic feet of air are required to be removed from the structure to maintain a desired temperature, at least in part due to a decreased volume of air within the structure. A decreased volume of air inside the structure provides further efficiencies, such as by decreasing the required power to remove air from the structure to maintain a desired temperature. Such a flat roof configuration also decreases the surface area of a roof, which decreases the amount of materials, including insulation materials, that are required to construct the roof. Additionally, interior baffles, which can force air from a higher position in a structure to a lower position in a structure, are not required. An additional advantage of a flat roof configuration is that interior supporting structures, side walls, front walls, and back walls, top plates, base plates, and other related materials can comprise the same or similar dimensions, which decreases cost in purchasing materials in bulk that are substantially the same size. Due to similarities in dimensions and types of materials resulting from the present structures, the present structures can in some instances be viewed as a sum of a plurality of similar (or the same), smaller units (e.g., a unit can be represented by, for example, a cube surrounding one pen). In this way, the present structures can be more easily scalable, cost estimates for materials and/or overall construction can be more easily provided, and the structures can be more easily customizable for a desired purpose, which can vary based on number of livestock, a given environment, a given jurisdiction, etc. A flat roof can be positioned non-parallel to ground beneath the floor at any desired angle to, for example, permit precipitation (e.g., rain, snow, and the like) to drain from roof to one or more desired locations (e.g., a corner of the roof) to permit runoff or reuse of the precipitation. Additionally, a flat roof configuration permits the present structures to be built and enclosed prior to laying a majority of the internal concrete, which prevents seasonal issues and weather conditions from discouraging completion of the structures.

As another example, the present structures permit many activities on a farm to be located within a single structure. For example, livestock can be housed within the same structure as commodity that feeds the livestock, decreasing transportation time and related costs. Additionally, storing commodity (e.g., corn sillage) within the structure decreases loss of commodity due to exterior weather conditions. Further, livestock can be housed within the same structure as the milking parlors (or milking parlors can be accessible via the same structure), which similarly decreases time and related costs in transporting livestock long distances to the milking parlors and further prevents or eliminates exterior weather conditions from affecting livestock (which can lead to damaged teats, among other things) and people on the farm.

Furthermore, one or more basements located beneath the floor of the structures (e.g., underneath one or more milking parlors), which are described in detail in this disclosure, enable milk to be passed from the one or more milking parlors into one or more milk storage tanks and/or vehicles located in the basement, at least partially in the basement, or near the basement. Such a configuration decreases the power and the length of (and therefore required material for) transport lines (e.g., stainless steel lines, vacuum lines, etc.) required to pump milk to the one or more milk storage tanks and/or vehicles (e.g., in part due to the assistance of gravity). Furthermore, such a configuration reduces the total square footage of the structure (and related material costs) by permitting milk washing, cooling, filtration, vacuuming, purification, pumping, processing, and related equipment to be located within the structure in the basement. In some embodiments, a basement (or a portion thereof) can be a milk room, where milk wash, cooling, purification, filtration, and/or vacuum systems are located. Distinguishable from a milking parlor basement immediately below a milking parlor, but above a floor of a structure, the present basements are positioned beneath the floor of the structure.

As a further example, the present structures improve cooling efficiencies by, in some instances, providing an opening in the roof that permits air to enter the structure through the opening, while preventing fluid from entering the opening. Such an opening can be positioned in the roof near or above milking parlors and/or holding pens near milking parlors (e.g., where the concentration of livestock can be the greatest and, therefore, production of heat can be the greatest) to permit fresh, cool air to engage livestock in the milking parlors and/or holding pens near milking parlors. In some embodiments, the opening can be positioned in the roof near and/or above housing pens, which are configured to accommodate livestock such that the livestock can rest, sleep, eat, and/or drink (e.g., typically separate from a holding pen). The present structures can further comprise one or more fans positioned near the opening such that air from outside the structure is further encouraged to enter the structure. Such cooling of livestock can assist in improving conception rate among livestock and in increasing milk production. Temperature of the air entering the structure through the opening can be further regulated, for example, by positioning misters near the opening.

This disclosure includes structures comprising a floor, a roof, where a majority of the roof is substantially parallel to the floor; a first side comprising a first sidewall configured to support a portion of the roof; a second side comprising a second sidewall configured to support a portion of the roof; and a plurality of fans positioned on the first side of the structure such that, if the plurality of fans are activated, air is removed from the structure by the plurality of fans; where the structure is configured to accommodate livestock. In some embodiments, the plurality of fans are coupled to the first side wall. In some embodiments, the roof comprises an opening configured such that air can enter the structure through the roof and be removed from the structure by the plurality of fans. In some embodiments, the opening extends substantially parallel to the first side and the second side of the structure and a width of the opening ranges from 20 feet to 40 feet. Some embodiments further comprise a steeple coupled to the roof and configured to discourage fluid from entering the structure through the opening while permitting air to enter the structure through the opening. Some embodiments further comprise a plurality of fans positioned on the second side of the structure such that, if the plurality of fans are activated, air is removed from the structure by the plurality of fans. In some embodiments, the structure is configured to accommodate at least one milking parlor. Some embodiments further comprise a first milking parlor disposed within the structure. Some embodiments further comprise a first milking parlor disposed within the structure and positioned such that at least a portion of the first milking parlor is beneath at least a portion of the opening to permit air entering the structure through the opening to engage any livestock in the first milking parlor. In some embodiments, the first milking parlor is disposed between the first side and the second side of the structure. In some embodiments, the structure comprises a plurality of rows of housing pens and the first milking parlor is disposed between a first row of housing pens and a second row of housing pens. Some embodiments further comprise a milking parlor portion; where the first milking parlor is disposed in the milking parlor portion; and where the milking parlor portion is not configured to accommodate livestock housing pens. Some embodiments further comprise a second milking parlor disposed within the structure. Some embodiments further comprise a second milking parlor disposed within the structure and positioned such that at least a portion of the second milking parlor is beneath at least a portion of the opening to permit air entering the structure through the opening to engage any livestock in the second milking parlor. In some embodiments, the first milking parlor and the second milking parlor are disposed between the first side and the second side of the structure. In some embodiments, the structure comprises a plurality of rows of housing pens and the first milking parlor and the second milking parlor are disposed between a first row of housing pens and a second row of housing pens. Some embodiments further comprise a milking parlor portion; where the first milking parlor and the second milking parlor are disposed in the milking parlor portion; and where the milking parlor portion is not configured to accommodate livestock housing pens. Some embodiments further comprise a basement positioned beneath the floor of the structure and configured to be accessible by at least one vehicle such that milk from livestock in the first milking parlor can pass to the at least one vehicle if livestock are milked in the first milking parlor. In some embodiments, the basement is configured to accommodate at least a portion of at least one vehicle. Some embodiments further comprise a basement positioned beneath the floor of the structure and configured to be accessible by at least one vehicle such that milk from livestock in the first milking parlor and the second milking parlor can pass to the at least one vehicle if livestock are milked in the first milking parlor and the second milking parlor. In some embodiments, the basement is configured to accommodate at least a portion of at least one vehicle. In some embodiments, milk passes from the first milking parlor to the at least one vehicle without passing into a milk storage tank. In some embodiments, milk passes from the first milking parlor and passes from the second milking parlor to the at least one vehicle without passing into a milk storage tank. In some embodiments, milk passes from the first milking parlor to one or more milk storage tanks located in the basement. In some embodiments, milk passes from the first milking parlor and passes from the second milking parlor to one or more milk storage tanks located in the basement. In some embodiments, at least a portion of the first milking parlor is positioned above the basement. In some embodiments, at least a portion of the first milking parlor and at least a portion of the second milking parlor is positioned above the basement. Some embodiments further comprise a commodity basement positioned beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the structure is configured to accommodate at least 200 head of livestock. In some embodiments, the structure is configured to accommodate at least 1,000 head of livestock. In some embodiments, the structure is configured to accommodate at least 4,000 head of livestock. In some embodiments, the structure is configured to accommodate at least 8,000 head of livestock. In some embodiments, the structure is configured to accommodate at least 10,000 head of livestock. In some embodiments, the structure is configured to accommodate from 30,000 to 40,000 head of livestock. In some embodiments, the first milking parlor and the second milking parlor are herringbone parlors. In some embodiments, the first milking parlor and the second milking parlor are parallel parlors. In some embodiments, the first milking parlor and the second milking parlor are rotary parlors. In some embodiments, at least a portion of the floor is a natural surface. In some embodiments, at least a portion of the floor is dirt. In some embodiments, at least a portion of the floor comprises a man-made surface. In some embodiments, at least a portion of the floor comprises concrete.

Some embodiments of the present structures comprise a floor; a basement positioned beneath the floor of the structure and configured to be accessible by at least one vehicle such that milk from a milking parlor can pass to the at least one vehicle if livestock are milked in a milking parlor; a roof; a first side comprising a first sidewall configured to support a portion of the roof; a second side comprising a second sidewall configured to support a portion of the roof; and a plurality of fans positioned on the first side of the structure such that, if the plurality of fans are activated, air is removed from the structure by the plurality of fans; where the structure is configured to accommodate livestock. In some embodiments, the basement is configured to accommodate at least a portion of at least one vehicle. Some embodiments further comprise at least one milking parlor; where at least a portion of the at least one milking parlor is positioned above the basement. In some embodiments, milk passes from the milking parlor to the at least one vehicle without passing into a milk storage tank. In some embodiments, milk passes from the at least one milking parlor to one or more milk storage tanks located in the basement. In some embodiments, the plurality of fans are coupled to the first side wall. In some embodiments, the roof comprises an opening configured such that air can enter the structure through the roof and be removed from the structure by the plurality of fans. In some embodiments, the opening extends substantially parallel to the first side and the second side of the structure and a width of the opening ranges from 20 feet to 40 feet. Some embodiments further comprise a steeple coupled to the roof and configured to discourage fluid from entering the structure through the opening while permitting air to enter the structure through the opening. Some embodiments further comprise a plurality of fans positioned on the second side of the structure such that, if the plurality of fans are activated, air is removed from the structure by the plurality of fans. In some embodiments, the structure is configured to accommodate at least one milking parlor. Some embodiments further comprise a first milking parlor disposed within the structure. Some embodiments further comprise a first milking parlor disposed within the structure and positioned such that at least a portion of the first milking parlor is beneath at least a portion of the opening to permit air entering the structure through the opening to engage any livestock in the first milking parlor. In some embodiments, the first milking parlor is disposed between the first side and the second side of the structure. In some embodiments, the structure comprises a plurality of rows of housing pens and the first milking parlor is disposed between a first row of housing pens and a second row of housing pens. Some embodiments further comprise a milking parlor portion; where the first milking parlor is disposed in the milking parlor portion; and where the milking parlor portion is not configured to accommodate livestock housing pens. Some embodiments further comprise a second milking parlor disposed within the structure. Some embodiments further comprise a second milking parlor disposed within the structure and positioned such that at least a portion of the second milking parlor is beneath at least a portion of the opening to permit air entering the structure through the opening to engage any livestock in the second milking parlor. In some embodiments, the first milking parlor and the second milking parlor are disposed between the first side and the second side of the structure. In some embodiments, the structure comprises a plurality of rows of housing pens and the first milking parlor and the second milking parlor are disposed between a first row of housing pens and a second row of housing pens. Some embodiments comprise a milking parlor portion; where the first milking parlor and the second milking parlor are disposed in the milking parlor portion; and where the milking parlor portion is not configured to accommodate livestock housing pens. Some embodiments comprise a commodity basement positioned beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the structure is configured to accommodate at least 200 head of livestock. In some embodiments, the structure is configured to accommodate at least 1,000 head of livestock. In some embodiments, the structure is configured to accommodate at least 4,000 head of livestock. In some embodiments, the structure is configured to accommodate at least 8,000 head of livestock. In some embodiments, the structure is configured to accommodate at least 10,000 head of livestock. In some embodiments, the structure is configured to accommodate from 30,000 to 40,000 head of livestock. In some embodiments, the first milking parlor and the second milking parlor are herringbone parlors. In some embodiments, the first milking parlor and the second milking parlor are parallel parlors. In some embodiments, the first milking parlor and the second milking parlor are rotary parlors. In some embodiments, at least a portion of the floor is a natural surface. In some embodiments, at least a portion of the floor is dirt. In some embodiments, at least a portion of the floor comprises a man-made surface. In some embodiments, at least a portion of the floor comprises concrete. In some embodiments, a majority of the roof is substantially parallel to the floor.

Some embodiments of the present structures comprise a floor, a roof comprising an opening configured such that air can enter the structure through the roof; a first side comprising a first sidewall configured to support a portion of the roof; a second side comprising a second sidewall configured to support a portion of the roof; and a plurality of fans positioned on the first side of the structure such that, if the plurality of fans are activated, air is removed from the structure by the plurality of fans; where the structure is configured to accommodate livestock. In some embodiments, the opening extends substantially parallel to the first side and the second side of the structure and a width of the opening ranges from 20 feet to 40 feet. Some embodiments further comprise a steeple coupled to the roof and configured to discourage fluid from entering the structure through the opening while permitting air to enter the structure through the opening. Some embodiments further comprise at least one milking parlor; and a basement positioned beneath the floor of the structure and configured to be accessible by at least one vehicle such that milk from the at least one milking parlor can pass to the at least one vehicle if livestock are milked in the at least one milking parlor. In some embodiments, the basement is configured to accommodate at least a portion of at least one vehicle. In some embodiments, at least a portion of the at least one milking parlor is positioned above the basement. In some embodiments, milk passes from the at least one milking parlor to the at least one vehicle without passing into a milk storage tank. In some embodiments, milk passes from the at least one milking parlor to one or more milk storage tanks located in the basement. In some embodiments, the plurality of fans are coupled to the first side wall. Some embodiments further comprise a plurality of fans positioned on the second side of the structure such that, if the plurality of fans are activated, air is removed from the structure by the plurality of fans. In some embodiments, the structure is configured to accommodate at least one milking parlor. Some embodiments further comprise a first milking parlor disposed within the structure. Some embodiments further comprise a first milking parlor disposed within the structure and positioned such that at least a portion of the first milking parlor is beneath at least a portion of the opening to permit air entering the structure through the opening to engage any livestock in the first milking parlor. In some embodiments, the first milking parlor is disposed between the first side and the second side of the structure. In some embodiments, the structure comprises a plurality of rows of housing pens and the first milking parlor is disposed between a first row of housing pens and a second row of housing pens. Some embodiments further comprise a milking parlor portion; where the first milking parlor is disposed in the milking parlor portion; and where the milking parlor portion is not configured to accommodate livestock housing pens. Some embodiments further comprise a second milking parlor disposed within the structure. Some embodiments further comprise a second milking parlor disposed within the structure and positioned such that at least a portion of the second milking parlor is beneath at least a portion of the opening to permit air entering the structure through the opening to engage any livestock in the second milking parlor. In some embodiments, the first milking parlor and the second milking parlor are disposed between the first side and the second side of the structure. In some embodiments, the structure comprises a plurality of rows of housing pens and the first milking parlor and the second milking parlor are disposed between a first row of housing pens and a second row of housing pens. Some embodiments further comprise a milking parlor portion; where the first milking parlor and the second milking parlor are disposed in the milking parlor portion; and where the milking parlor portion is not configured to accommodate livestock housing pens. Some embodiments further comprise a commodity basement positioned beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the structure is configured to accommodate at least 200 head of livestock. In some embodiments, the structure is configured to accommodate at least 1,000 head of livestock. In some embodiments, the structure is configured to accommodate at least 4,000 head of livestock. In some embodiments, the structure is configured to accommodate at least 8,000 head of livestock. In some embodiments, the structure is configured to accommodate at least 10,000 head of livestock. In some embodiments, the structure is configured to accommodate from 30,000 to 40,000 head of livestock. In some embodiments, the milking parlor is a herringbone parlor. In some embodiments, the milking parlor is a parallel parlor. In some embodiments, the milking parlor is a rotary parlor. In some embodiments, at least a portion of the floor is a natural surface. In some embodiments, at least a portion of the floor is dirt. In some embodiments, at least a portion of the floor comprises a man-made surface. In some embodiments, at least a portion of the floor comprises concrete. In some embodiments, a majority of the roof is substantially parallel to the floor.

This disclosure also includes methods comprising milking livestock in a milking parlor disposed in a structure; cooling milk from the livestock; positioning a vehicle at least partially in a basement beneath a floor of the structure; and at least one of: permitting gravity to assist in enabling milk to be passed from the milking parlor to the vehicle or a milk storage tank; and pumping milk from the milking parlor to the vehicle or a milk storage tank. Some embodiments further comprise removing air from the structure with a plurality of fans. Some embodiments further comprise permitting air to enter the structure through an opening in a roof of the structure. In some embodiments, the milking parlor is positioned such that the method further comprises: permitting air entering the structure through the opening to engage livestock in the milking parlor. Some embodiments further comprise positioning a vehicle at least partially above a commodity basement beneath the floor of the structure; and disposing commodity in the commodity basement. Some embodiments further comprise positioning livestock in a structure in a milking parlor or in holding pens near a milking parlor within the structure; permitting air entering the structure through an opening in a roof to engage livestock in the milking parlor or in the holding pens.

Some embodiments of the present structures comprise a floor, a flat roof; a first side comprising a first sidewall configured to support a portion of the flat roof; and a second side comprising a second sidewall configured to support a portion of the flat roof; where the structure is configured to accommodate livestock. In some embodiments, the flat roof comprises a pitch from zero to 12:12. In some embodiments, the flat roof is substantially parallel to the floor. In some embodiments, the flat roof is substantially non-parallel to ground beneath the floor. In some embodiments, a majority of the flat roof occupies substantially the same plane. Some embodiments further comprise a plurality of fans positioned on the first side of the structure such that, if the plurality of fans are activated, air is removed from the structure by the plurality of fans. In some embodiments, the plurality of fans are coupled to the first side wall. In some embodiments, the flat roof comprises an opening configured such that air can enter the structure through the flat roof and be removed from the structure by the plurality of fans. In some embodiments, the opening extends substantially parallel to the first side and the second side of the structure and a width of the opening ranges from 20 feet to 40 feet. Some embodiments further comprise a steeple coupled to the flat roof and configured to discourage fluid from entering the structure through the opening while permitting air to enter the structure through the opening. Some embodiments further comprise a plurality of fans positioned on the second side of the structure such that, if the plurality of fans are activated, air is removed from the structure by the plurality of fans. In some embodiments, the structure is configured to accommodate at least one milking parlor. Some embodiments further comprise a first milking parlor disposed within the structure. Some embodiments further comprise a first milking parlor disposed within the structure and positioned such that at least a portion of the first milking parlor is beneath at least a portion of the opening to permit air entering the structure through the opening to engage any livestock in the first milking parlor. In some embodiments, the first milking parlor is disposed between the first side and the second side of the structure. In some embodiments, the structure comprises a plurality of rows of housing pens and the first milking parlor is disposed between a first row of housing pens and a second row of housing pens. Some embodiments further comprise a milking parlor portion; where the first milking parlor is disposed in the milking parlor portion; and where the milking parlor portion is not configured to accommodate livestock housing pens. Some embodiments further comprise a second milking parlor disposed within the structure. Some embodiments further comprise a second milking parlor disposed within the structure and positioned such that at least a portion of the second milking parlor is beneath at least a portion of the opening to permit air entering the structure through the opening to engage any livestock in the second milking parlor. In some embodiments, the first milking parlor and the second milking parlor are disposed between the first side and the second side of the structure. In some embodiments, the structure comprises a plurality of rows of housing pens and the first milking parlor and the second milking parlor are disposed between a first row of housing pens and a second row of housing pens. Some embodiments further comprise a milking parlor portion; where the first milking parlor and the second milking parlor are disposed in the milking parlor portion; and where the milking parlor portion is not configured to accommodate livestock housing pens. Some embodiments further comprise a basement positioned beneath the floor of the structure and configured to be accessible by at least one vehicle such that milk from livestock in the first milking parlor can pass to the at least one vehicle if livestock are milked in the first milking parlor. In some embodiments, the basement is configured to accommodate at least a portion of at least one vehicle. Some embodiments further comprise a basement positioned beneath the floor of the structure and configured to be accessible by at least one vehicle such that milk from livestock in the first milking parlor and the second milking parlor can pass to the at least one vehicle if livestock are milked in the first milking parlor and the second milking parlor. In some embodiments, the basement is configured to accommodate at least a portion of at least one vehicle. In some embodiments, milk passes from the first milking parlor to the at least one vehicle without passing into a milk storage tank. In some embodiments, milk passes from the first milking parlor and passes from the second milking parlor to the at least one vehicle without passing into a milk storage tank. In some embodiments, milk passes from the first milking parlor to one or more milk storage tanks located in the basement. In some embodiments, milk passes from the first milking parlor and passes from the second milking parlor to one or more milk storage tanks located in the basement. In some embodiments, at least a portion of the first milking parlor is positioned above the basement. In some embodiments, at least a portion of the first milking parlor and at least a portion of the second milking parlor is positioned above the basement. Some embodiments further comprise a commodity basement positioned beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the structure is configured to accommodate at least 200 head of livestock. In some embodiments, the structure is configured to accommodate at least 1,000 head of livestock. In some embodiments, the structure is configured to accommodate at least 4,000 head of livestock. In some embodiments, the structure is configured to accommodate at least 8,000 head of livestock. In some embodiments, the structure is configured to accommodate at least 10,000 head of livestock. In some embodiments, the structure is configured to accommodate from 30,000 to 40,000 head of livestock. In some embodiments, the first milking parlor and the second milking parlor are herringbone parlors. In some embodiments, the first milking parlor and the second milking parlor are parallel parlors. In some embodiments, the first milking parlor and the second milking parlor are rotary parlors. In some embodiments, at least a portion of the floor is a natural surface. In some embodiments, at least a portion of the floor is dirt. In some embodiments, at least a portion of the floor comprises a man-made surface. In some embodiments, at least a portion of the floor comprises concrete.

Some embodiments of the present structures comprise a floor; a milking parlor portion configured to accommodate a milking parlor; a roof, at least a portion of which is a flat roof; a first side comprising a first sidewall configured to support a portion of the roof; and a second side comprising a second sidewall configured to support a portion of the roof; where the structure is configured to accommodate livestock; and where a portion of the structure, including the floor and the milking parlor portion, existed prior to installation of the first sidewall, the second sidewall, and the portion of the roof that is a flat roof. In some embodiments, the structures further comprise a plurality of fans positioned on the first side of the structure such that, if the plurality of fans are activated, air is removed from the structure by the plurality of fans; and an opening in the roof configured such that air can enter the structure through the roof and be removed from the structure by the plurality of fans. In some embodiments, the structures further comprise at least one milking parlor disposed within the structure and positioned such that at least a portion of the at least one milking parlor is beneath at least a portion of the opening to permit air entering the structure through the opening to engage any livestock in the at least one milking parlor. In some embodiments, portion of the structure, including the floor and the milking parlor portion, existed prior to installation of the opening. In some embodiments, a portion of the structure, including the floor and the milking parlor portion, existed prior to installation of the plurality of fans. In some embodiments, the structures further comprise a steeple coupled to the roof and configured to discourage fluid from entering the structure through the opening while permitting air to enter the structure through the opening. In some embodiments, the opening extends substantially parallel to the first side and the second side of the structure, and a width of the opening ranges from 20 feet to 40 feet. In some embodiments, the at least one milking parlor is disposed between the first side and the second side of the structure. In some embodiments, the structures further comprise a basement positioned beneath the floor of the structure and configured to be accessible by at least one vehicle such that milk from livestock in the at least one milking parlor can pass to the at least one vehicle if livestock are milked in the at least one milking parlor. In some embodiments, the basement is configured to accommodate at least a portion of at least one vehicle. In some embodiments, the structures further comprise a commodity basement positioned beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the structure is configured to accommodate at least 200 head of livestock. In some embodiments, the structure is configured to accommodate at least 8,000 head of livestock. In some embodiments, the structure is configured to accommodate from 30,000 to 40,000 head of livestock. In some embodiments, at least a portion of the floor is a natural surface. In some embodiments, at least a portion of the floor comprises a man-made surface.

Some embodiments of the present methods, where an existing structure comprises a floor and a milking parlor portion configured to accommodate a milking parlor, and where the structure is configured to accommodate livestock, comprise: installing roofing material such that at least a portion of the roof of the structure is a flat roof. In some embodiments, where prior to installing roofing material such that at least a portion of the roof of the structure is a flat roof, the methods comprise: installing a first side comprising a first sidewall configured to support a portion of the roof; and installing a second side comprising a second sidewall configured to support a portion of the roof. In some embodiments, the methods comprise installing a plurality of fans positioned on the first side of the structure such that, if the plurality of fans are activated, air is removed from the structure by the plurality of fans; and installing an opening in the roof configured such that air can enter the structure through the roof and be removed from the structure by the plurality of fans. In some embodiments, the methods comprise positioning at least one milking parlor within the structure such that at least a portion of the at least one milking parlor is beneath at least a portion of the opening to permit air entering the structure through the opening to engage any livestock in the at least one milking parlor. In some embodiments, the methods comprise installing a steeple such that the steeple is coupled to the roof and configured to discourage fluid from entering the structure through the opening while permitting air to enter the structure through the opening. In some embodiments, the opening is installed substantially parallel to the first side and the second side of the structure, and the opening comprises a width of 20 feet to 40 feet. In some embodiments, the at least one milking parlor is positioned between the first side and the second side of the structure. In some embodiments, the methods comprise installing a basement beneath the floor of the structure and configured to be accessible by at least one vehicle such that milk from livestock in the at least one milking parlor can pass to the at least one vehicle if livestock are milked in the at least one milking parlor. In some embodiments, the basement is configured to accommodate at least a portion of at least one vehicle. In some embodiments, the methods comprise installing a commodity basement beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the methods comprise modifying or supplementing the structure such that the structure is configured to accommodate at least 200 head of livestock. In some embodiments, the methods comprise modifying or supplementing the structure such that the structure is configured to accommodate at least 4,000 head of livestock. In some embodiments, the methods comprise modifying or supplementing the structure such that the structure is configured to accommodate at least 8,000 head of livestock. In some embodiments, the methods comprise modifying or supplementing the structure such that the structure is configured to accommodate at least 10,000 head of livestock. In some embodiments, the methods comprise modifying or supplementing the structure such that the structure is configured to accommodate between 30,000 and 40,000 head of livestock. In some embodiments, at least a portion of the floor is a natural surface. In some embodiments, the methods comprise at least a portion of the floor comprises a man-made surface.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a system, or a component of a system that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present systems and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. At least some of the figures depict graphical symbols or representations that will be described in the specification and/or understood by those of ordinary skill in the art. The figures are drawn to scale.

FIGS. 3A-3F depict various views of portions of another embodiment of the present structures.

FIGS. 5A-5B depict one embodiment of a portion of a roof that can be used with the present structures.

FIGS. 6A-6B depict another embodiment of a portion of a roof that can be used with the present structures.

DESCRIPTION OF ILLUSTRATIVE EMBODIMENTS

Figure 1A:
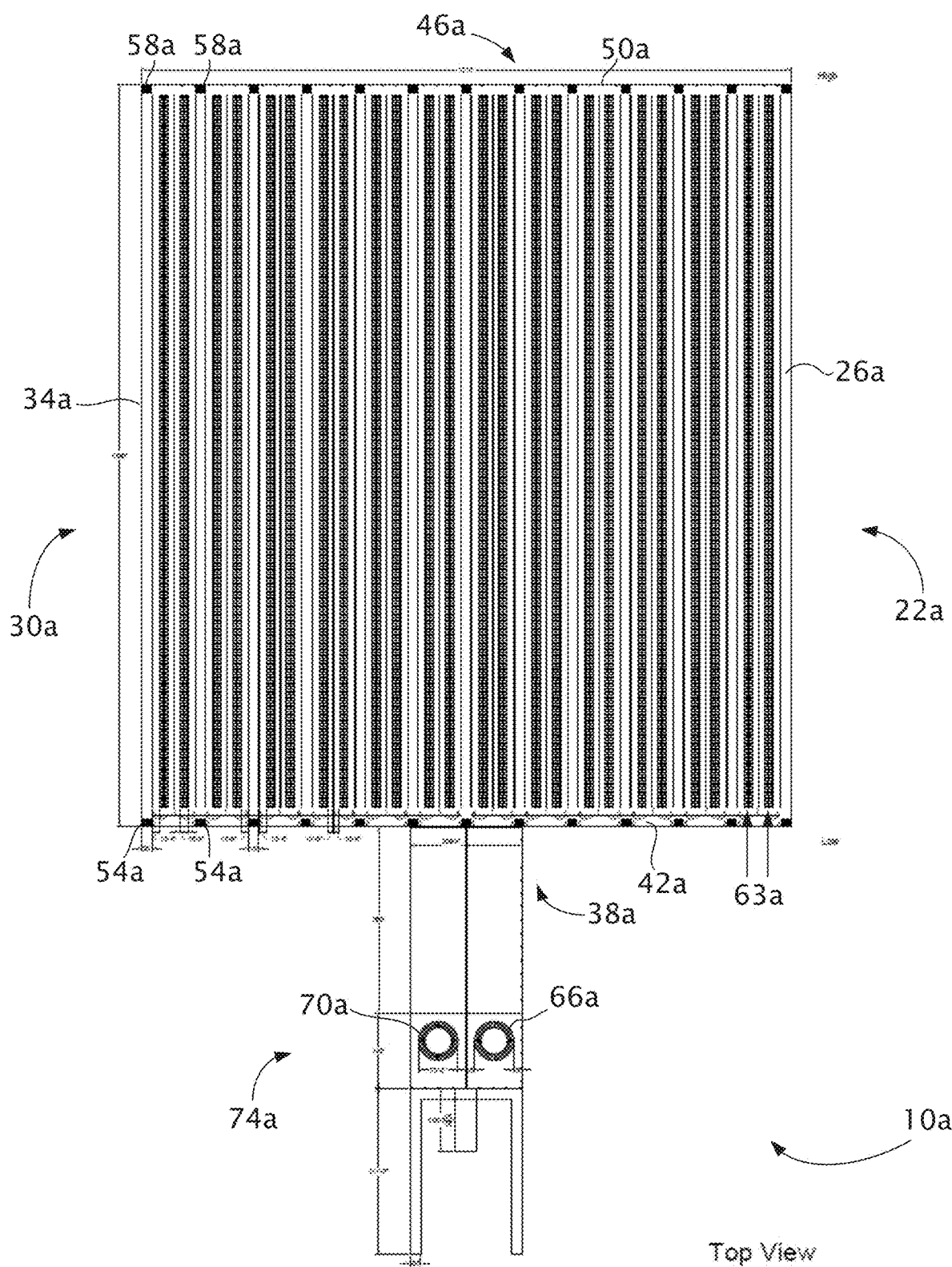
FIG. 1A depicts one embodiment of the present structures in which milking parlors are disposed in a milking parlor portion of the structure.
Figure 1B:
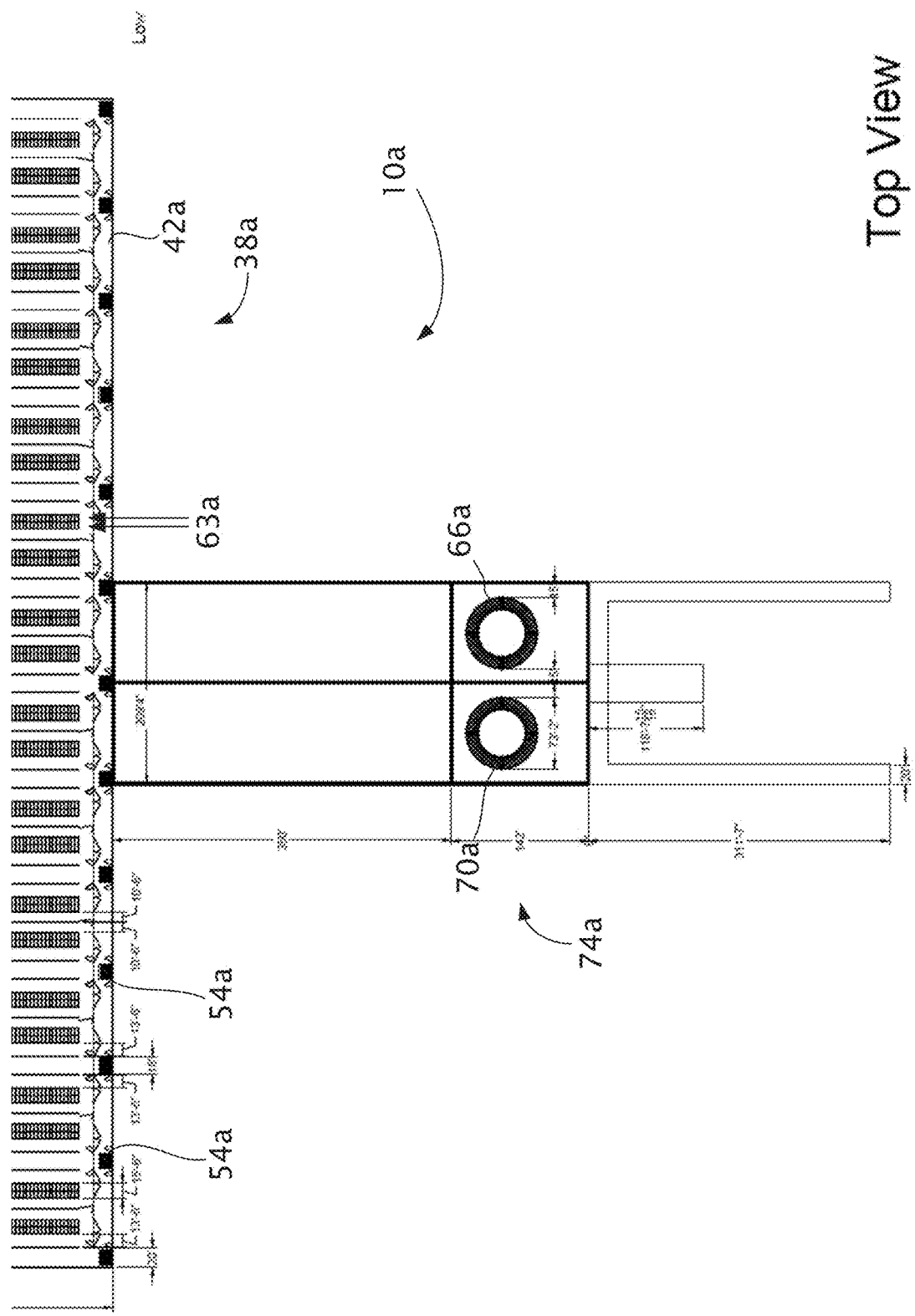
FIGS. 1B-1D depict magnified views of portions of the structure of FIG. 1A.
Figure 1C:
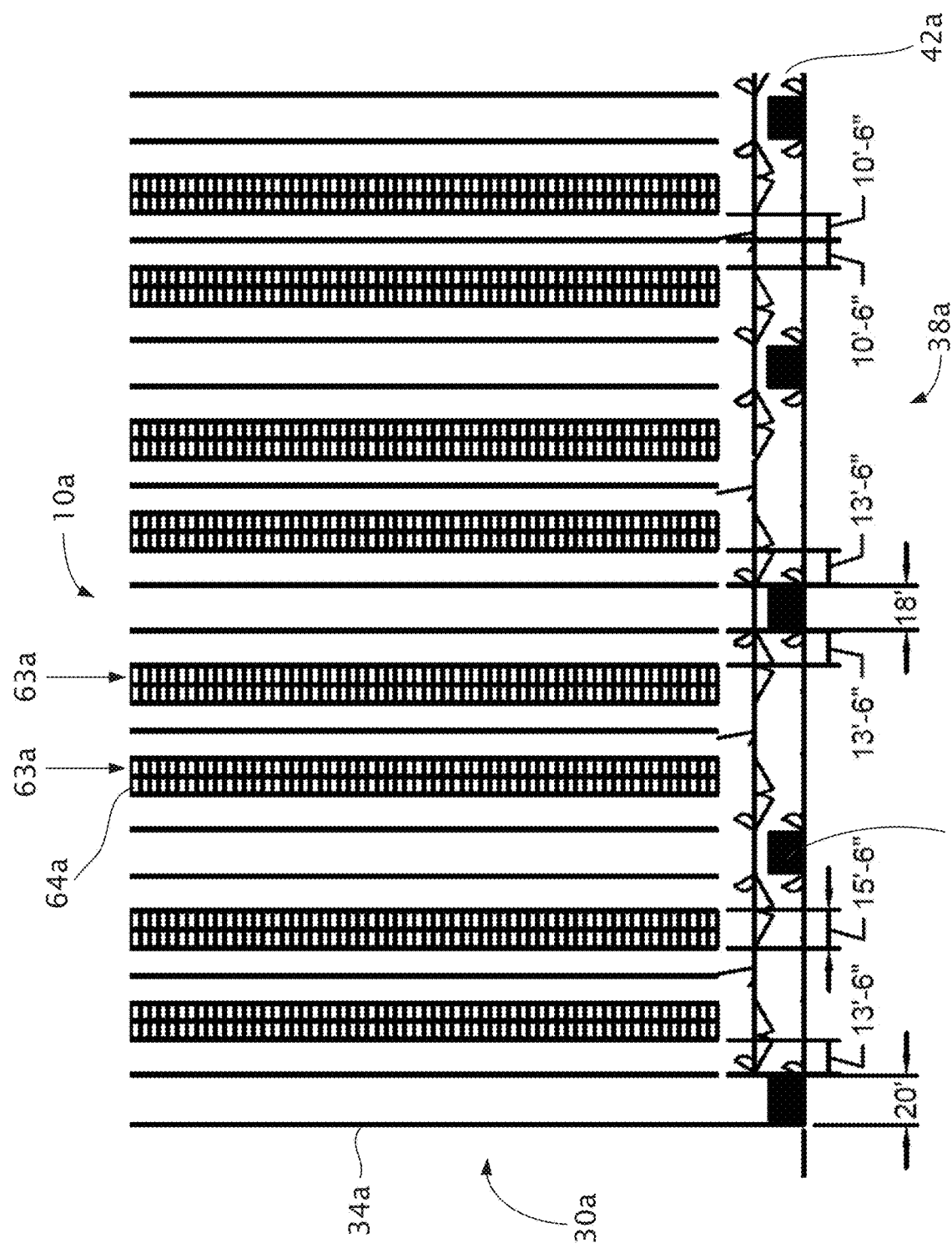
Figure 1D:
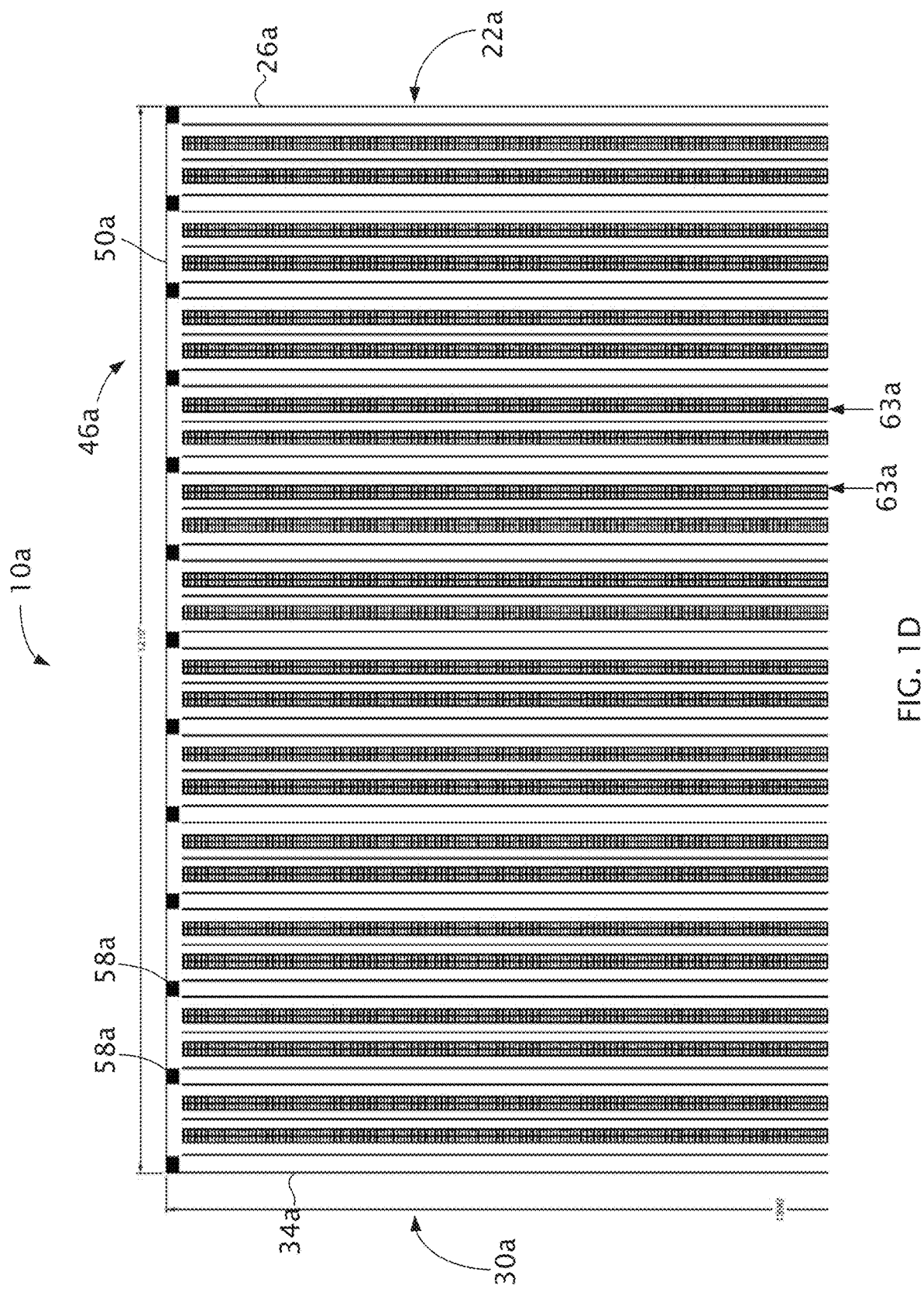

The present structures can be constructed independently or in connection with designs of existing structures. Further, at least some existing structures can be modified or supplemented to comprise one or more features of the structures described in this disclosure.

An "open lot" structure generally includes one or more housing and/or holding pens for livestock, a fence, a feed manger, and water troughs. In some environments, such as cold or windy climates, an open lot can include partitions (e.g., windbreaks or curtains) to provide protection for livestock. In other environments, such as hot climates, an open lot can include a covering (e.g., steel shades) to provide protection from heat for the livestock. Some open lots may include both windbreaks and shading structures.

A "Saudi-style barn" can include any of the features of an open lot and additionally includes a covering over a portion of the holding pen, for example, approximately one quarter of the housing and/or holding pen to cover the feed manger and water troughs to provide protection for livestock from the heat. For example, the covering traditionally includes a steel structure with a gable or double-sloped roof to allow heat to rise to an open ridge and/or center of the structure to escape. Saudi-style barns can include fans and/or misters (e.g., including high pressure mist introduced in front of the fans that blow from the roof toward livestock within the structure), such as over the feed manger and/or water troughs.

A "free-stall barn," which can include housing, holding, and/or exercise pens, can provide covering over the full area in which livestock sleeps, eats, and drinks, such as over the feed manger and water troughs. Free-stall barns can include individual stalls for livestock that have sand, manure compost, and/or mattresses. Individual stalls can be divided by free-stall loops (e.g., metal loops separated by approximately 4 feet). In some embodiments, free-stall barns do not include sidewalls, which permits natural air to move through the barn to cool livestock. In such an embodiment, free-stall barns can include partitions (e.g., windbreaks or curtains) that can be lowered along the side to protect livestock in the barn from undesirable weather, such as rain, cold, wind, or heat. In other embodiments, free-stall barns can include sidewalls, and fans can be coupled at one end of the structure, such that the fans can be activated to remove air from the structure, thus drawing air through the structure to engage and cool livestock. In some embodiments, the fans are coupled to the sidewalls such that air is drawn through the structure from sidewall to sidewall. In some embodiments, free-stall barns can include misters (e.g., high pressure misters). Free-stall barns can comprise a concrete floor, and natural ground or dirt for individual stalls.

The structures of the present disclosure can further include various types of milking parlors or combinations of types of milking parlors in order to milk livestock within the structure. For example, the present structures and methods can include herringbone milking parlors. Herringbone milking parlors typically include from zero to 40 head of livestock on each side of its two sides (e.g., one to 80 total head of livestock), but in some embodiments, can include more. Livestock enter herringbone parlors and stand at an angle with respect to the parlor (e.g., 30 degrees) during milking. Parallel milking parlors typically include from zero to 60 head of livestock on each of its two sides (e.g., one to 120 total head of livestock), but in some embodiments, can include more. Livestock enter parallel parlors and stand parallel to one another during milking. A rotary milking parlor is a substantially circular parlor that typically can accommodate from zero to 120 head of livestock, but in some embodiments, can include more. A rotary parlor rotates at a predetermined, adjustable speed. Livestock can enter a rotary parlor for milking, and once the rotary parlor has rotated approximately 360 degrees, the livestock can exit the rotary parlor. Any milking parlor of the present disclosure can be manual or robotic (e.g., such that milking systems are applied to livestock teats robotically).

The structures of the present disclosure can further include misters/misting systems that can introduce mist into the structure (e.g., in front of a fan) to further cool air within the structure. Misters/misting systems can include high pressure misters that provide a fine mist, which permits air to be cooled without, for example, saturating the ground and/or livestock bedding materials.

Figure 1E:
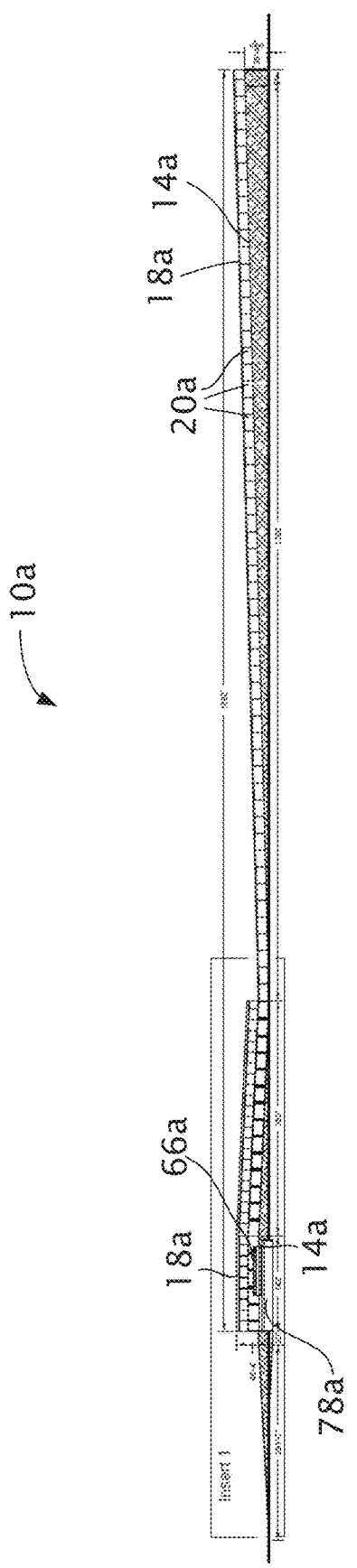
FIGS. 1E-1F depict a side view of portions of the structure of FIG. 1A.
Figure 6A:
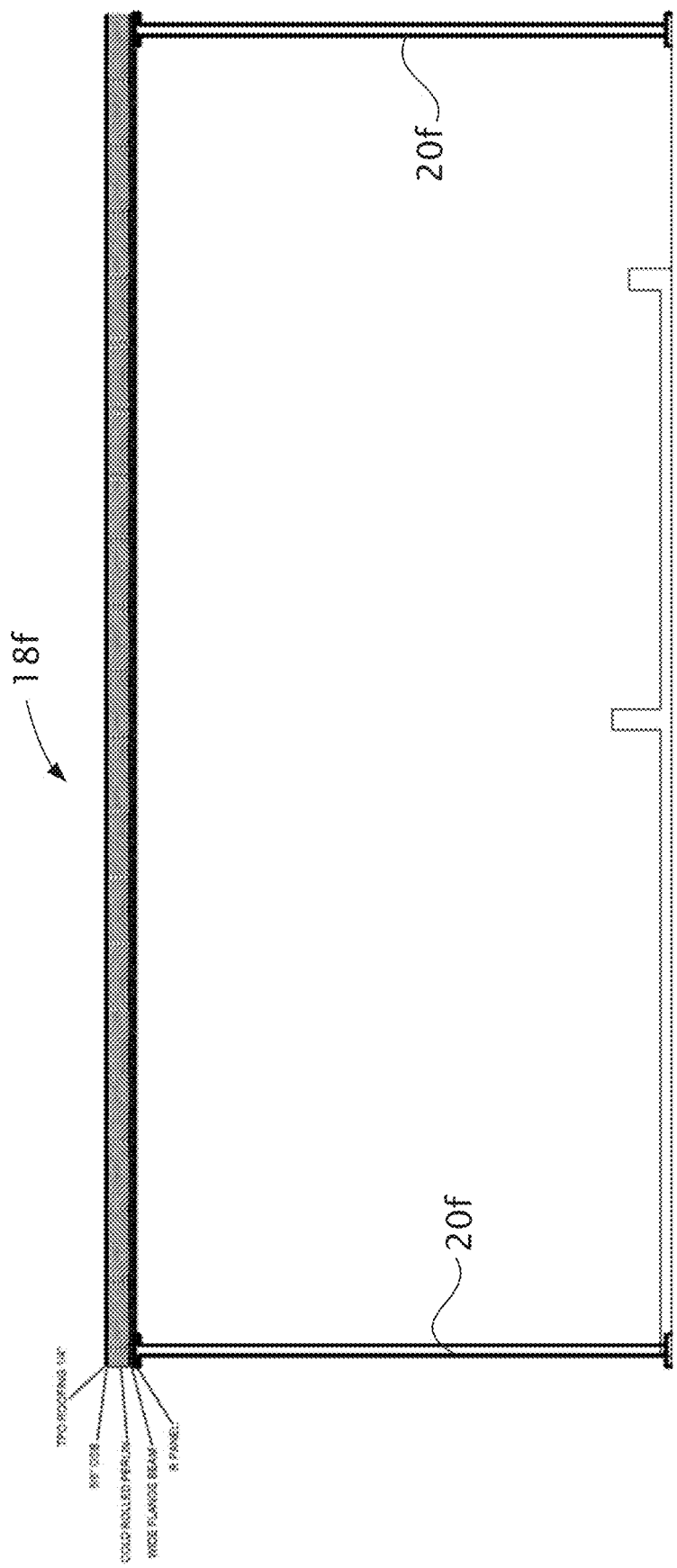
Figure 7A:
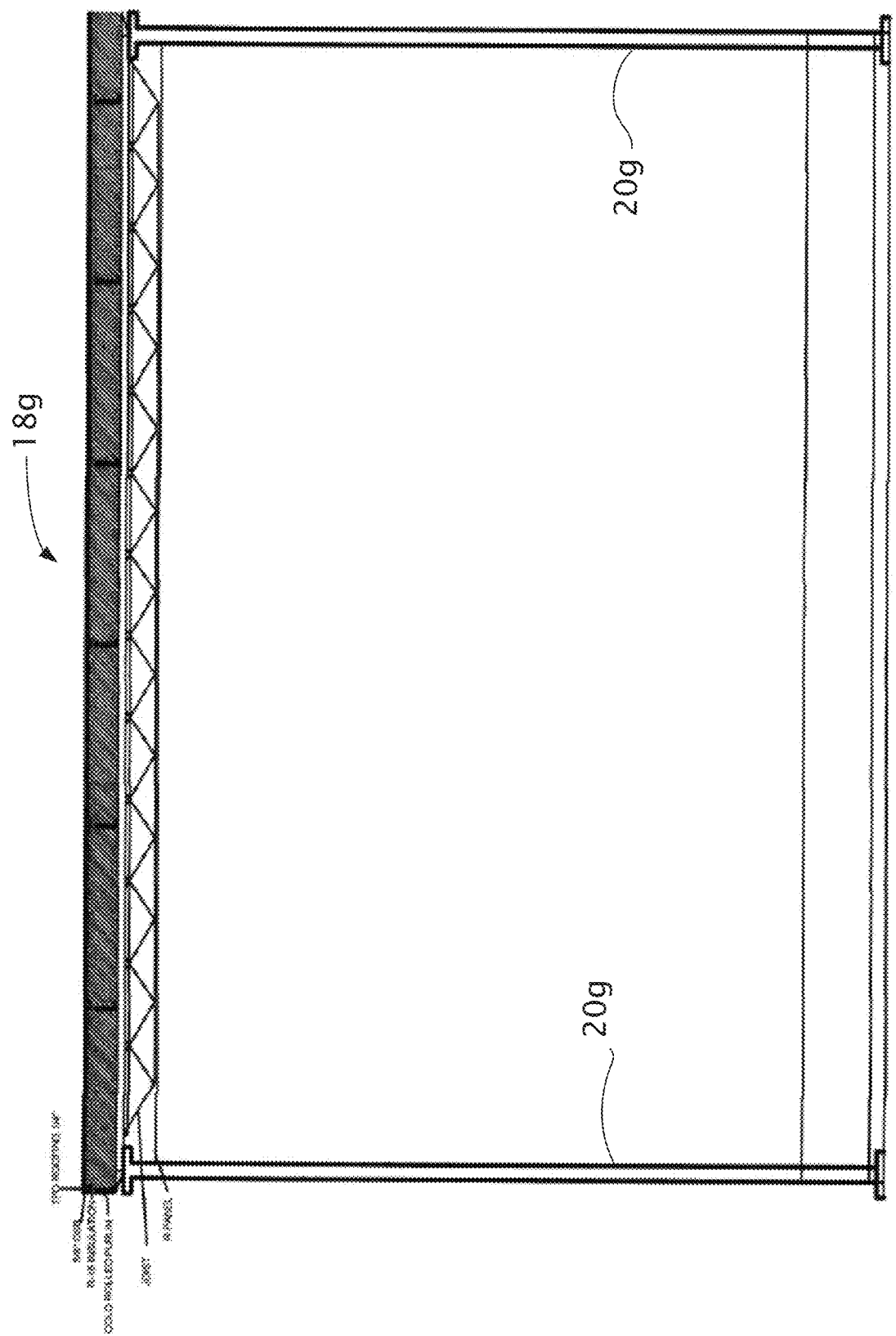
FIGS. 7A-7D depict various views of another embodiment of a portion of a roof that can be used with the present structures.
Figure 7B:
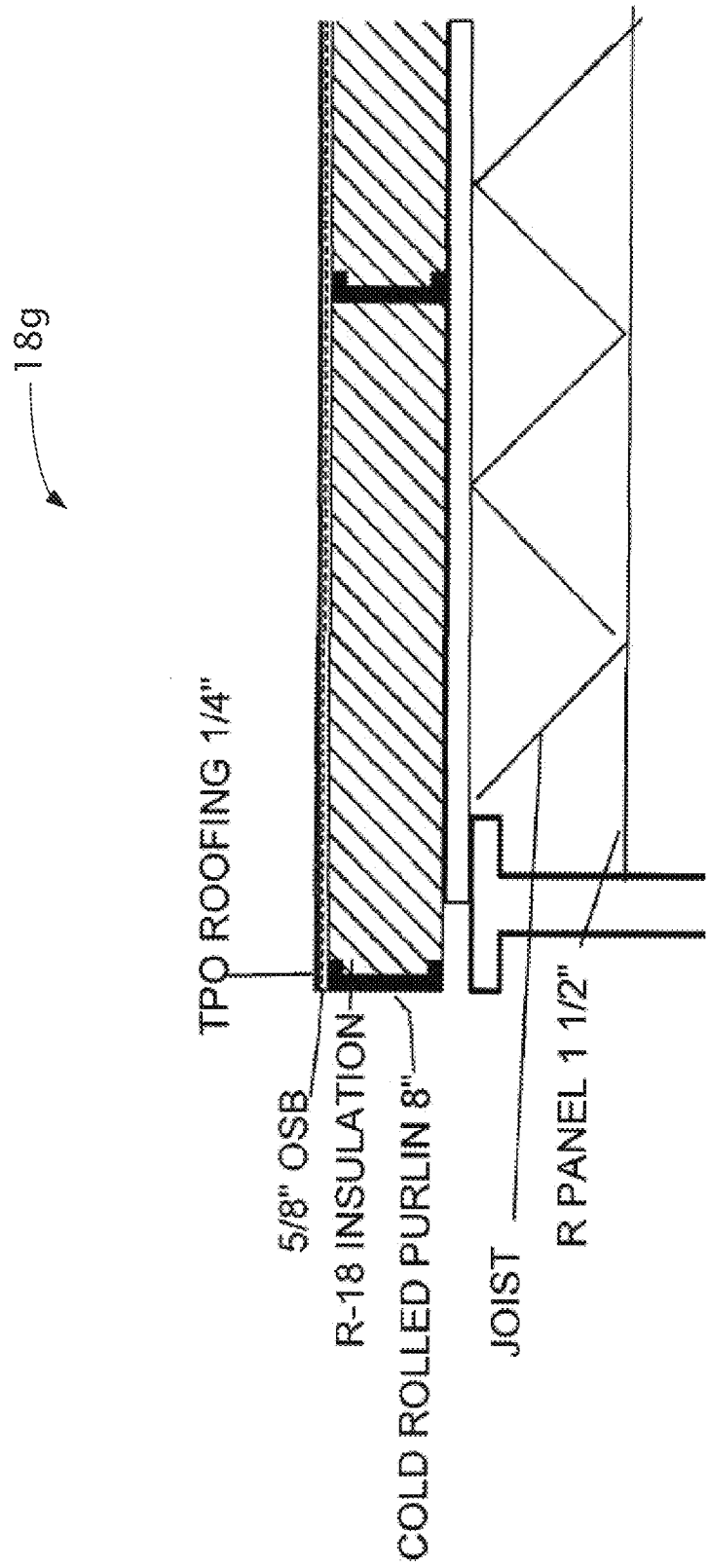
Figure 7C:
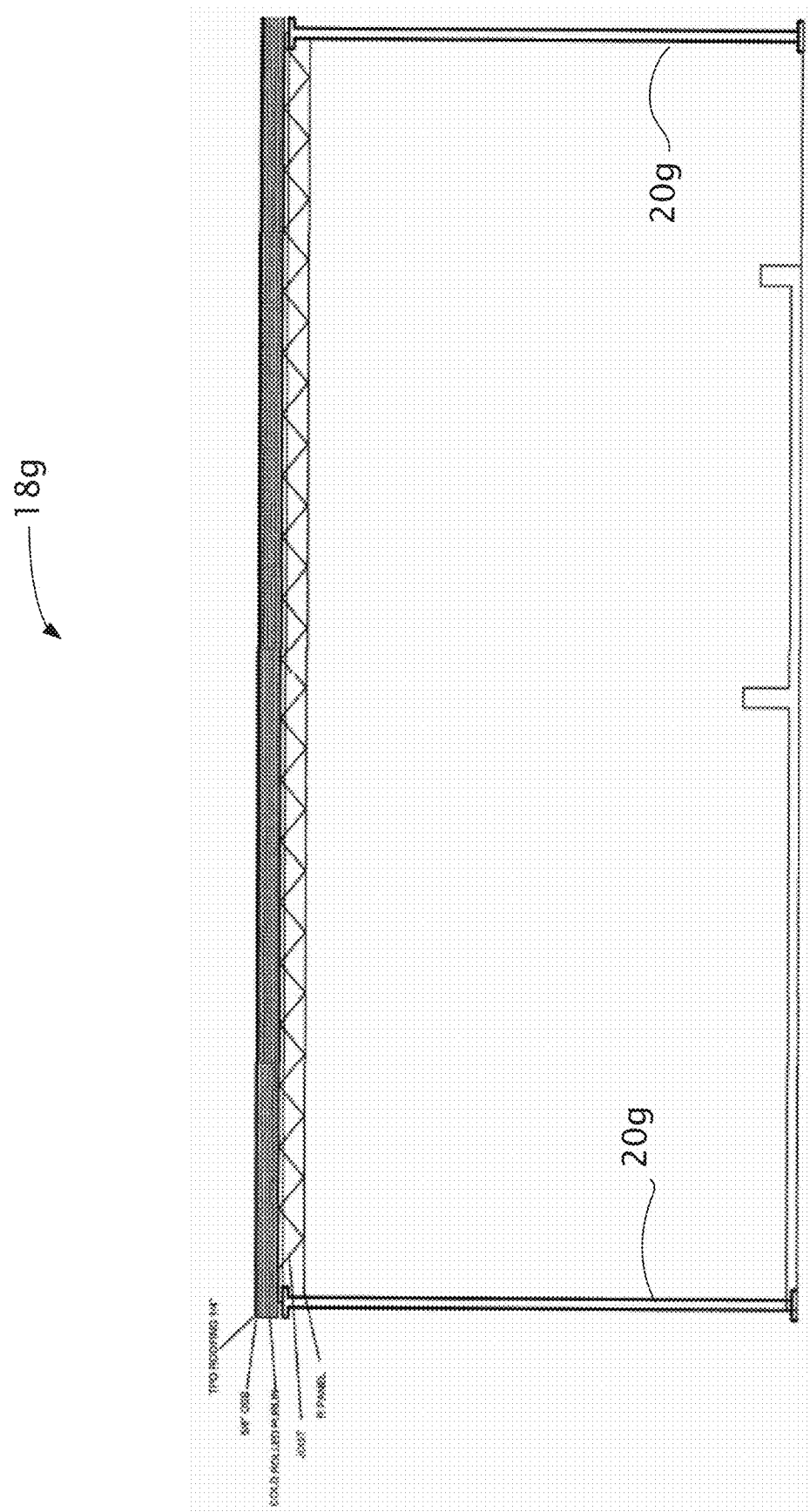
Figure 7D:
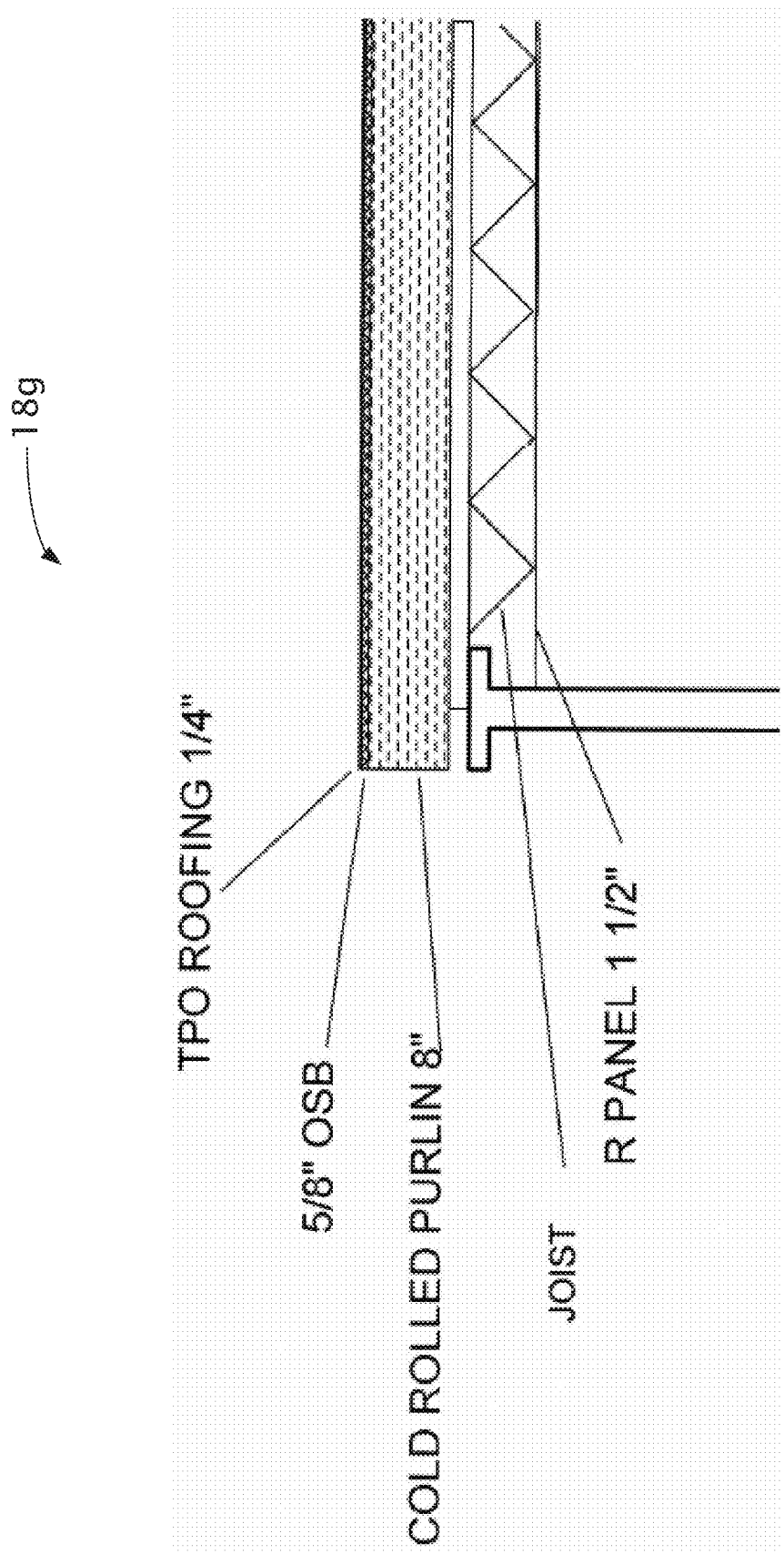
Figure 8A:
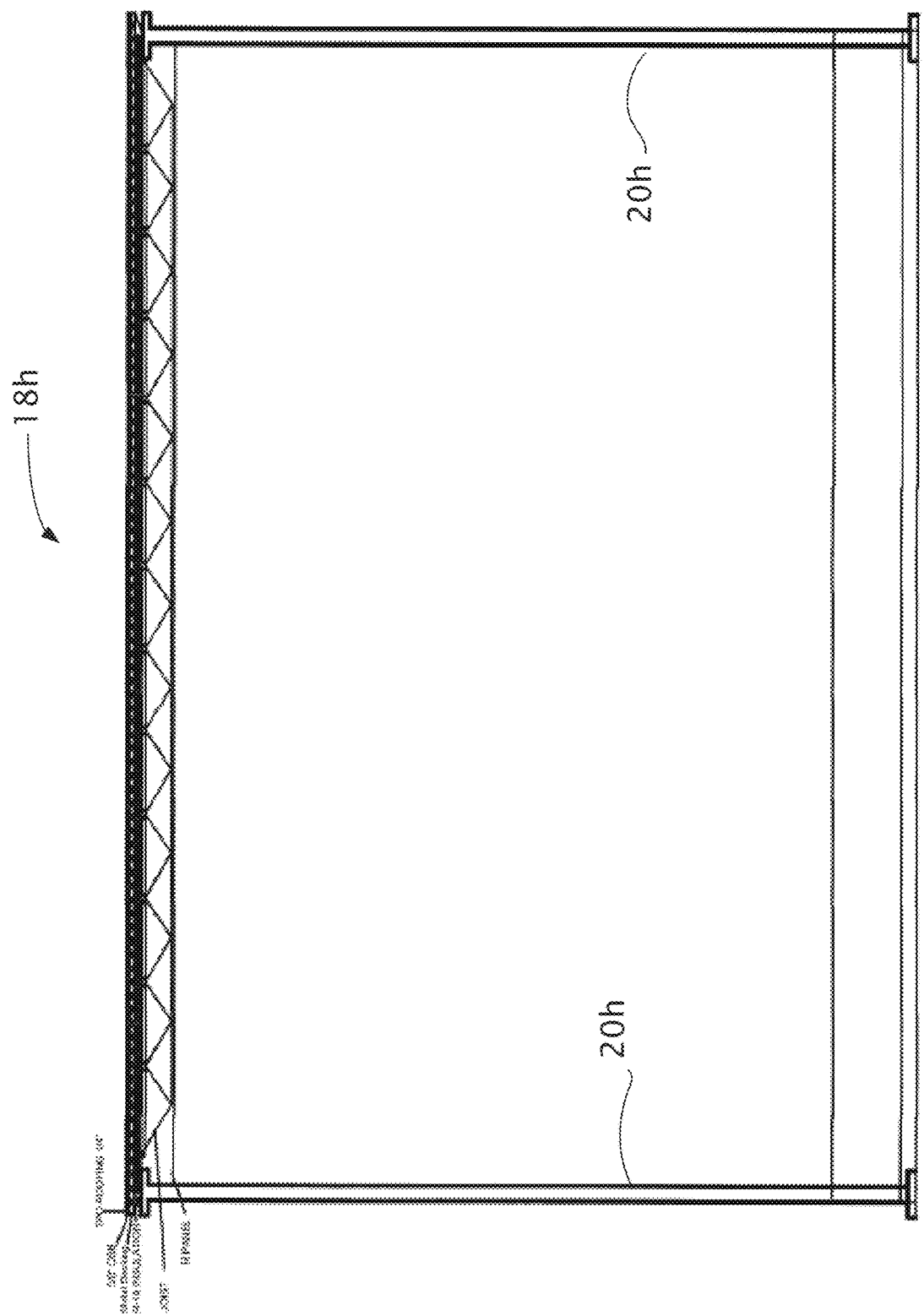
FIGS. 8A-8D depict various views of another embodiment of a portion of a roof that can be used with the present structures.
Figure 8B:
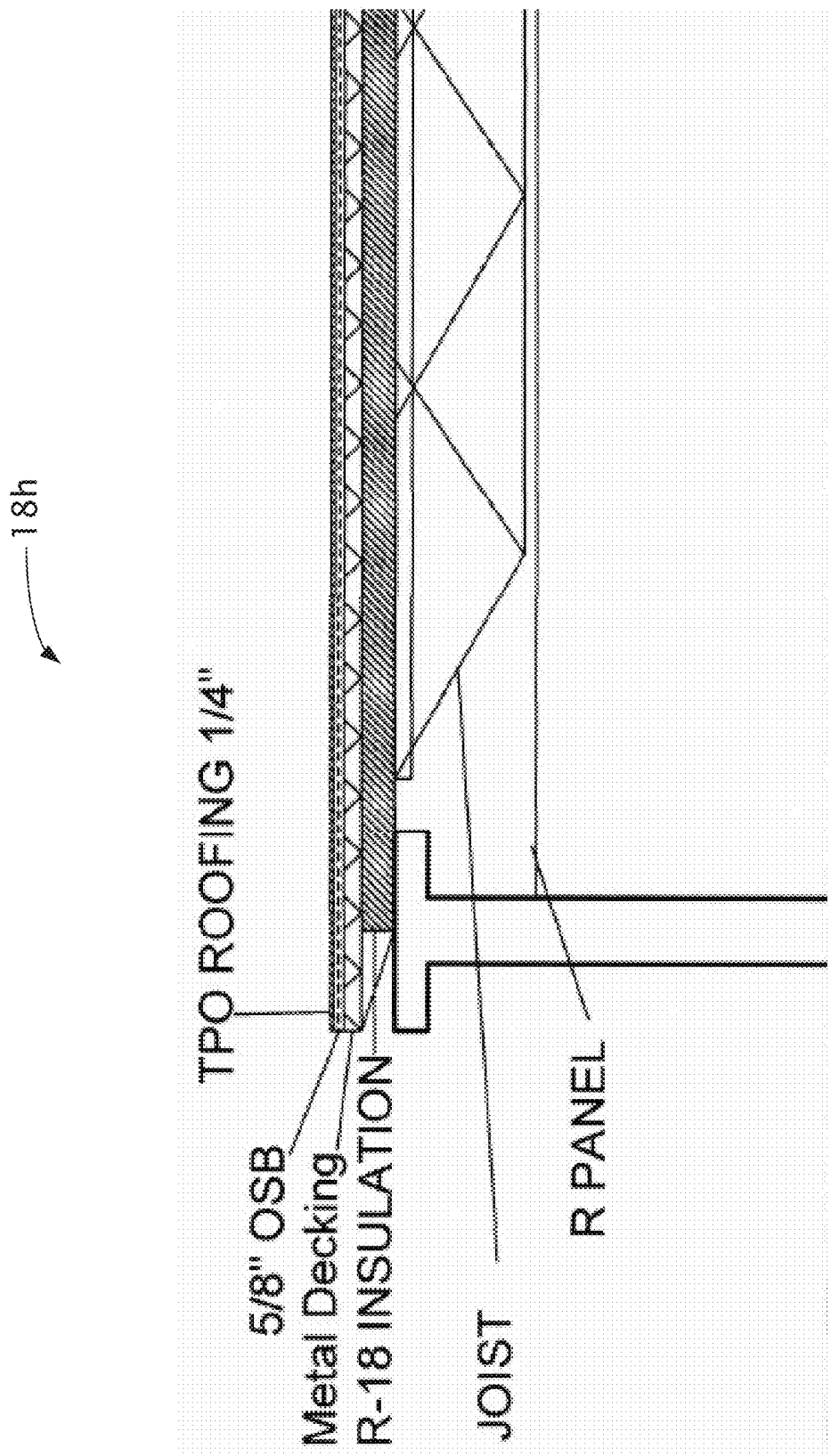
Figure 8C:
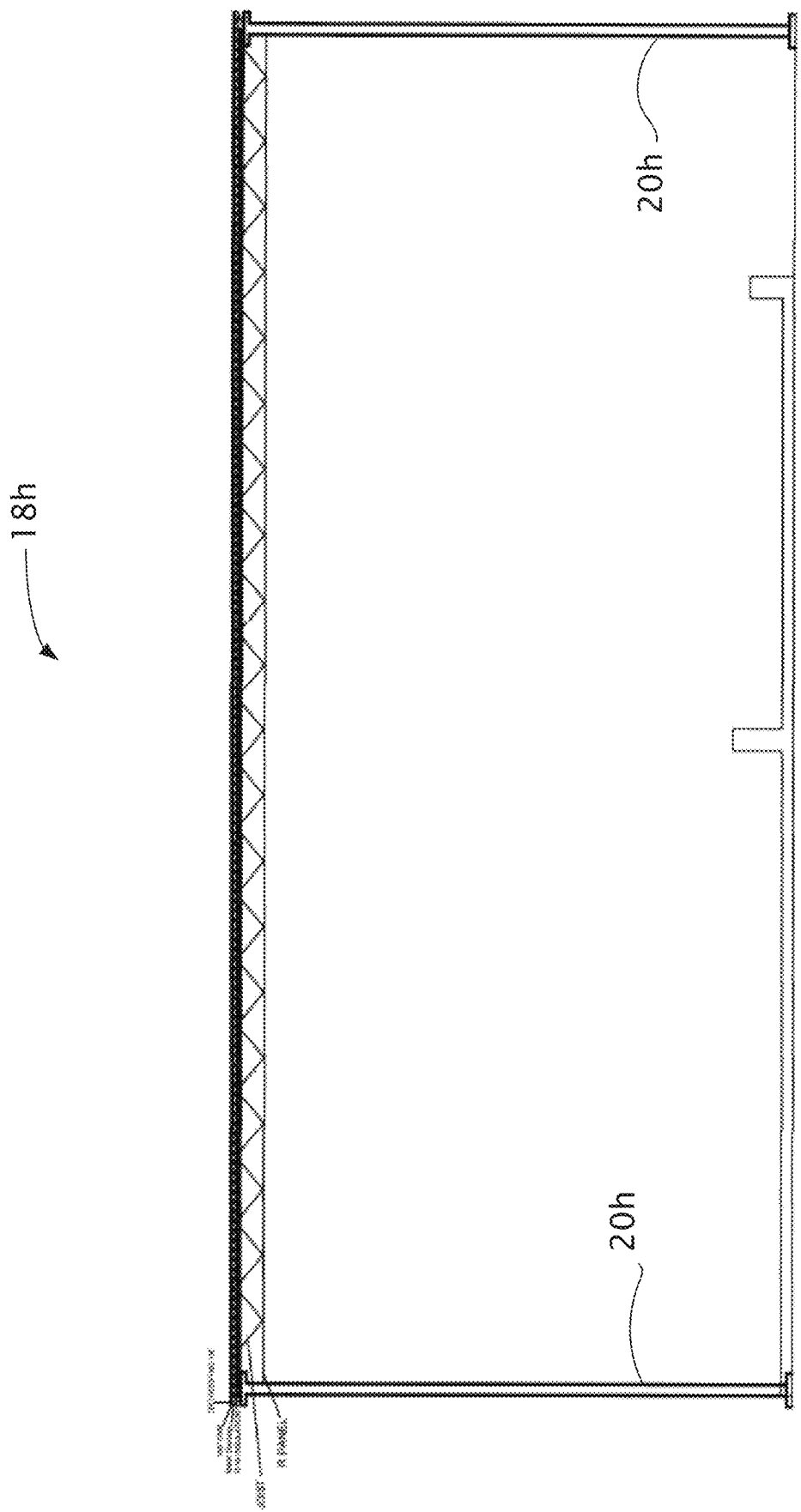
Figure 8D:
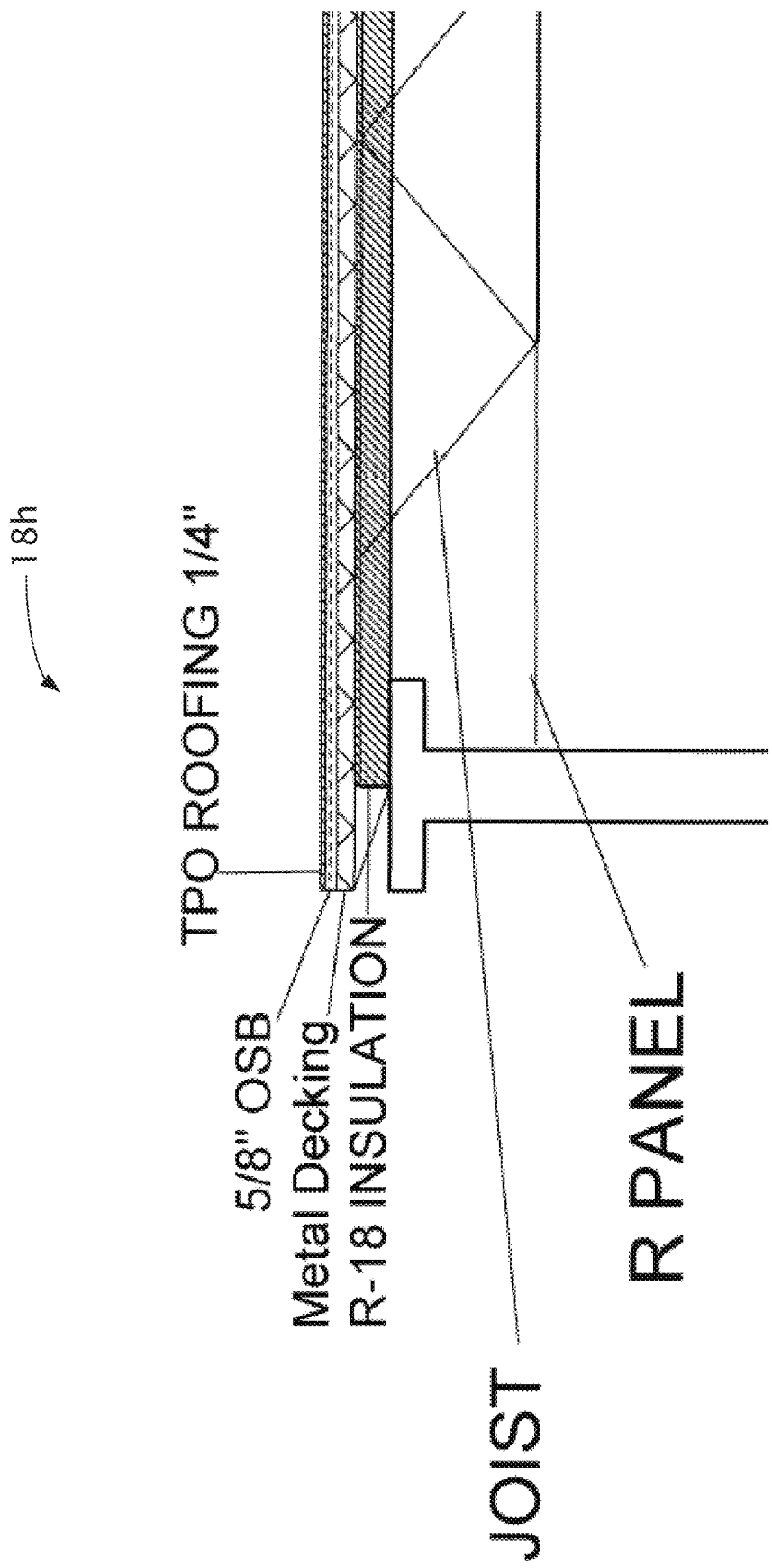

Referring now to FIGS. 1A-1H, shown therein and represented by numeral 10a is one embodiment of the present structures. In the embodiment shown, structure 10a comprises floor 14a and roof 18a (see FIGS. 1F and 1G, for example). In the embodiment shown, roof 18a is a flat roof (e.g., as opposed to a gable roof). However, any other type of roof, including a gable roof, can be combined with certain other features of the present disclosure to create a novel structure. For example, a majority (e.g., greater than 50%, such as 55%, 60%, 65%, 70%, 75%, or more) of roof 18a can be substantially parallel to floor 14a. In some embodiments, less than a majority (e.g., 50%, 45%, 40%, 35%, or less) of roof 18a can be substantially parallel to floor 14a. In some embodiments, roof 18a comprises a pitch from zero to 12:12 (e.g., measured in feet). In some embodiments, roof 18a can be substantially non-parallel to ground beneath floor 14a. In some embodiments, a majority (e.g., 51%, 60%, 70%, 80%, or more) of roof 18a occupies substantially the same plane (e.g., whether parallel or non-parallel to floor 14a and/or ground beneath floor 14a). As an example, roof 18e depicted in FIGS. 5A-5B, which is at least partially supported by supporting structures 20e and which comprises ¼ inch thermoplastic polyolefin (TPO) roofing, ⅝ inch oriented strand board (OSB), R-18 insulation, 8 inch cold-rolled purlin, a wide flange beam, and 1.5 inch R panel can be used with the present structures. As another example, roof 18f depicted in FIGS. 6A-6B, which is at least partially supported by supporting structures 20f and which comprises ¼ inch thermoplastic polyolefin (TPO) roofing, ⅝ inch oriented strand board (OSB), 8 inch cold-rolled purlin, a wide flange beam, and 1.5 inch R panel can be used with the present structures. As still another example, roof 18g depicted in FIGS. 7A-7D, which is at least partially supported by supporting structures 20g and which comprises ¼ inch thermoplastic polyolefin (TPO) roofing, ⅝ inch oriented strand board (OSB), R-18 insulation, 8 inch cold-rolled purlin, a joist, and 1.5 inch R panel can be used with the present structures. As a further example, roof 18h depicted in FIGS. 8A-8D, which is at least partially supported by supporting structures 20h and which comprises ¼ inch thermoplastic polyolefin (TPO) roofing, ⅝ inch oriented strand board (OSB), metal decking, R-18 insulation, a joist, and 1.5 inch R panel can be used with the present structures. The materials and dimensions to construct a roof of the present structures can be altered or supplemented to provide a roof that is suitable in a given environment (e.g., cold, hot, mild), a roof that is a suitable strength, a roof that is a suitable surface area, a roof that is a suitable pitch, and the like. Roof 18a can be supported by plurality of supporting structures 20a, which can comprise any suitable material, such as steel. As depicted in FIG. 1E, because roof 18a is substantially parallel to floor 14a, supporting structures 20a comprise substantially the same length. Roof 18a can be positioned non-parallel to ground beneath floor 14a at any desired angle to, for example, permit precipitation (e.g., rain, snow, and the like) to drain from roof 18a.

In some embodiments, floor 14a is substantially parallel to ground beneath structure 10a; and, in other embodiments, floor 14a is non-parallel to ground beneath structure 10a, and can comprise a gradient (e.g., can extend at an angle with respect to ground beneath structure 10a and/or at an angle with respect to another portion of floor 14a). Floor 14a can comprise one surface or a combination of surfaces, such as, for example, a natural surface (e.g., dirt) and/or a man-made surface (e.g., concrete). As with the pitch of roof 18a, a gradient of floor 14a (or a portion thereof) can be selected based on topography, enabling the present structures to be located on previously unsuitable topography, which will be discussed further below.

In the embodiment shown, structure 10a includes first side 22a comprising first side wall 26a, which is configured to support a portion of roof 18a. Structure 10a further includes second side 30a comprising second side wall 34a, which is configured to support a portion of roof 18a. Structure 10a also includes front side 38a comprising front wall 42a, which is configured to support a portion of roof 18a, and back side 46a comprising back wall 50a, which is configured to support a portion of roof 18a. Front wall 42a comprises plurality of doors 54a, and back wall 50a comprises plurality of doors 58a. In other embodiments, either of front wall 42a or back wall 50a can comprise one door or no doors. Plurality of doors 54a and 58a are configured to accommodate at least a portion of a vehicle such that at least a portion of a vehicle can enter structure 10a through a door of plurality of doors 54a on front wall 42a and exit structure 10a through a door of plurality of doors 58a on back wall 50a, or vice versa.

Structure 10a (and, more specifically, front wall 42a, back wall 50a, first side wall 26a, and second side wall 34a) can comprise any suitable dimensions to accommodate a desired number of livestock. In the embodiment shown in FIGS. 1A-1H, front wall 42a and back wall 50a are 1,210 feet in length; however, in other embodiments front wall 42a and/or back wall 50a can comprise less than 1,210 feet (e.g., 1,100 feet, 1,000 feet, 900 feet, 800 feet, 700 feet, 600 feet, or less) or greater than 1,210 feet (e.g., 1,300 feet, 1,400 feet, 1,500 feet, 1,600 feet, or more). Similarly, first side wall 26a and second side wall 34a are 1,390 feet in length; however, in other embodiments first side wall 26a and/or second side wall 34a can comprise less than 1,390 feet (e.g., 1,300 feet, 1,200 feet, 1,100 feet, 1,000 feet, 900 feet, 800 feet, or less) or greater than 1,390 feet (e.g., 1,500 feet, 1,600 feet, 1,700 feet, 1,800 feet, 1,900 feet, 2,000 feet, or more). For example, structure 10a can be sized to accommodate between zero and 200 head of livestock, between 200 and 500 head of livestock, between 500 and 1,000 head of livestock, between 1,000 and 4,000 head of livestock, between 4,000 and 8,000 head of livestock, between 8,000 and 10,000 head of livestock, between 10,000 and 15,000 head of livestock, between 15,000 and 20,000 head of livestock, between 20,000 and 25,000 head of livestock, between 25,000 and 30,000 head of livestock, between 30,000 and 35,000 head of livestock, between 35,000 and 40,000 head of livestock, between 40,000 and 45,000 head of livestock, between 45,000 and 50,000 head of livestock, between 50,000 and 60,000 head of livestock, between 60,000 and 70,000 head of livestock, between 70,000 and 80,000 head of livestock, between 80,000 and 90,000 head of livestock, between 90,000 and 100,000 head of livestock, or more. Furthermore, each of plurality of doors 54a and 58a can comprise any suitable dimensions to accommodate a desired size of vehicle. In the embodiment shown in FIGS. 1A-1H, each of plurality of doors 54a and 58a are between 10 and 30 feet in length and between 10 and 30 feet in height; however, in other embodiments, each of plurality of doors 54a and 58a can comprise a length of less than 10 feet or greater than 30 feet, or a height of less than 10 feet or greater than 30 feet.

Structure 10a further comprises a plurality of fans positioned on first side 22a (e.g., coupled to first side wall 26a) such that, if the plurality of fans are activated, air is removed from structure 10a by the plurality of fans (e.g., by pulling air from within structure 10a toward first side wall 26a). Structure 10a can further comprise a plurality of fans positioned on second side 30a (e.g., coupled to second side wall 34a) such that, if the plurality of fans are activated, air is removed from structure 10a by the plurality of fans (e.g., by pulling air from within structure 10a toward second side wall 34a). For example, fans 62c depicted in FIG. 3A are examples of fans that can positioned along first side 22a and/or second side 30a of structure 10a.

Structure 10a also includes rows of housing pens 63a. Each housing pen 64a in a row of housing pens 63a is configured to accommodate a head of livestock such that the head of livestock can rest and/or sleep in housing pen 64a. In some embodiments, a head of livestock can eat and/or drink in each housing pen 64a in a row of housing pens 63a.

Figure 1F:
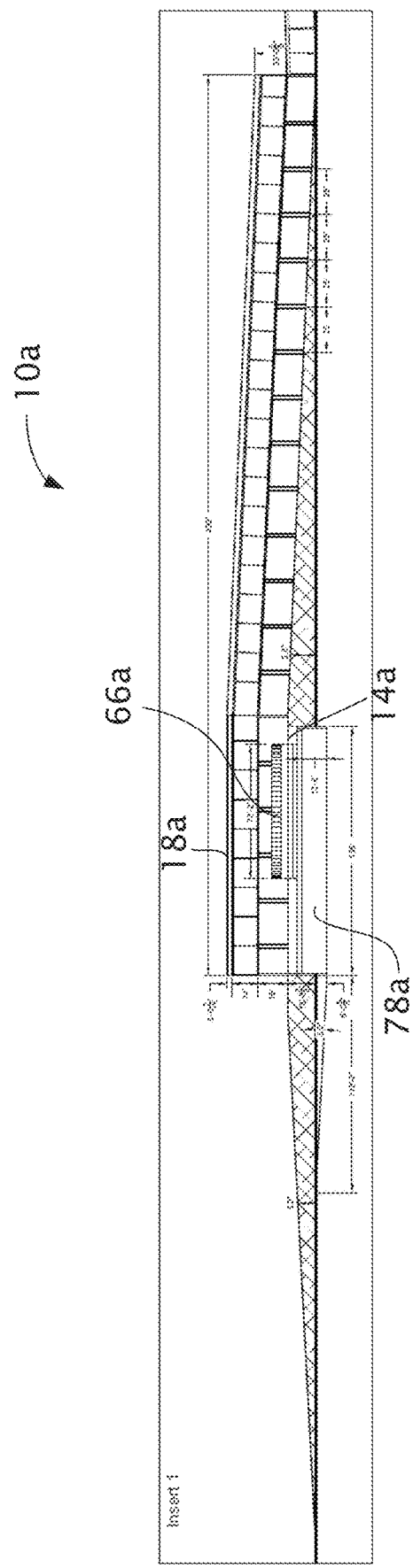

In the embodiment shown in FIGS. 1A-1H, structure 10a is configured to accommodate at least one milking parlor, such as at least one herringbone parlors, at least one parallel parlor, at least one rotary parlor, and the like. For example, in the embodiment shown, structure 10a comprises first milking parlor 66a (e.g., a rotary parlor) disposed within structure 10a and second milking parlor 70a (e.g., a rotary parlor) disposed within structure 10a. In the embodiment shown in FIGS. 1A-1H, structure 10a comprises milking parlor portion 74a, which is sized and positioned to accommodate first milking parlor 66a and second milking parlor 70a. In other embodiments, milking parlor portion 74a of structure 10a can be sized and/or positioned to accommodate less than two milking parlors (e.g., one milking parlor), or greater than two milking parlors (e.g., three, four, five, or more milking parlors). In the embodiment shown in FIGS. 1A-1H, milking parlor portion 74a is not configured to accommodate livestock housing pens (e.g., not configured to accommodate livestock apart from use of milking parlors 66a and 70a). In the embodiment shown, milking parlor portion 74a extends from front wall 42a on front side 38a. As depicted in FIGS. 1E-1F, floor 14a can comprise a gradient that extends into milking parlor portion 74a toward milking parlors 66a and 70a. Floor 14a can additionally comprise a gradient in other parts of structure 10a. Floor 14a can comprise any desired gradient, which can depend, for example, on type of livestock bedding, the waste management system(s), the gradient of the ground beneath floor 14a, and other factors. For example, a structure that has compost bedding may have a floor at least a portion of which is a lesser gradient, and a structure that has sand bedding may have a floor at least a portion of which is a greater gradient. As another example, a structure with a flush waste management system may have a floor at least a portion of which is a greater gradient, and a structure with a dry scrape, mechanic scrape, and/or auto scrape waste management system may have a floor at least a portion of which is a lesser gradient. In the embodiment shown, floor 14a comprises a gradient of 2.5 and 3 degrees (e.g., is angled at 2.5 and 3 degrees with respect to ground beneath floor 14a); however, in other embodiments, floor 14a can comprise any suitable gradient that is less than 2.5 degrees (e.g., 2 degrees, 1.5 degrees, 1 degrees, 0.5 degrees, or less), between 2.5 and 3 degrees, or greater than 3 degrees (e.g., 3.5 degrees, 4 degrees, 4.5 degrees, 5 degrees, or more). In some embodiments, first portions of floor 14a can comprise a first gradient, and second portions of floor 14a (e.g., beneath first portions of floor 14a) can comprise a second gradient.

Figure 9:
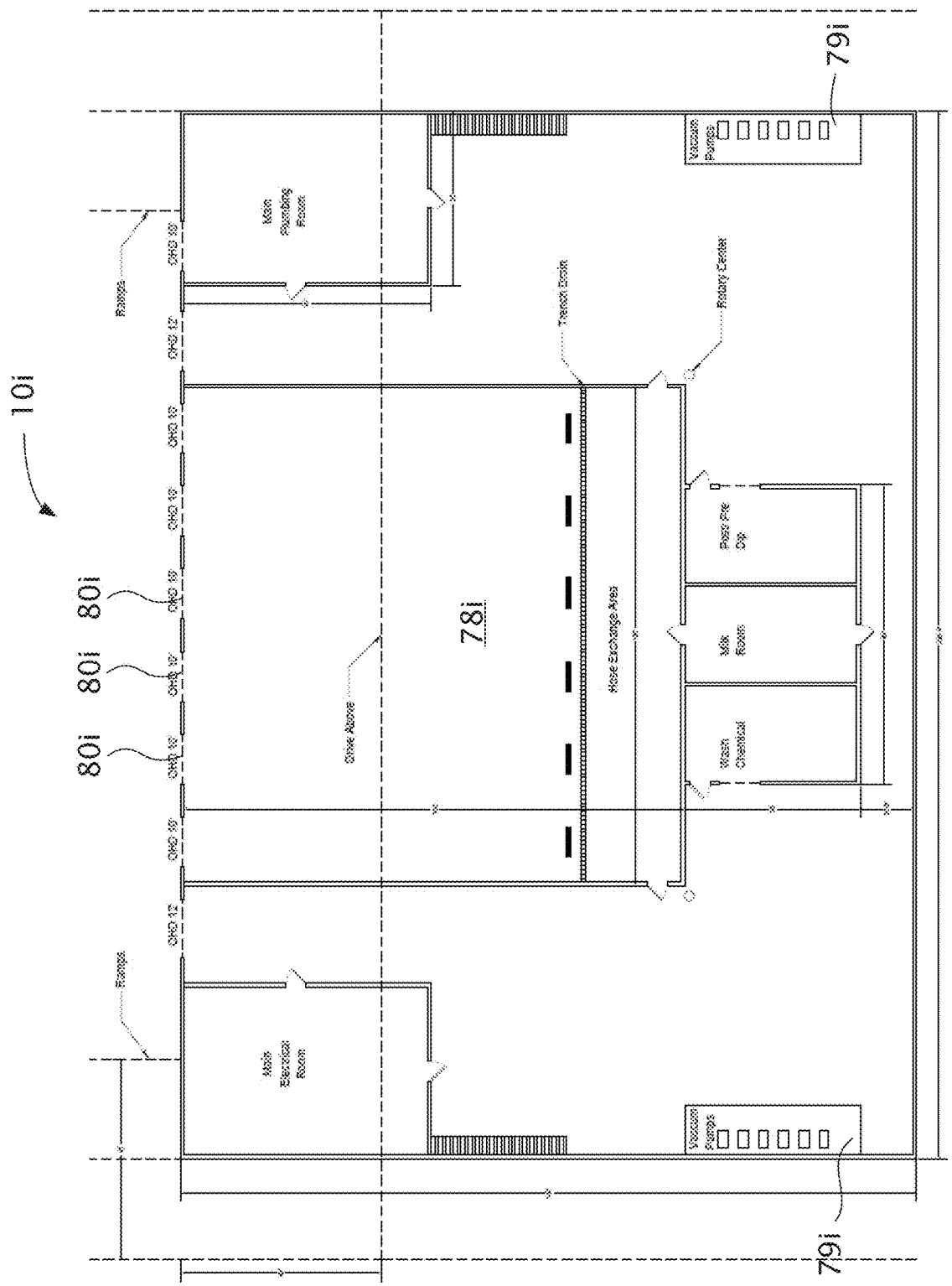
FIG. 9 depicts a top view of a portion of another embodiment of the present structures that comprises a basement configured to accommodate milk room systems, to accommodate one or more milk storage tanks, and/or to be accessible by at least one vehicle such that milk from livestock in one or more milking parlors can be passed to the one or more milk storage tanks and/or the at least one vehicle.
Figure 10A:
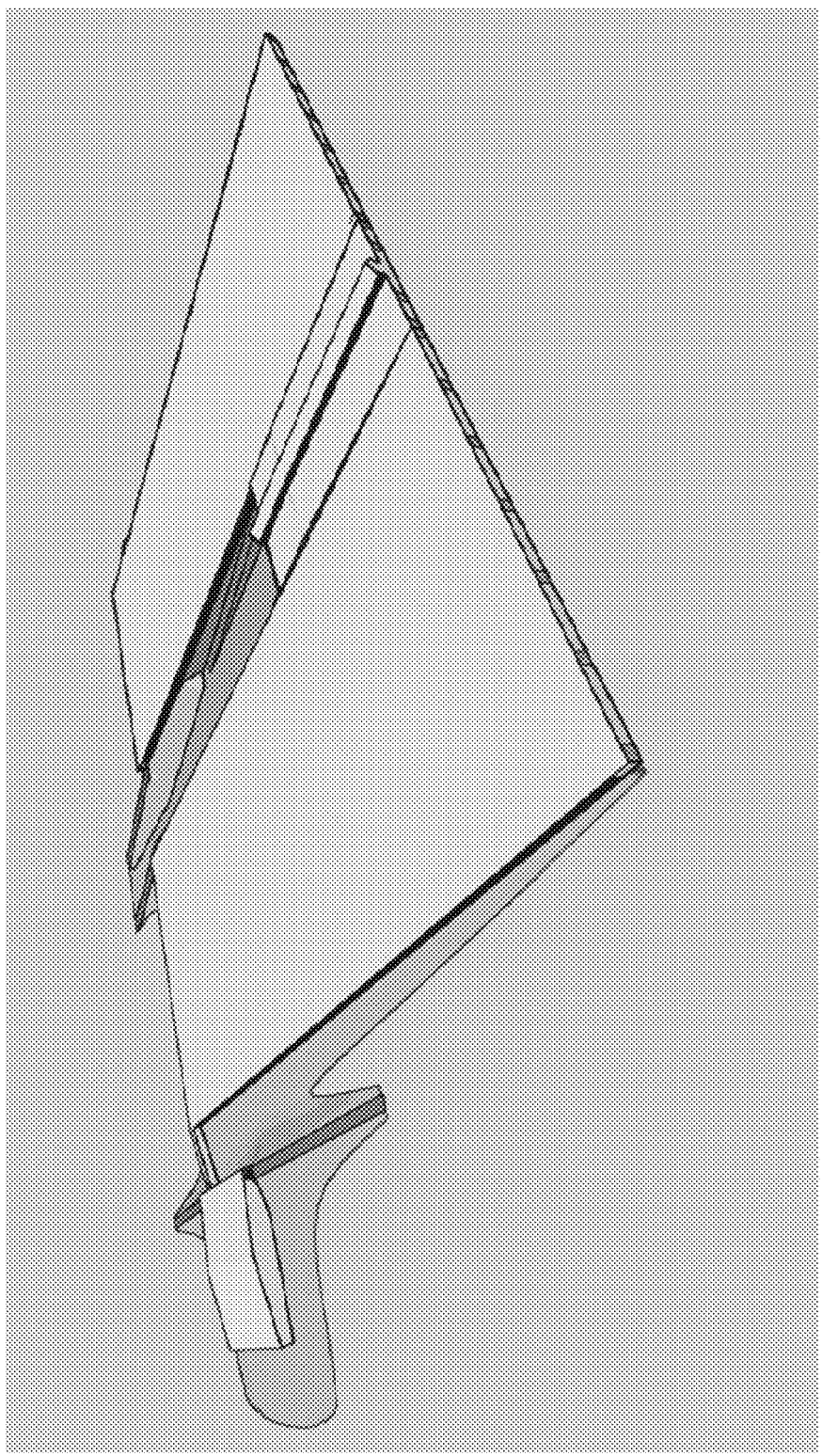
FIGS. 10A-10E depict various views of another embodiment of the present structures.
Figure 10B:
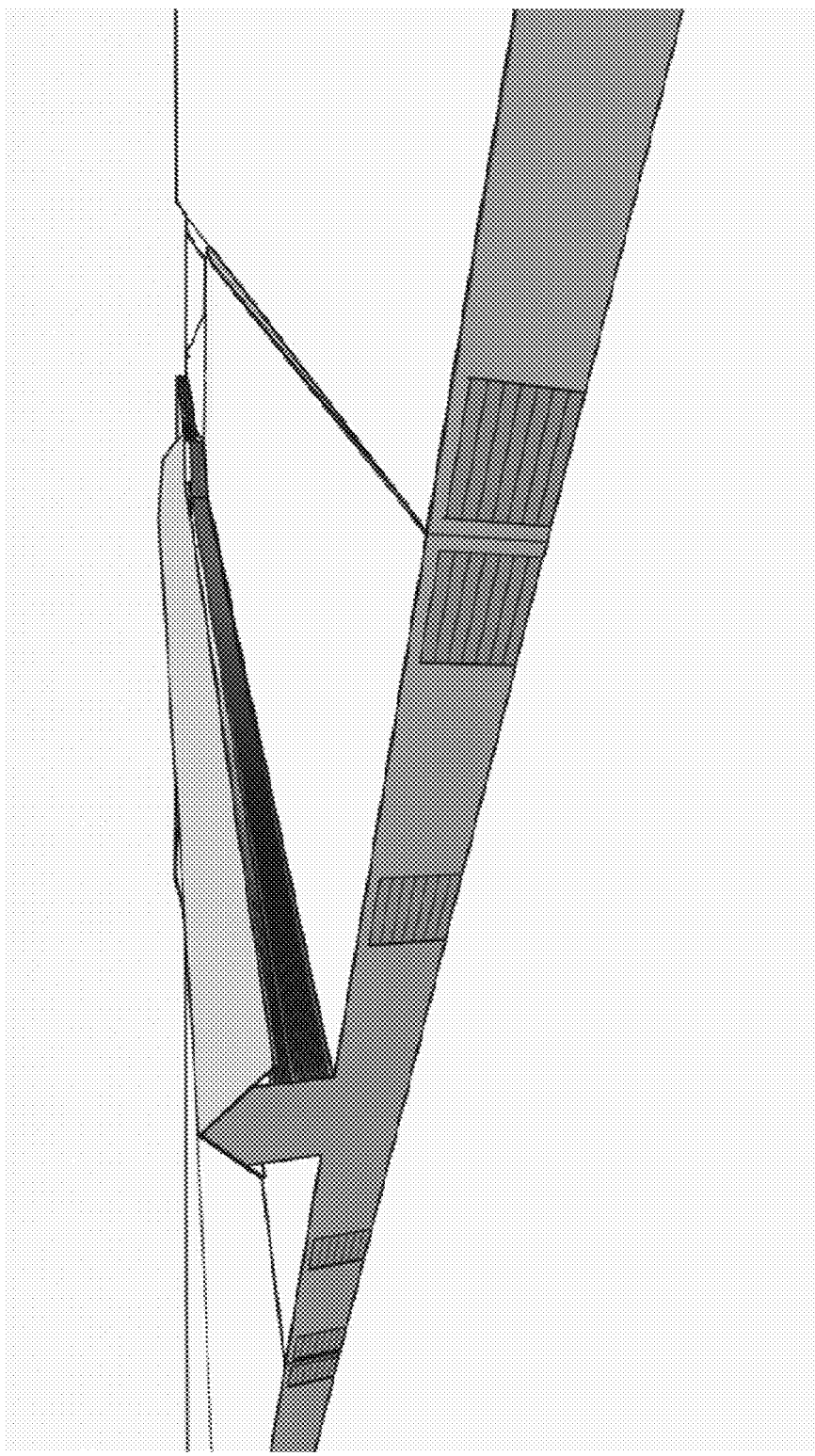
Figure 10C:
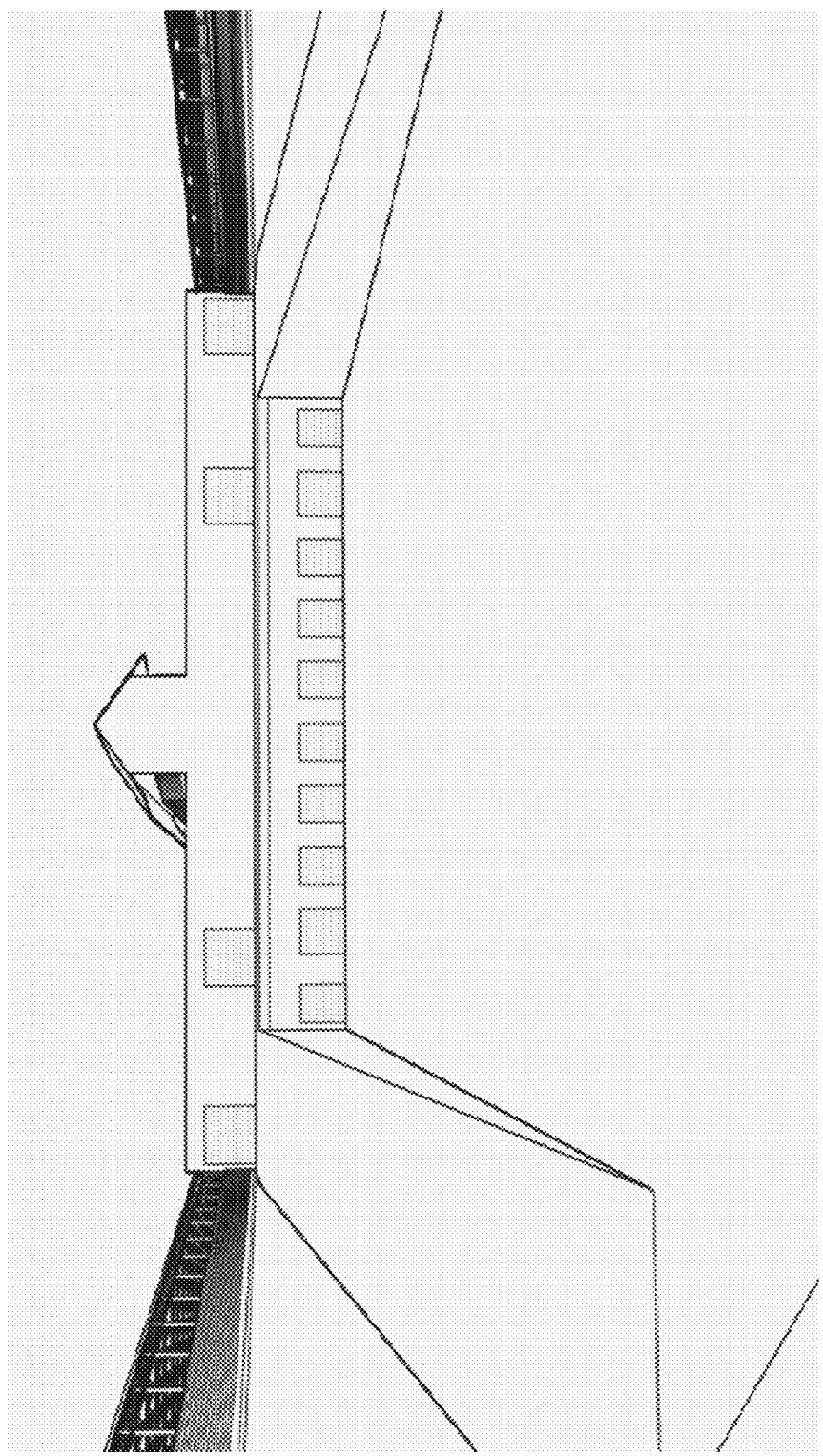
Figure 10D:
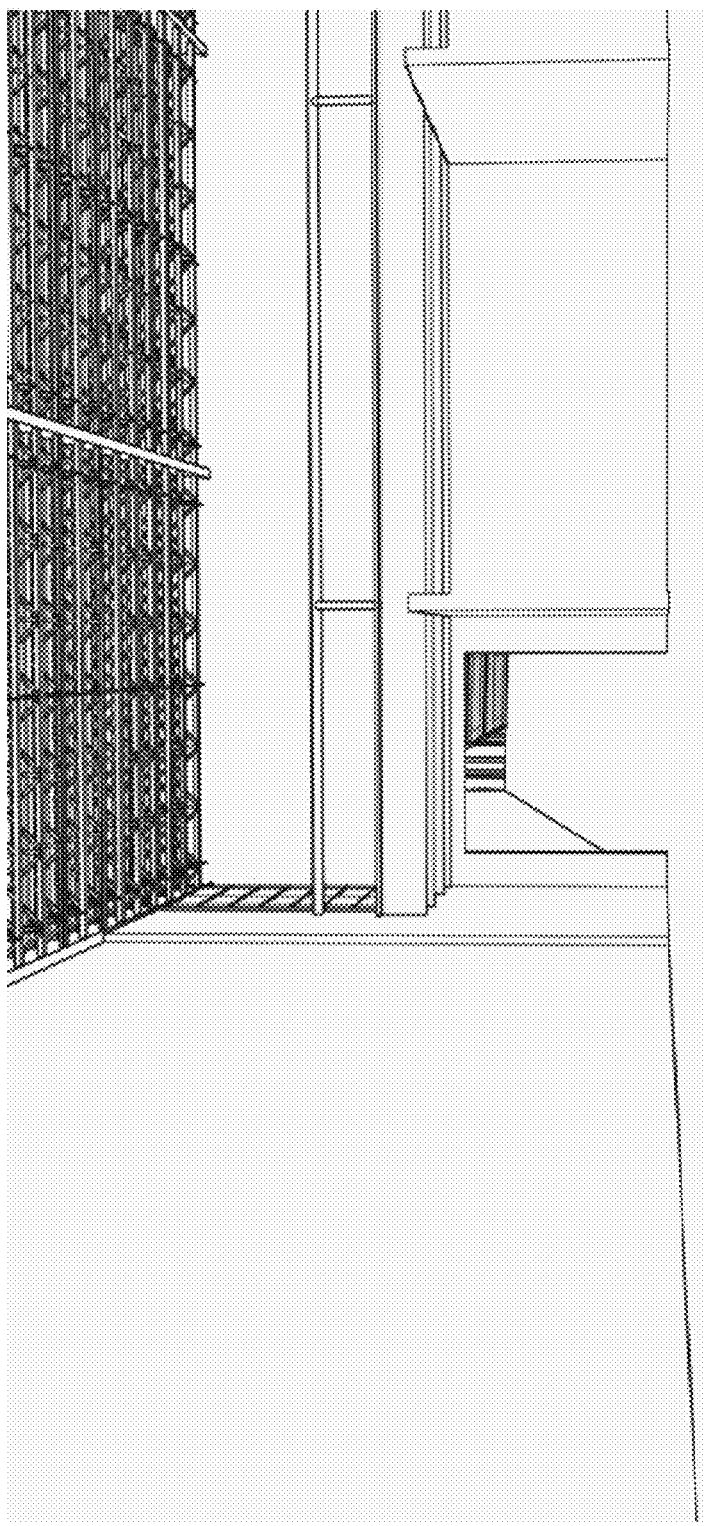
Figure 10E:
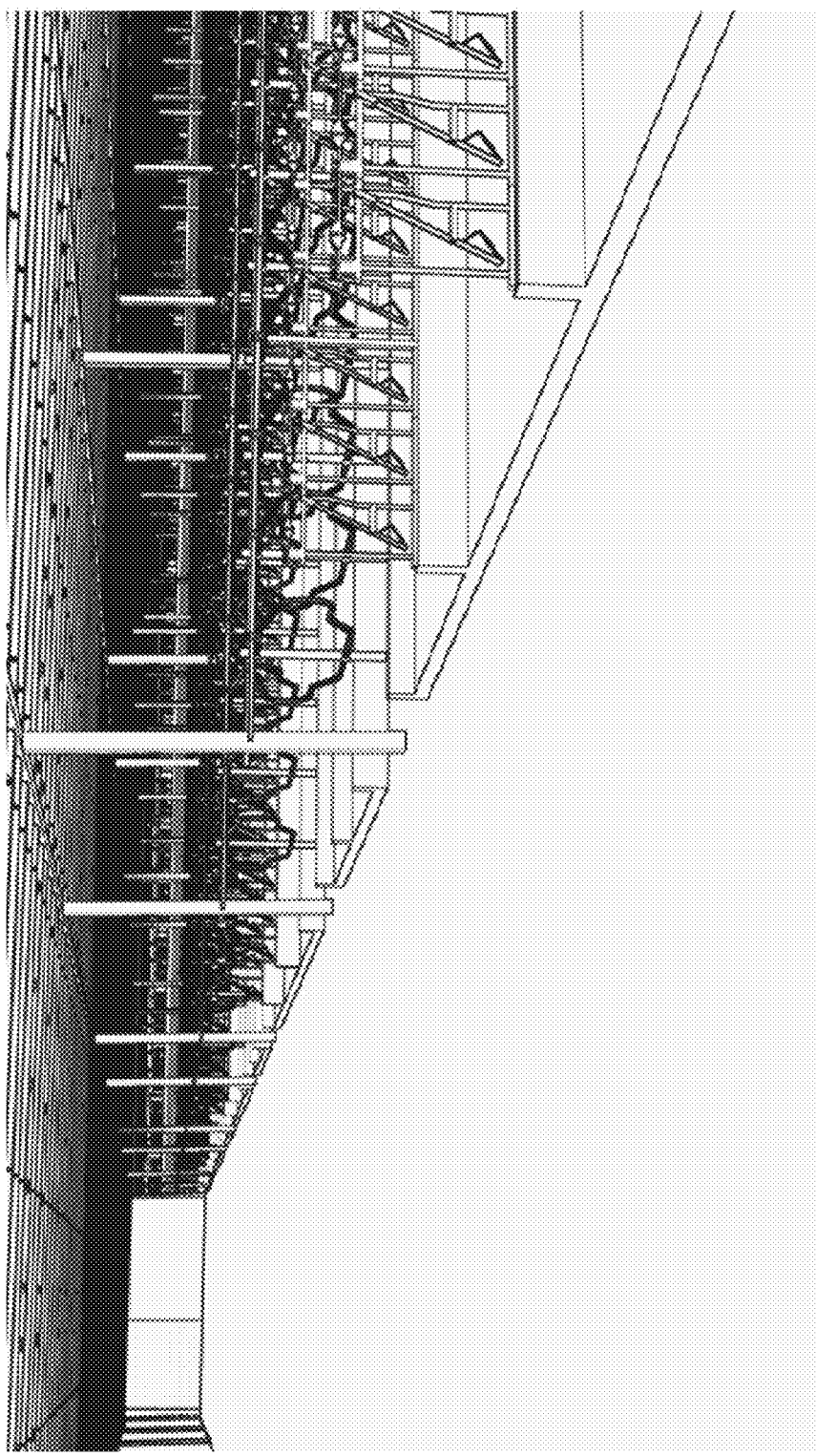

Structure 10a further comprises basement 78a positioned beneath floor 14a of structure 10a and configured to be accessible by at least one vehicle (e.g., one, two, three, four, five, six, or more vehicles) such that milk from livestock in first milking parlor 66a and/or second milking parlor 70a can pass to the vehicle (e.g., directly or indirectly from one or more milk storage tanks) if livestock are milked in first milking parlor 66a and/or second milking parlor 70a. Distinguishable from a milking parlor basement immediately below a milking parlor, but above a floor of a structure, basement 78a is positioned beneath floor 14a of structure 10a. For example, basement 78a can be configured to accommodate at least a portion of at least one vehicle (e.g., part or all of at least one vehicle can enter basement 78a such that milk can pass to the vehicle). For example, milk can pass from first milking parlor 66a and/or second milking parlor 70a to the at least one vehicle without passing into a milk storage tank (e.g., after washing, cooling, purification, and/or filtration). In the embodiment shown, at least a portion of first milking parlor 66a and second milking parlor 70a are positioned above basement 78a such that gravity can assist in enabling milk to pass from first milking parlor 66a and second milking parlor 70a into basement 78a and into one or more milk storage tanks and/or at least one vehicle. One or more pumps can also assist in enabling milk to pass from first milking parlor 66a and second milking parlor 70a into basement 78a and into one or more milk storage tanks and/or at least one vehicle. For example, basement 78i of structure 10i depicted in FIG. 9 is one example of a basement layout, where a portion thereof is a milk room. Pumps 79i assist in enabling milk to pass from one or more milking parlors into basement 78i. Vehicles can enter basement 78i through doors 80i such that milk can be passed into the vehicles. Milk wash systems, cooling systems, purification systems, filtration systems, vacuum systems and related processes and systems can be at least partially located in basement 78i, as depicted.

Figure 1G:
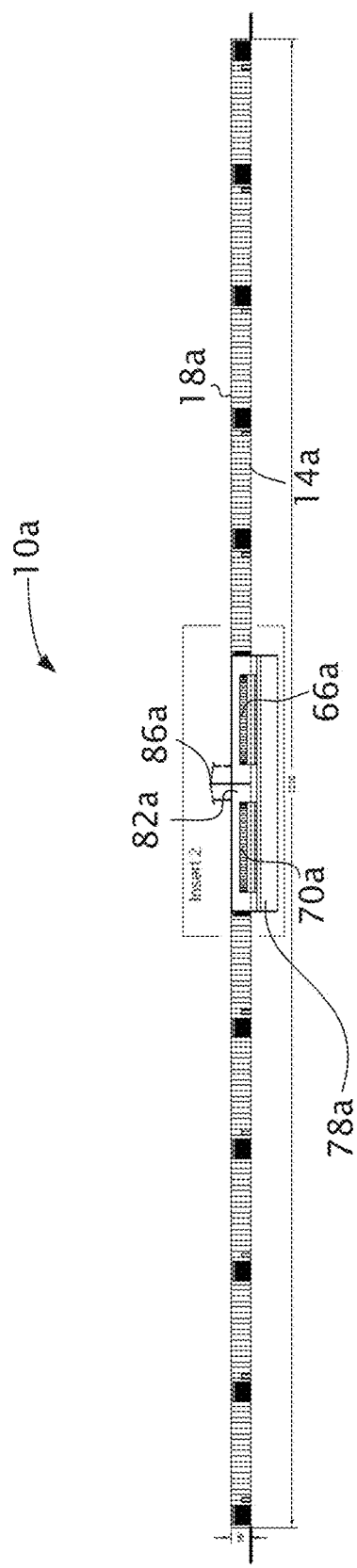
FIGS. 1G-1H depict a front view of portions of the structure of FIG. 1A.
Figure 1H:
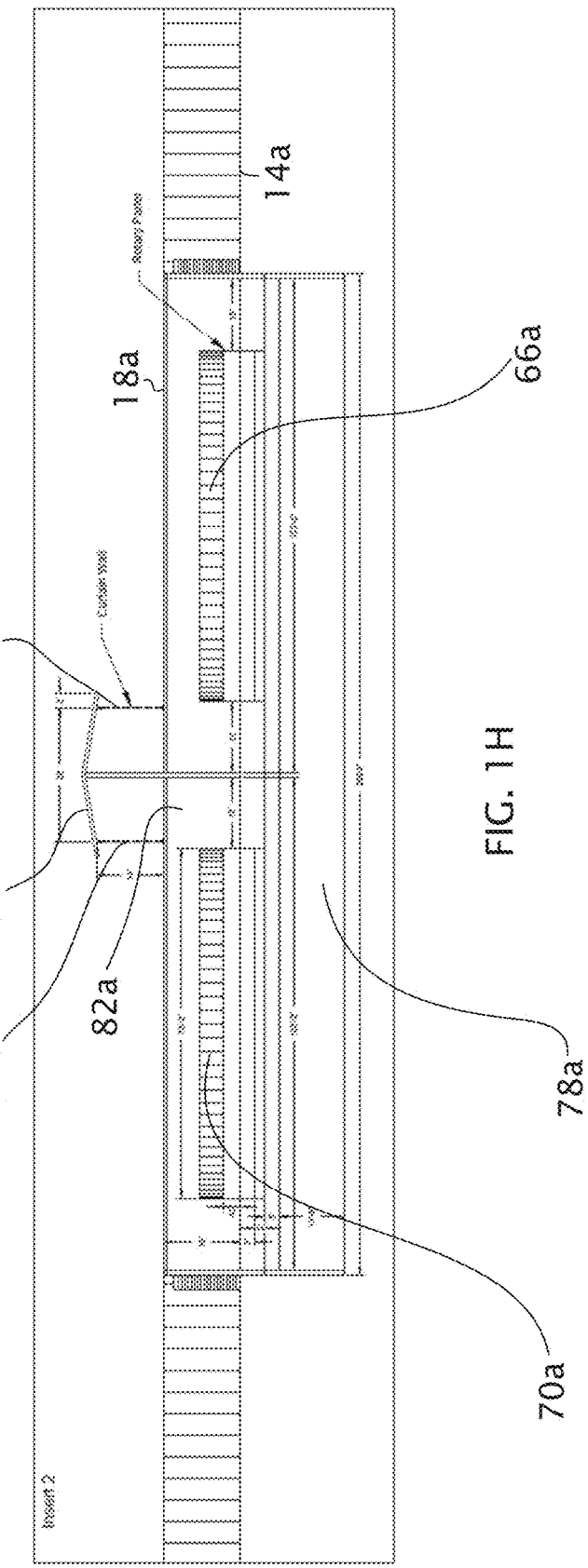

Structure 10a additionally comprises opening 82a in roof 18a (see FIGS. 1G and 1H, for example). Opening 82a is configured to permit air to enter structure 10a through roof 18a (e.g., which air can eventually be removed from structure 10a by a plurality of fans). Opening 82a extends substantially parallel to first side 22a and second side 30a and can extend for at least a portion of the length of first side 22a and second side 30a (e.g., 1%, 5%, 10%, 15%, 30%, 45%, 60%, 75%, 90%, the length of first side 22a and second side 30a, or more). In the embodiment shown, opening 82a comprises a width from 20 feet to 40 feet (e.g., 28 feet); however, in other embodiments, opening 82a comprises a width of less than 20 feet (e.g., 15 feet, 10 feet, or less) or greater than 40 feet (e.g., 45 feet, 50 feet, or more). Structure 10a can further comprise one or more fans positioned near opening 82a such that air from outside structure 10a is further encouraged to enter structure 10a. Structure 10a also comprises steeple 86a coupled to roof 18a and configured to discourage fluid from entering structure 10a through opening 82a while permitting air to enter structure 10a through opening 82a. One or more partitions 90a (e.g., curtains, louvers, and the like) can be coupled to steeple 86a to assist in discouraging fluid from entering structure 10a through opening 82a. Partitions 90a can be rigid or flexible, and can be adjustable (manually or automatically). In the embodiment shown, first milking parlor 66a and second milking parlor 70a are disposed within structure 10a and positioned such that at least a portion of first milking parlor 66a and second milking parlor 70a is beneath at least a portion of opening 82a to permit air entering structure 10a through opening 82a to engage any livestock in first milking parlor 66a and/or second milking parlor 70a.

Structure 10*a* can further comprise a commodity basement, such as commodity basement 94*d* depicted in FIGS. 4A-4D. The commodity basement can be positioned beneath floor 14*a* of structure 10*a*. Structure 10*a* can be configured to accommodate at least a portion of at least one vehicle (e.g., such as vehicle 98*d*) such that, if a vehicle passes into structure 10*a* (e.g., on floor 14*a* over the commodity basement), the vehicle can dispose commodity in the commodity basement from floor 14*a* of structure 10*a* (e.g., commodity can be disposed in commodity cells similar to commodity cells 102*d*, each of which are separated from one another by a partition 103, as depicted in FIGS. 4A-4D). Similarly to that depicted in FIGS. 4A-4D, floor 14*a* can comprise a gradient to enable the at least one vehicle to be positioned over the commodity basement.

Figure 2A:
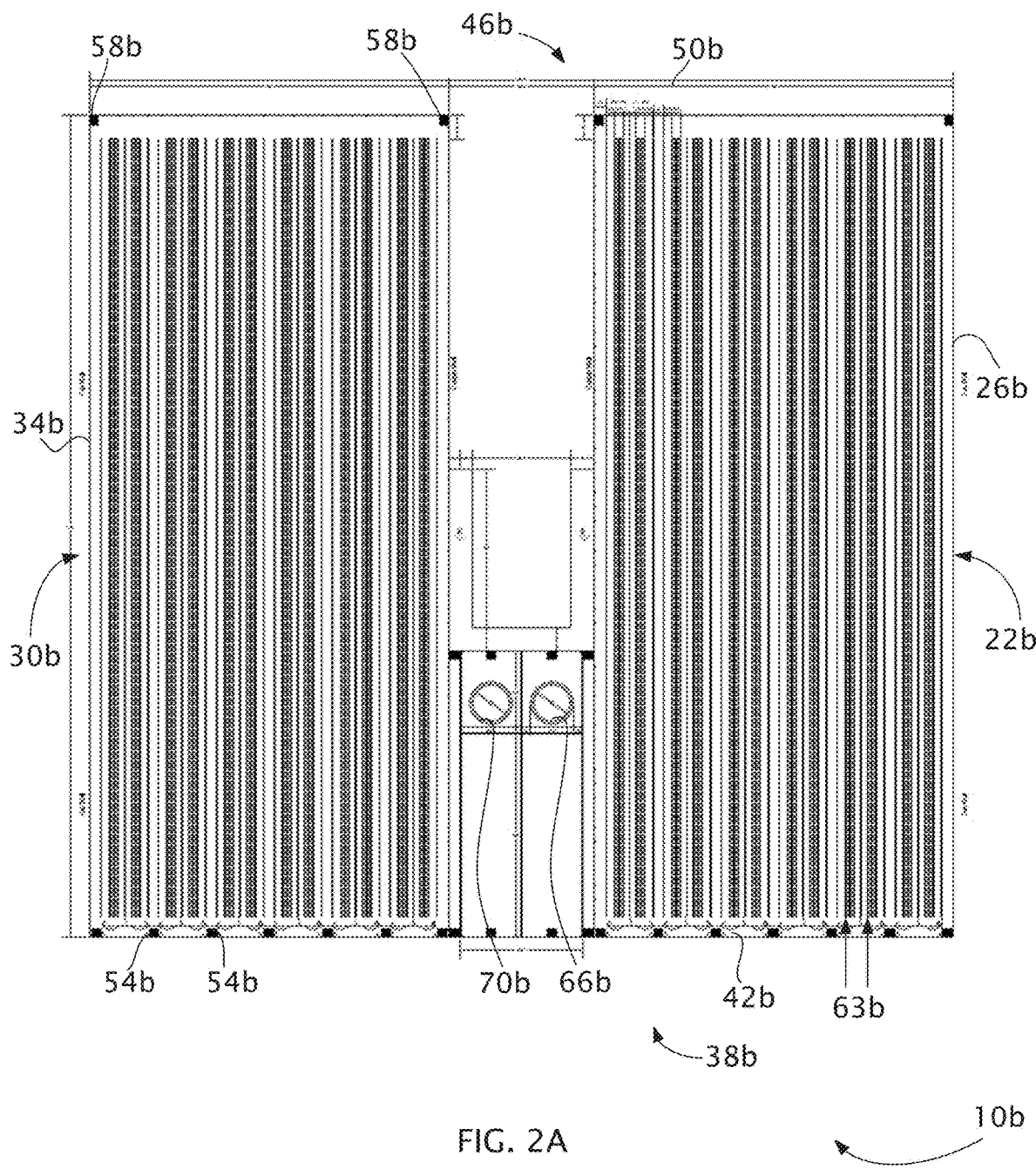
FIG. 2A depicts another embodiment of the present structures in which milking parlors are disposed between a first side wall and a second side wall of the structure.
Figure 2B:
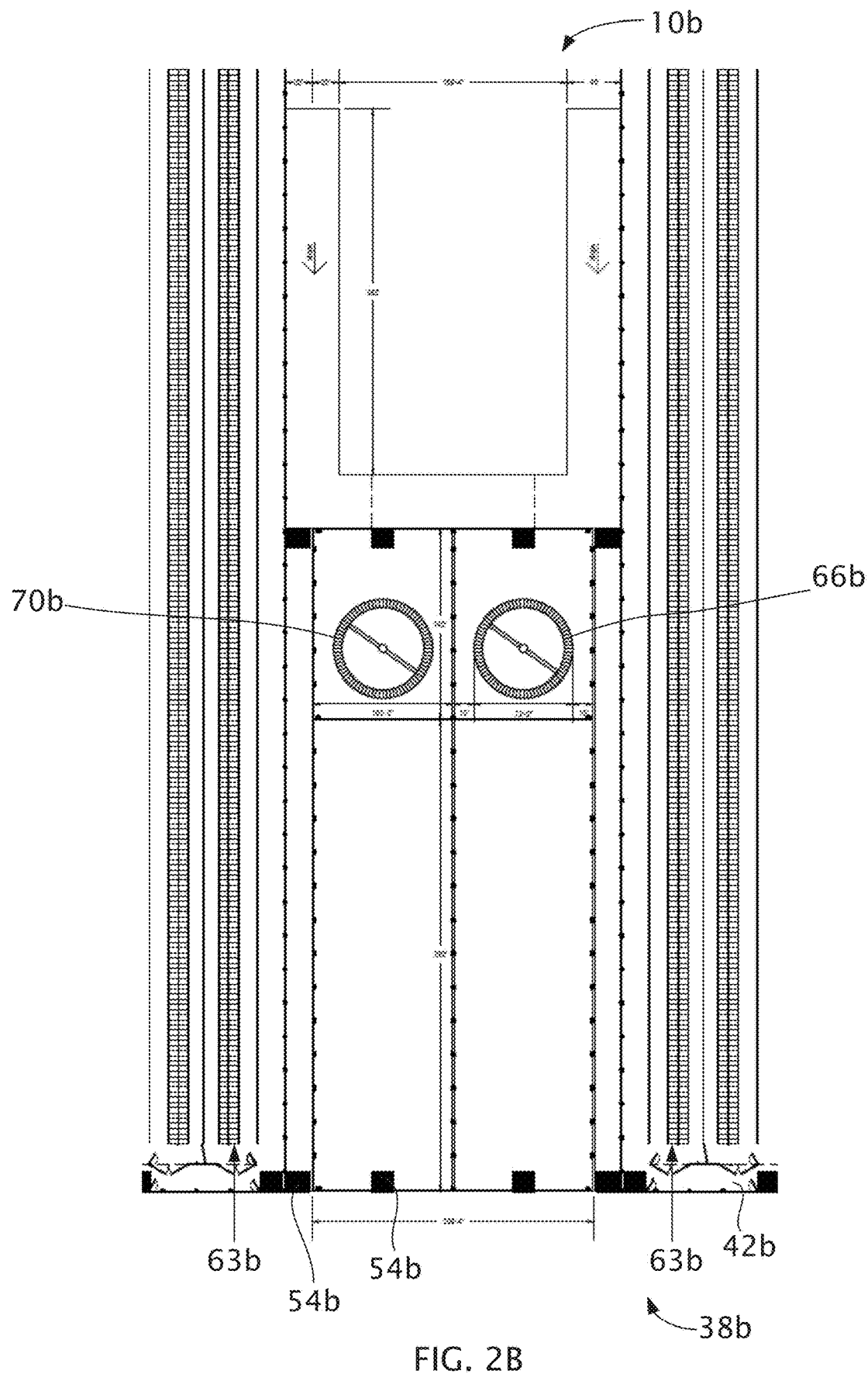
FIGS. 2B-2D depict magnified views of portions of the structure of FIG. 2A.
Figure 2C:
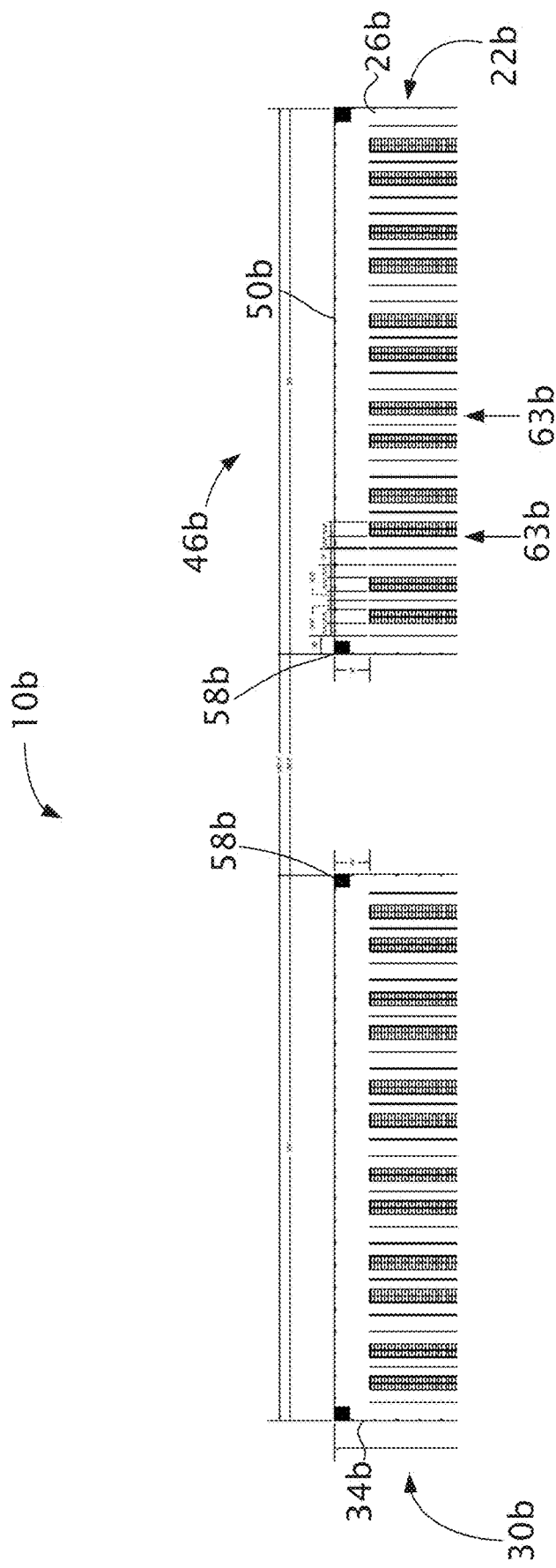
Figure 2D:
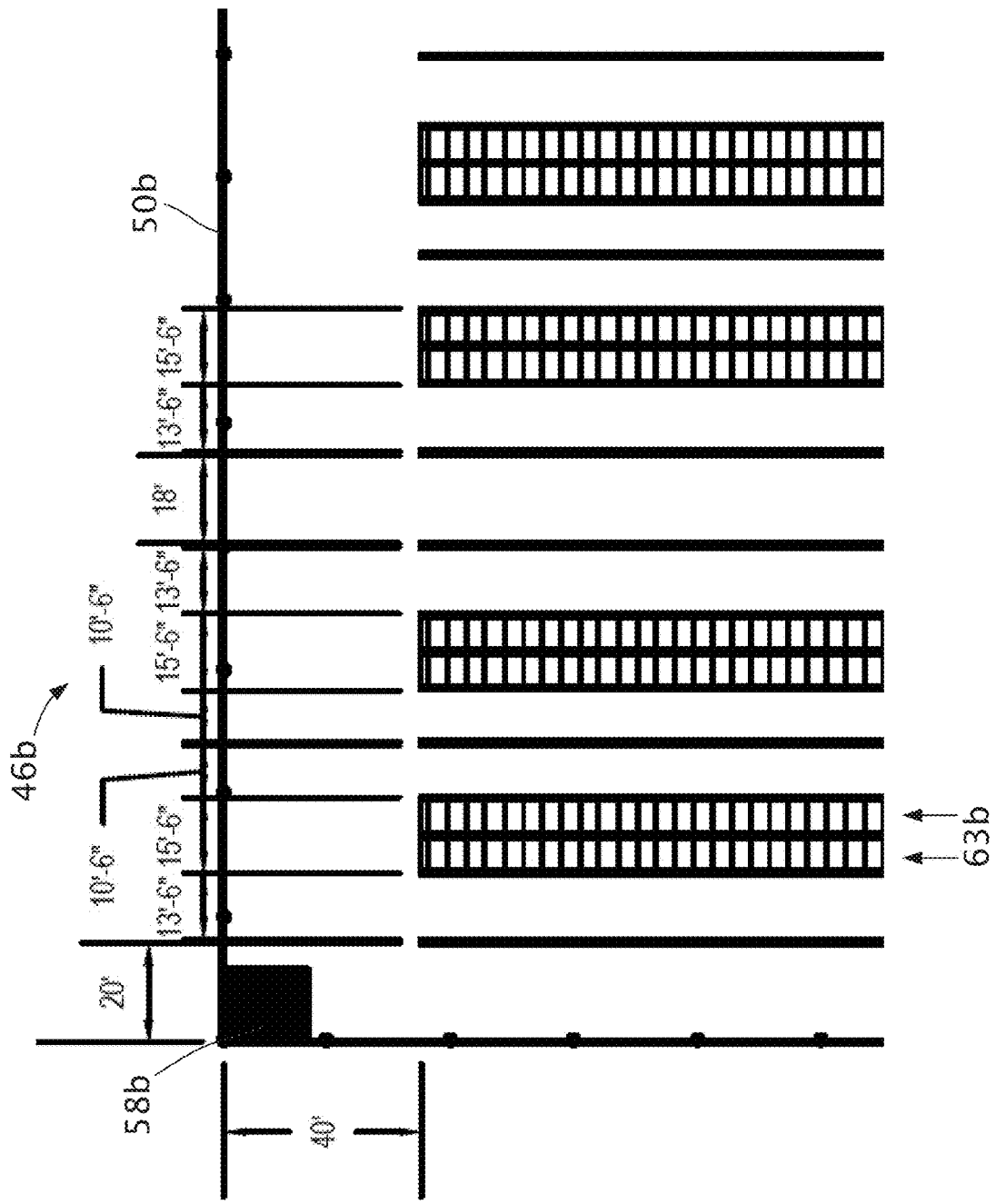
Figure 2E:
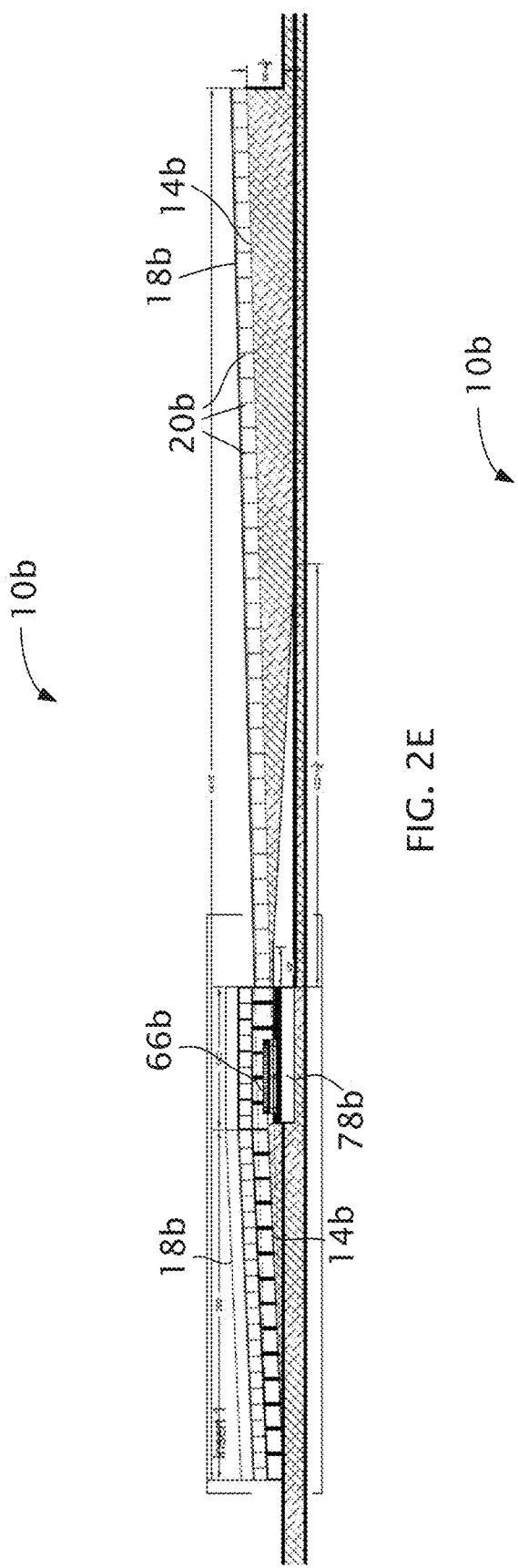
FIGS. 2E-2F depict a side view of portions of the structure of FIG. 2A.
Figure 2F:
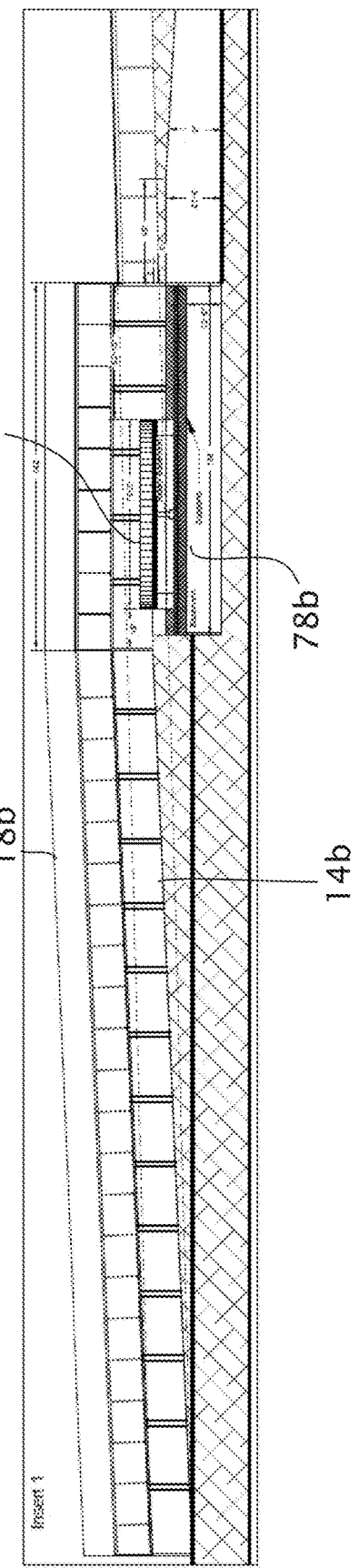
Figure 2G:
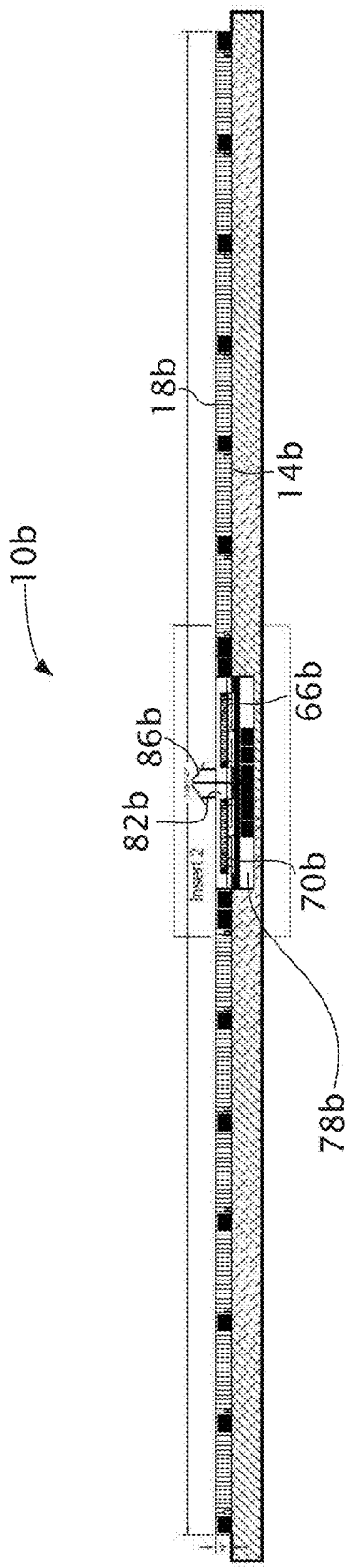
FIGS. 2G-2H depict a front view of portions of the structure of FIG. 2A.
Figure 2H:
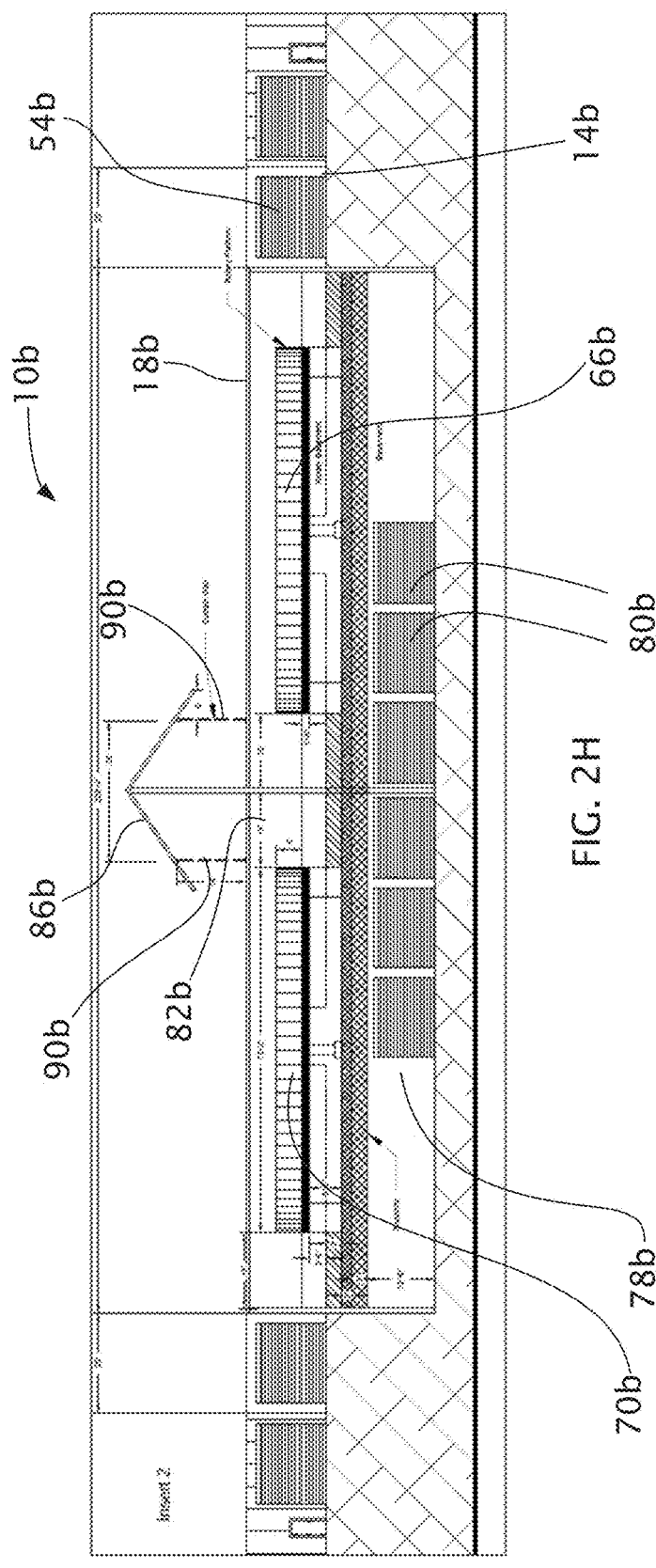

Referring now to FIGS. 2A-2H, shown therein and represented by numeral 10*b* is another embodiment of the present structures. In the embodiment shown, structure 10*b* comprises floor 14*b* and roof 18*b*. In the embodiment shown, roof 18*b* is a flat roof (e.g., as opposed to a gable roof). However, any other type of roof, including a gable roof, can be combined with certain other features of the present disclosure to create a novel structure. In some embodiments, a majority (e.g., greater than 50%, such as 55%, 60%, 65%, 70%, 75%, or more) of roof 18*b* is substantially parallel to floor 14*b*. In some embodiments, less than a majority (e.g., 50%, 45%, 40%, 35%, or less) of roof 18*b* can be substantially parallel to floor 14*b*. In some embodiments, roof 18*b* comprises a pitch from zero to 12:12. In some embodiments, roof 18*b* can be substantially non-parallel to ground beneath floor 14*b*. In some embodiments, a majority (e.g., 51%, 60%, 70%, 80%, or more) of roof 18*b* occupies substantially the same plane (e.g., whether parallel or non-parallel to floor 14*b* and/or ground beneath floor 14*b*). As an example, roof 18*e* depicted in FIGS. 5A-5B, which is at least partially supported by supporting structures 20*e* and which comprises ¼ inch thermoplastic polyolefin (TPO) roofing, ⅝ inch oriented strand board (OSB), R-18 insulation, 8 inch cold-rolled purlin, a wide flange beam, and 1.5 inch R panel can be used with the present structures. As another example, roof 18*f* depicted in FIGS. 6A-6B, which is at least partially supported by supporting structures 20*f* and which comprises ¼ inch thermoplastic polyolefin (TPO) roofing, ⅝ inch oriented strand board (OSB), 8 inch cold-rolled purlin, a wide flange beam, and 1.5 inch R panel can be used with the present structures. As still another example, roof 18*g* depicted in FIGS. 7A-7D, which is at least partially supported by supporting structures 20*g* and which comprises ¼ inch thermoplastic polyolefin (TPO) roofing, ⅝ inch oriented strand board (OSB), R-18 insulation, 8 inch cold-rolled purlin, a joist, and 1.5 inch R panel can be used with the present structures. As a further example, roof 18*h* depicted in FIGS. 8A-8D, which is at least partially supported by supporting structures 20*h* and which comprises ¼ inch thermoplastic polyolefin (TPO) roofing, ⅝ inch oriented strand board (OSB), metal decking, R-18 insulation, a joist, and 1.5 inch R panel can be used with the present structures. The materials and dimensions to construct a roof of the present structures can be altered or supplemented to provide a roof that is suitable in a given environment (e.g., cold, hot, mild), a roof that is a suitable strength, a roof that is a suitable surface area, a roof that is a suitable pitch, and the like. Roof 18*b* can be supported by plurality of supporting structures 20*b*, which can comprise any suitable material, such as steel. As depicted in FIG. 2E-2F, because roof 18*b* is substantially parallel to floor 14*b*, supporting structures 20*b* comprise substantially the same length. Roof 18*b* can be positioned non-parallel to ground beneath floor 14*b* at any desired angle to, for example, permit precipitation (e.g., rain, snow, and the like) to drain from roof 18*b*.

In some embodiments, floor 14*b* is substantially parallel to ground beneath structure 10*b*; and, in other embodiments, floor 14*b* is non-parallel to ground beneath structure 10*b*, and can comprise a gradient (e.g., can extend at an angle with respect to ground beneath structure 10*b* and/or at an angle with respect to another portion of floor 14*b*). Floor 14*b* can comprise one surface or a combination of surfaces, such as, for example, a natural surface (e.g., dirt) and/or a man-made surface (e.g., concrete). As with the pitch of roof 18*b*, a gradient of floor 14*b* (or a portion thereof) can be selected based on topography, enabling the present structures to be located on previously unsuitable topography, which will be discussed further below.

In the embodiment shown, structure 10*b* includes first side 22*b* comprising first side wall 26*b*, which is configured to support a portion of roof 18*b*. Structure 10*b* further includes second side 30*b* comprising second side wall 34*b*, which is configured to support a portion of roof 18*b*. Structure 10*b* also includes front side 38*b* comprising front wall 42*b*, which is configured to support a portion of roof 18*b*, and back side 46*b* comprising back wall 50*b*, which is configured to support a portion of roof 18*b*. Front wall 42*b* comprises plurality of doors 54*b*, and back wall 50*b* comprises plurality of doors 58*b*. In other embodiments, either of front wall 42*b* or back wall 50*b* can comprise one door or no doors. Plurality of doors 54*b* and 58*b* are configured to accommodate at least a portion of a vehicle such that at least a portion of a vehicle can enter structure 10*b* through a door of plurality of doors 54*b* on front wall 42*b* and exit structure 10*b* through a door of plurality of doors 58*b* on back wall 50*b*, or vice versa.

Structure 10*b* (and, more specifically, front wall 42*b*, back wall 50*b*, first side wall 26*b*, and second side wall 34*b*) can comprise any suitable dimensions to accommodate a desired number of livestock. In the embodiment shown in FIGS. 2A-2H, front wall 42*b* and back wall 50*b* are 1,441 feet in length; however, in other embodiments front wall 42*b* and/or back wall 50*b* can comprise less than 1,441 feet (e.g., 1,400 feet, 1,300 feet, 1,200 feet, 1,100 feet, 1,000 feet, 900 feet, 800 feet, 700 feet, 600 feet, or less) or greater than 1,441 feet (e.g., 1,500 feet, 1,600 feet, 1,700 feet, 1,800 feet, 1,900 feet, 2,000 feet, or more). Similarly, first side wall 26*b* and second side wall 34*b* are 1,390 feet in length; however, in other embodiments first side wall 26*b* and/or second side wall 34*b* can comprise less than 1,390 feet (e.g., 1,300 feet, 1,200 feet, 1,100 feet, 1,000 feet, 900 feet, 800 feet, or less) or greater than 1,390 feet (e.g., 1,500 feet, 1,600 feet, 1,700 feet, 1,800 feet, 1,900 feet, 2,000 feet, or more). For example, structure 10*b* can be sized to accommodate between zero and 200 head of livestock, between 200 and 500 head of livestock, between 500 and 1,000 head of livestock, between 1,000 and 4,000 head of livestock, between 4,000 and 8,000 head of livestock, between 8,000 and 10,000 head of livestock, between 10,000 and 15,000 head of livestock, between 15,000 and 20,000 head of livestock, between 20,000 and 25,000 head of livestock, between 25,000 and 30,000 head of livestock, between 30,000 and 35,000 head of livestock, between 35,000 and 40,000 head of livestock, between 40,000 and 45,000 head of livestock, between 45,000 and 50,000 head of livestock, between 50,000 and 60,000 head of livestock, between 60,000 and 70,000 head of livestock, between 70,000 and 80,000 head of livestock, between 80,000 and 90,000 head of livestock, between 90,000 and 100,000 head of livestock or more. Furthermore, each of plurality of doors 54b and 58b can comprise any suitable dimensions to accommodate a desired size of vehicle. In the embodiment shown in FIGS. 2A-2H, each of plurality of doors 54b and 58b are between 10 and 30 feet in length and between 10 and 30 feet in height; however, in other embodiments, each of plurality of doors 54b and 58b can comprise a length of less than 10 feet or greater than 30 feet, or a height of less than 10 feet or greater than 30 feet.

Structure 10b further comprises a plurality of fans positioned on first side 22b (e.g., coupled to first side wall 26b) such that, if the plurality of fans are activated, air is removed from structure 10b by the plurality of fans (e.g., by pulling air from within structure 10b toward first side wall 26b). Structure 10b can further comprise a plurality of fans positioned on second side 30b (e.g., coupled to second side wall 34b) such that, if the plurality of fans are activated, air is removed from structure 10b by the plurality of fans (e.g., by pulling air from within structure 10b toward second side wall 34b). For example, fans 62c depicted in FIG. 3A are examples of fans that can positioned along first side 22b and/or second side 30b of structure 10b.

Structure 10b also includes rows of housing pens 63b. Each housing pen 64b in a row of housing pens 63b is configured to accommodate a head of livestock such that the head of livestock can rest and/or sleep in housing pen 64b. In some embodiments, a head of livestock can eat and/or drink in each housing pen 64b in a row of housing pens 63b.

In the embodiment shown in FIGS. 2A-2H, structure 10b is configured to accommodate at least one milking parlor, such as at least one herringbone parlors, at least one parallel parlor, at least one rotary parlor, and the like. For example, in the embodiment shown, structure 10b comprises first milking parlor 66b (e.g., a rotary parlor) disposed within structure 10b and second milking parlor 70b (e.g., a rotary parlor) disposed within structure 10b. More specifically, first milking parlor 66b and second milking parlor 70b are disposed between first side 22b and second side 30b of structure 10b, such as between a first row of housing pens 63b and a second row of housing pens 63b, as depicted in FIGS. 2A-2H. In the embodiment shown, front wall 42b, back wall 50b, side wall 26b, side wall 34b are sized and positioned to accommodate first milking parlor 66b and second milking parlor 70b. In other embodiments, front wall 42b, back wall 50b, side wall 26b, side wall 34b can be sized and/or positioned to accommodate less than two milking parlors (e.g., one milking parlor), or greater than two milking parlors (e.g., three, four, five, or more milking parlors). Further, in the embodiment shown in FIGS. 2A-2H, milking parlor 66b and milking parlor 70b are positioned between a first row of housing pens 63b and a second row of housing pens 63b such that milking parlor 66b and milking parlor 70b are disposed within a portion of structure 10b that is configured to accommodate livestock apart from use of milking parlors 66b and 70b (e.g., milking parlor 66b and milking parlor 70b are disposed within the same general structure as that in which livestock can sleep, eat, or drink). As depicted in FIGS. 2E-2F, floor 14b can comprise a gradient that extends toward milking parlors 66b and 70b. Floor 14a can additionally comprise a gradient in other parts of structure 10b. Floor 14b can comprise any desired gradient, which can depend, for example, on type of livestock bedding, the waste management system(s), the gradient of the ground beneath floor 14b, and other factors. For example, a structure that has compost bedding may have a floor at least a portion of which is a lesser gradient, and a structure that has sand bedding may have a floor at least a portion of which is a greater gradient. As another example, a structure with a flush waste management system may have a floor at least a portion of which is a greater gradient, and a structure with a dry scrape, mechanic scrape, and/or auto scrape waste management system may have a floor at least a portion of which is a lesser gradient. For example, in the embodiment shown, floor 14b can comprise a gradient of 2.5 to 3 degrees (e.g., is angled at 2.5 to 3 degrees with respect to ground beneath floor 14b); however, in other embodiments, floor 14b can comprise any suitable gradient that is less than 2.5 degrees (e.g., 2 degrees, 1.5 degrees, 1 degrees, 0.5 degrees, or less) or greater than 3 degrees (e.g., 3.5 degrees, 4 degrees, 4.5 degrees, 5 degrees, or more). In some embodiments, first portions of floor 14b can comprise a first gradient, and second portions of floor 14b (e.g., beneath first portions of floor 14b) can comprise a second gradient.

Structure 10b further comprises basement 78b positioned beneath floor 14b of structure 10b and configured to be accessible by at least one vehicle (e.g., one, two, three, four, five, six, or more vehicles) such that milk from livestock in first milking parlor 66b and/or second milking parlor 70b can pass to the at least one vehicle (e.g., directly or indirectly from one or more milk storage tanks) if livestock are milked in first milking parlor 66b and/or second milking parlor 70b. Distinguishable from a milking parlor basement immediately below a milking parlor, but above a floor of a structure, basement 78b is positioned beneath floor 14b of structure 10b. For example, basement 78b can be configured to accommodate at least a portion of at least one vehicle (e.g., part or all of at least one vehicle can enter basement 78b such that milk can pass to the vehicle). For example, milk can pass from first milking parlor 66b and/or second milking parlor 70b to the at least one vehicle without passing into a milk storage tank (e.g., after washing, cooling, purification, and/or filtration). In the embodiment shown, at least a portion of first milking parlor 66b and second milking parlor 70b are positioned above basement 78b such that gravity can assist in enabling milk to pass from first milking parlor 66b and second milking parlor 70b into basement 78b and into one or more milk storage tanks and/or at least one vehicle. One or more pumps can also assist in enabling milk to pass from first milking parlor 66b and second milking parlor 70b into basement 78b and into one or more milk storage tanks and/or at least one vehicle. In the embodiment shown, six doors 80b permit access to basement 78b by six vehicles; however, in other embodiments, more (e.g., seven, eight, nine, or ten) or less (e.g., five, four, three, two, or one) than six doors can permit access to basement 78b. For example, basement 78i of structure 10i depicted in FIG. 9 is one example of a basement layout, where at least a portion of the basement is a milk room. Pumps 79i assist in enabling milk to pass from one or more milking parlors into basement 78i. Vehicles can enter basement 78i through doors 80i such that milk can be passed into the vehicles. Milk wash systems, cooling systems, purification systems, filtration systems, vacuum systems, and related processes and systems can also be at least partially located in basement 78i, as depicted.

Structure 10b additionally comprises opening 82b in roof 18b. Opening 82b is configured to permit air to enter structure 10b through roof 18b (e.g., which air can eventually be removed from structure 10b by a plurality of fans). Opening 82b extends substantially parallel to first side 22b and second side 30b and can extend for at least a portion of the length of first side 22b and second side 30b (e.g., 1%, 5%, 10%, 15%, 30%, 45%, 60%, 75%, 90%, the length of first side 22b and second side 30b, or more). In the embodiment shown, opening 82b comprises a width from 20 feet to 40 feet (e.g., 28 feet); however, in other embodiments, opening 82b comprises a width of less than 20 feet (e.g., 15 feet, 10 feet, or less) or greater than 40 feet (e.g., 45 feet, 50 feet, or more). Structure 10b can further comprise one or more fans positioned near opening 82b such that air from outside structure 10b is further encouraged to enter structure 10b. Structure 10b also comprises steeple 86b coupled to roof 18b and configured to discourage fluid from entering structure 10b through opening 82b while permitting air to enter structure 10b through opening 82b. One or more partitions 90b (e.g., curtains, louvers, and the like) can be coupled to steeple 86b to assist in discouraging fluid from entering structure 10b through opening 82b. Partitions 90a can be rigid or flexible, and can be adjustable (manually or automatically). In the embodiment shown, first milking parlor 66b and second milking parlor 70b are disposed within structure 10b and positioned such that at least a portion of first milking parlor 66b and second milking parlor 70b is beneath at least a portion of opening 82b to permit air entering structure 10b through opening 82b to engage any livestock in first milking parlor 66b and/or second milking parlor 70b.

Structure 10b can further comprise a commodity basement, such as commodity basement 94d depicted in FIGS. 4A-4D. The commodity basement can be positioned beneath floor 14b of structure 10b. Structure 10b can be configured to accommodate at least a portion of at least one vehicle (e.g., such as vehicle 98d) such that, if a vehicle passes into structure 10b (e.g., on floor 14b over the commodity basement), the vehicle can dispose commodity in the commodity basement from floor 14b of structure 10b (e.g., commodity can be disposed in commodity cells similar to commodity cells 102d depicted in FIGS. 4A-4D). Similarly to that depicted in FIGS. 4A-4D, floor 14b can comprise a gradient to enable the at least one vehicle to be positioned over the commodity basement.

Figure 3E:
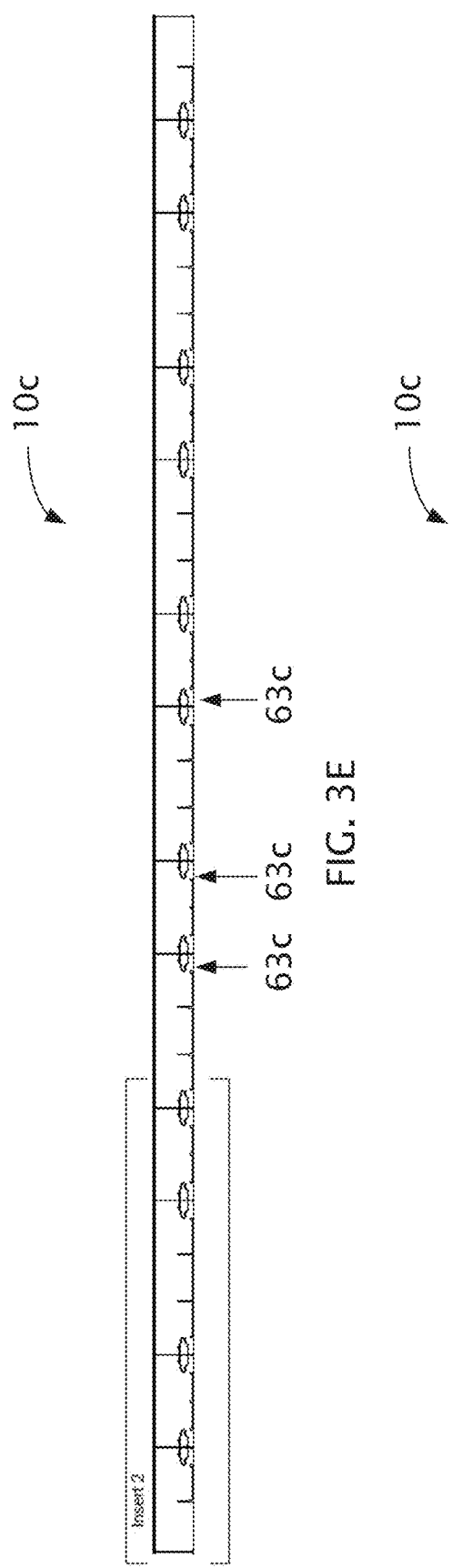
Figure 3F:
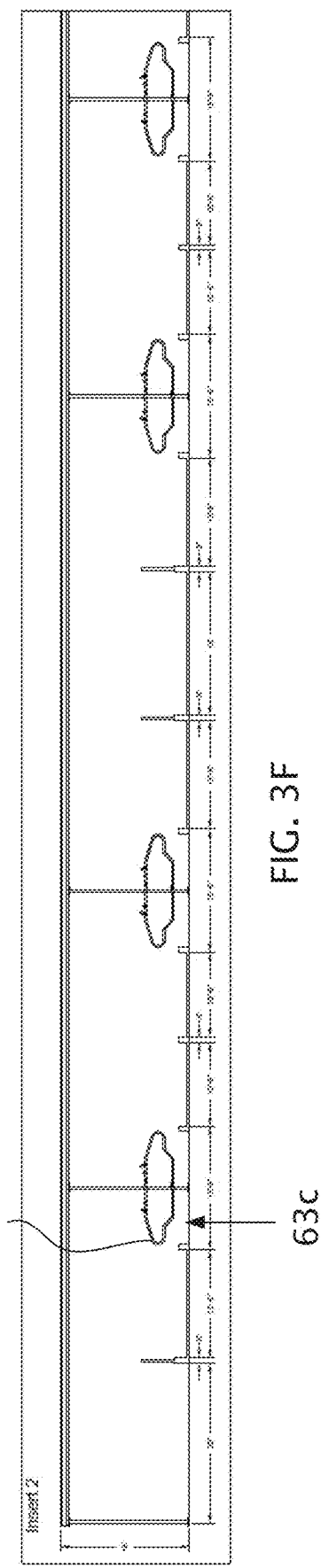
Figure 4A:
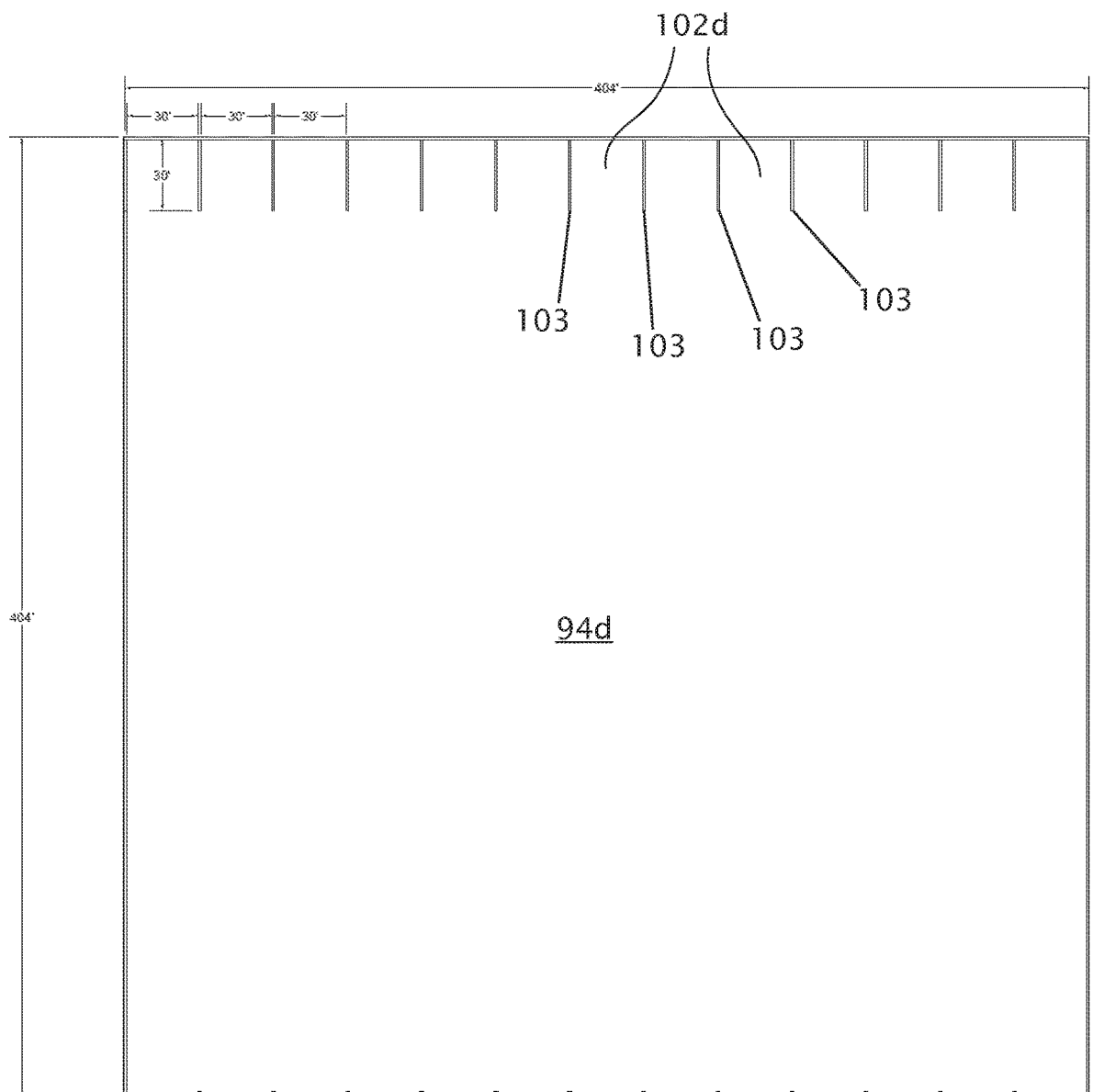
FIGS. 4A-4D depict various views of portions of another embodiment of the present structures that comprises a commodity basement.
Figure 4B:
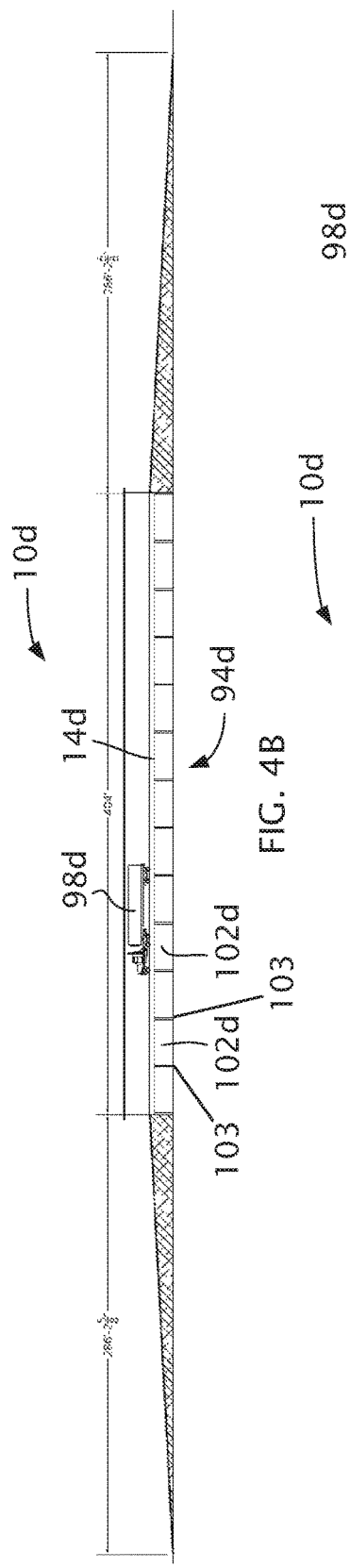
Figure 4C:
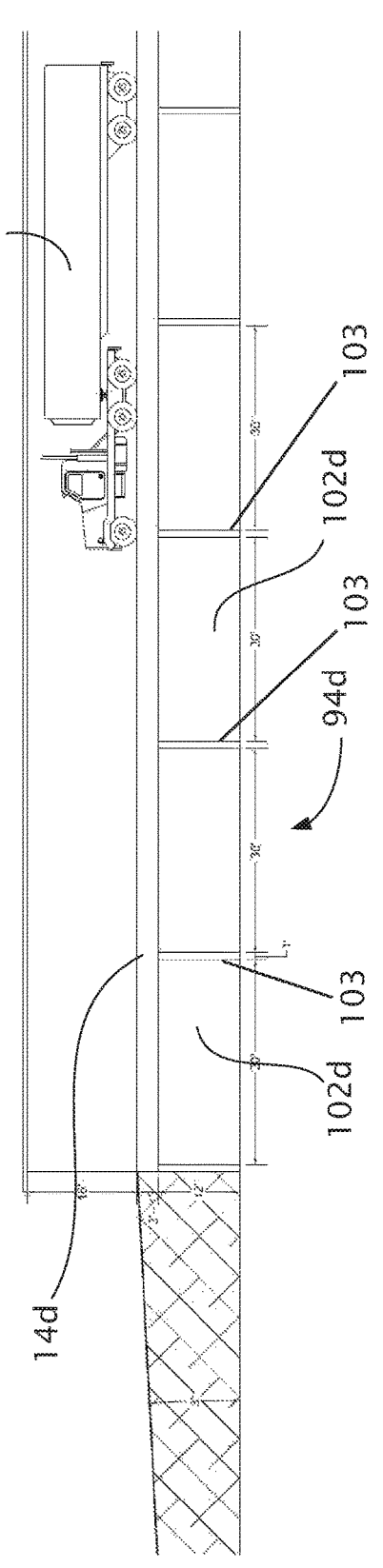
Figure 4D:
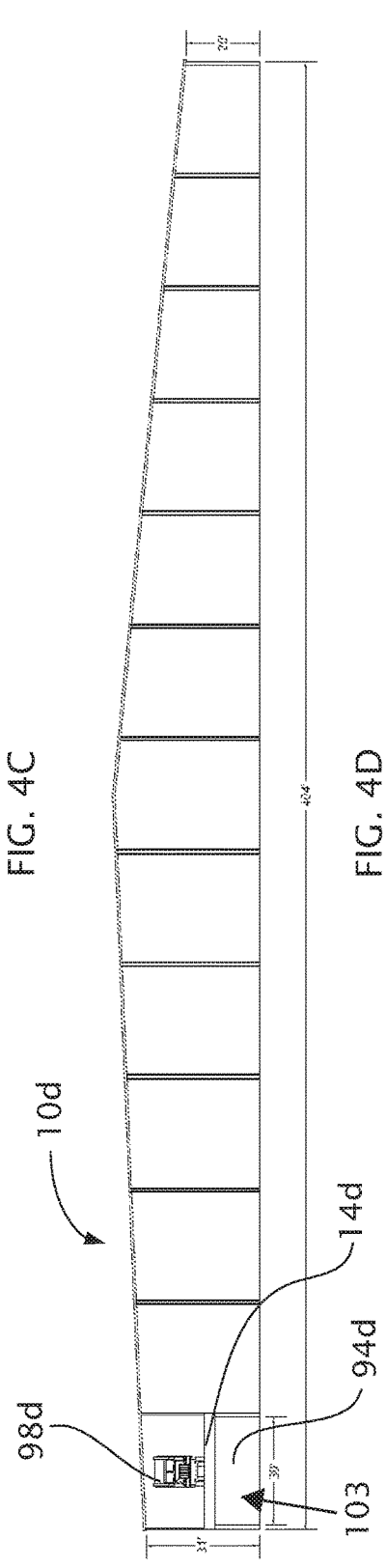

FIGS. 3A-3F depicts portions of structure 10c, which is another embodiment of the present structures. FIG. 3A depicts an example of plurality of fans 62c that can be disposed along any side of the present structures and configured to remove air from the structures. Also depicted in FIGS. 3A, 3C, and 3D is an example of a gradient of floor 14c, which comprises an angle with respect to ground beneath floor 14c. FIG. 3B depicts doors 58c through which vehicles can enter and/or exit structure 10c. Furthermore, examples of a row of housing pens 63c and individual housing pens 64b are depicted in FIGS. 3D-3F. Any of the various embodiments of the present structures can comprise any feature described with respect to the other embodiments. For example, structure 10c can comprise any feature of structure 10a or structure 10b. Similarly, structure 10a can comprise any feature of structure 10b and structure 10c. Similarly, structure 10b can comprise any feature of structure 10a and structure 10c.

The present disclosure also includes modifying and/or supplementing existing structures to comprise one or more features described in this disclosure. Any existing structure can be modified and/or supplemented with any of the one or more features described with respect to the other embodiments, such as those depicted in FIGS. 1A-10E or described with respect thereto.

Figure 11:
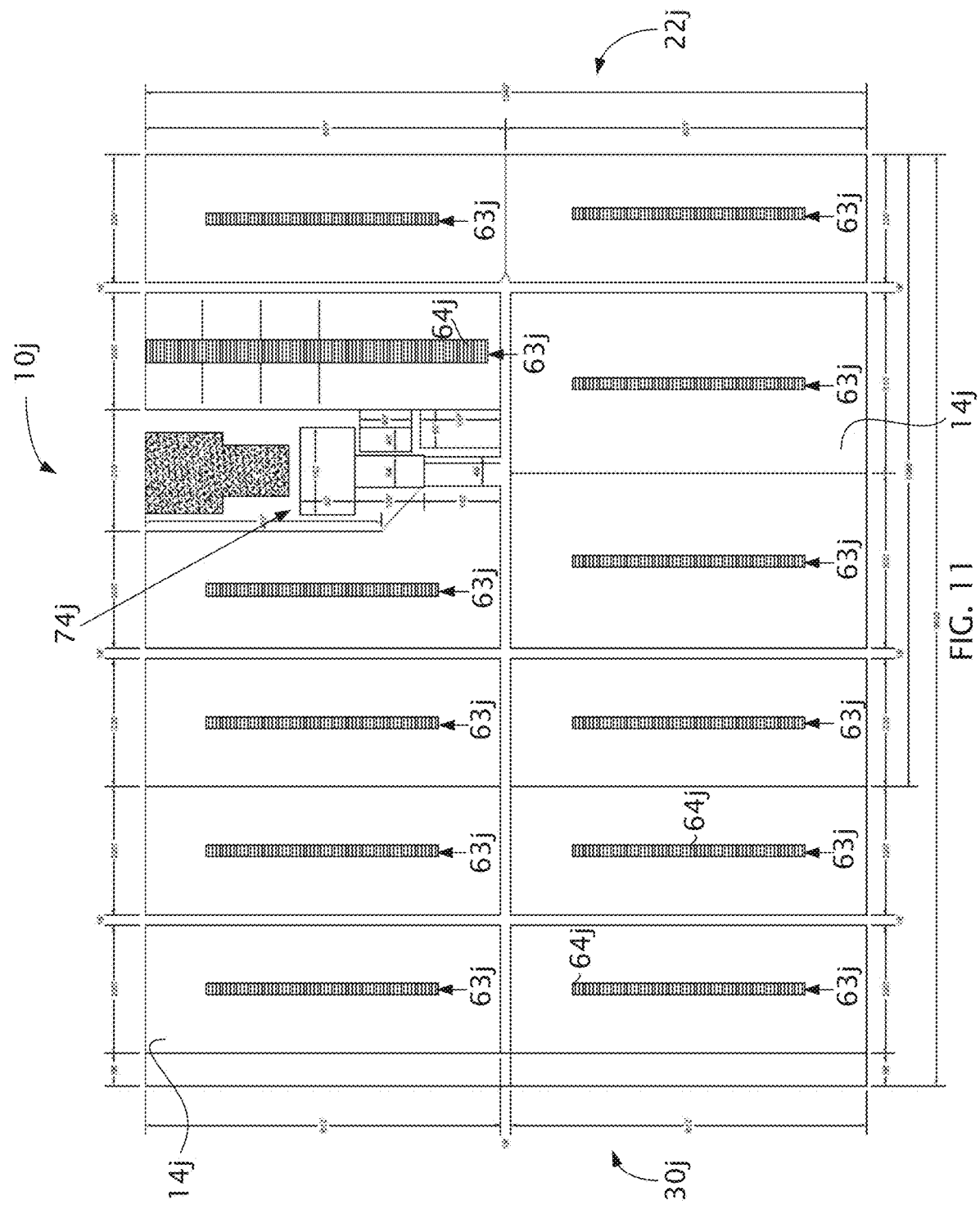
FIG. 11 depicts one embodiment of an open lot structure, which can be modified and/or supplemented to comprise one or more features of this disclosure.

For example, FIG. 11 depicts existing open lot structure 10j. As previously discussed, an open lot structure can include one or more housing and/or holding pens for livestock, a fence, a feed manger, and/or water troughs, among other things. In some environments, an open lot can include partitions (e.g., windbreaks or curtains) to provide protection for livestock. In other environments, an open lot can include a covering (e.g., steel shades) to provide protection from heat for the livestock. Some open lots may include both windbreaks and shading structures.

In the embodiment shown in FIG. 11, open lot structure 10j comprises floor 14j. As described above, floor 14j can comprise one surface or a combination of surfaces, such as, for example, a natural surface (e.g., dirt) and/or a man-made surface (e.g., concrete). Open lot structure 10j further comprises rows of housing pens 63j. Each housing pen 64j in a row of housing pens 63j is configured to accommodate a head of livestock such that the head of livestock can rest and/or sleep in housing pen 64j. In some embodiments, a head of livestock can eat and/or drink in each housing pen 64j in a row of housing pens 63j. Open lot structure 10j does not comprise a roof over the rows of housing pens 63j. Open lot structure 10j further comprises milking parlor portion 74j, which is sized and positioned to accommodate at least one milking parlor (e.g., one, two, three, four, five, or more milking parlors).

Figure 12A:
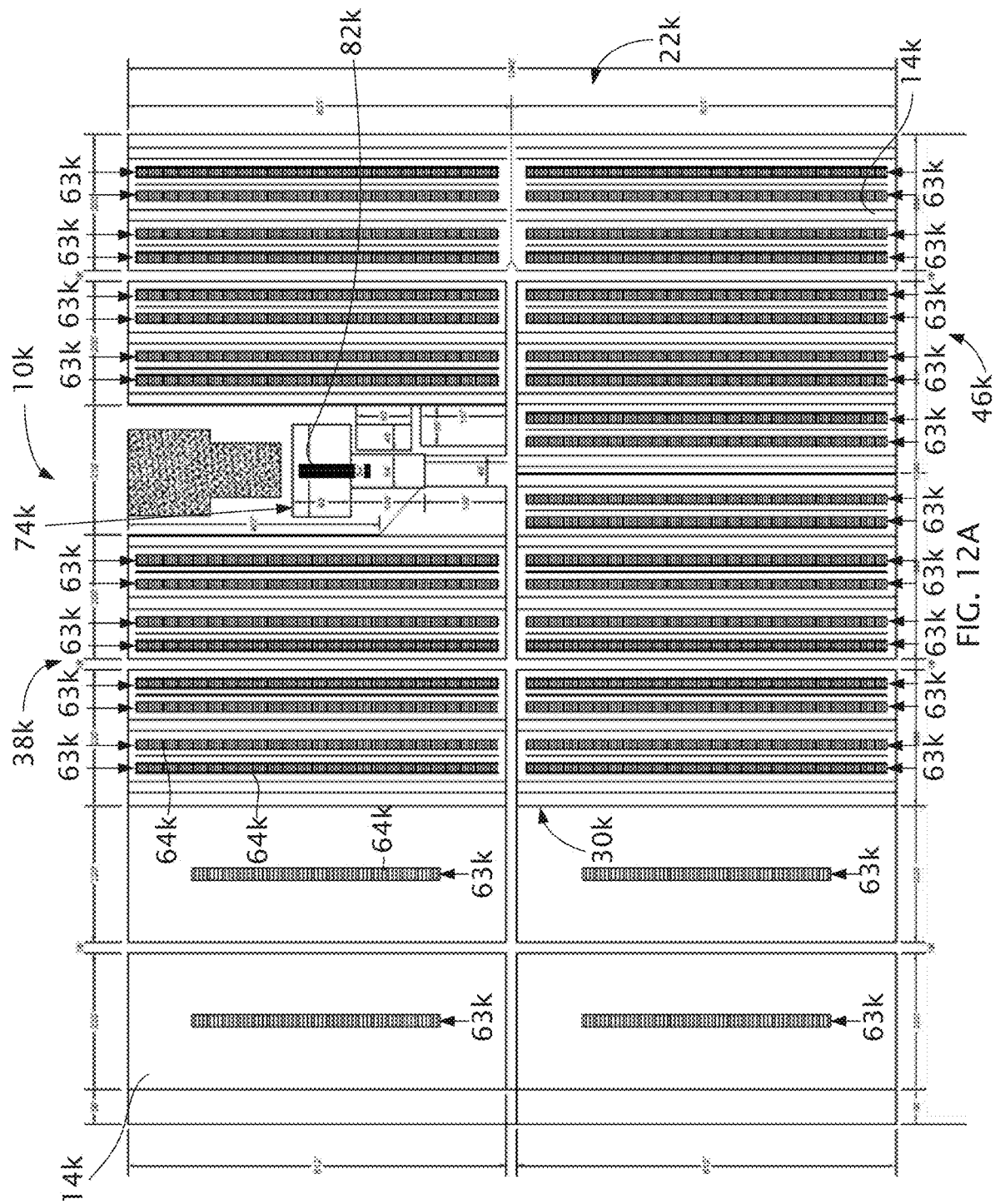
FIGS. 12A-12C depict one embodiment of the present structures (or portions thereof) in which the open lot structure of FIG. 11 was modified and/or supplemented to comprise one or more features of this disclosure.
Figure 12B:
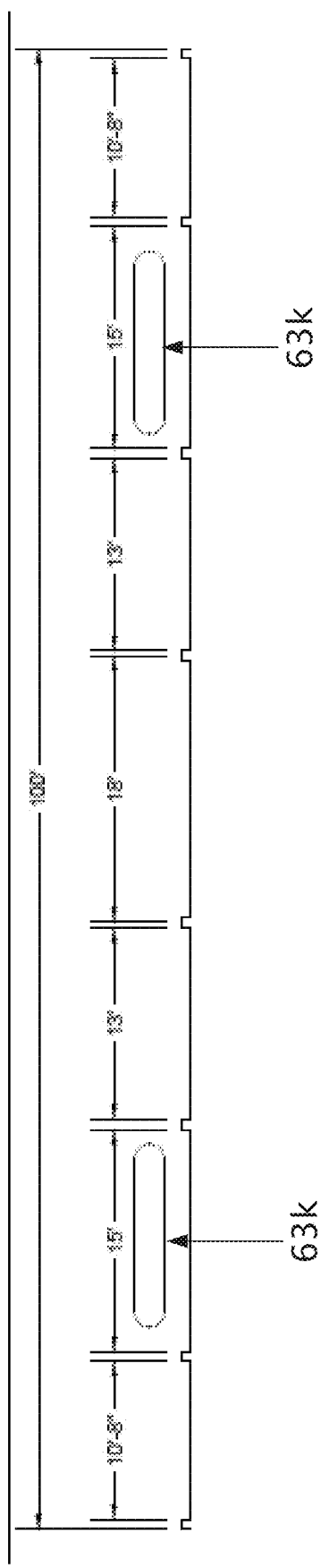
Figure 12C:
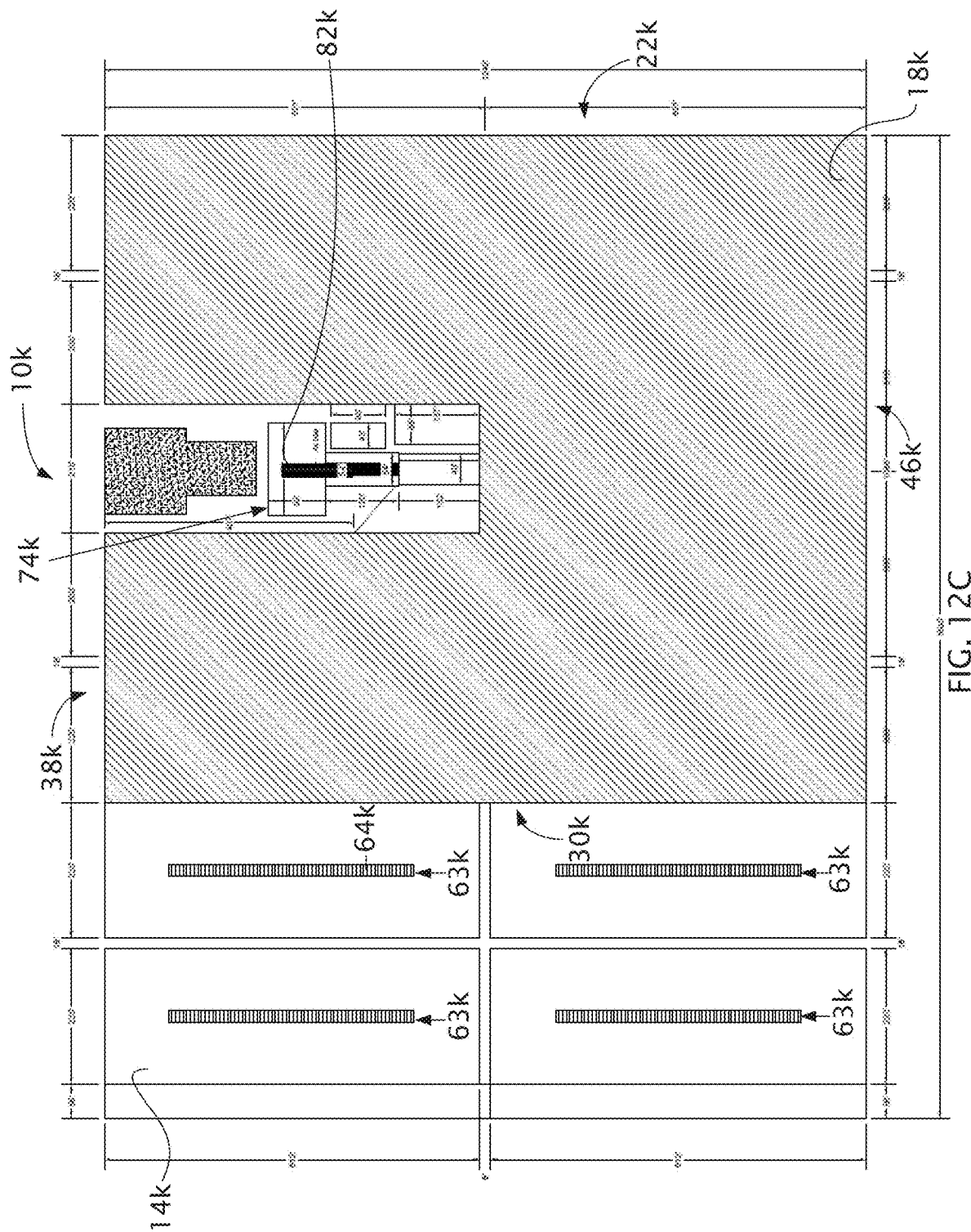

FIGS. 12A-12C depict one embodiment of the present structures 10k (and portions thereof) in which the open lot structure 10j of FIG. 11 was modified and/or supplemented to comprise one or more features of this disclosure. In other words, at least a portion of structure 10k, such as, for example, floor 14k, milking parlor portion 74k, and/or housing pens 64k, existed prior to other features of structure 10k that are described below. For example, structure 10k comprises floor 14k and rows of housing pens 63k, as described above. Furthermore, additional housing pens 64k were installed to create additional rows of housing pens 63k (e.g., to accommodate additional head of livestock). FIG. 12B depicts another view of rows of housing pens 63k. Furthermore, structure 10k comprises milking parlor portion 74k, which is sized and positioned to accommodate at least one milking parlor (e.g., one, two, three, four, five, or more milking parlors), as described above.

In the embodiment shown, roof 18k, at least a portion of which is a flat roof, has been installed over some of rows of housing pens 63k. In the embodiment shown, structure 10k includes first side 22k, second side 30k, front side 38k, and back side 46k, each of which can be configured to support a portion of roof 18k with, for example, sidewalls/supporting structures. For example, first side 22k can comprise a first sidewall configured to support a portion of roof 18k, and second side 30k can comprise a second sidewall configured to support a portion of roof 18k. Any of first side 22k, second side 30k, front side 38k, and back side 46k can comprise one or more doors that permit entry and exit from structure 10k and are configured to accommodate at least a portion of a vehicle such that at least a portion of a vehicle can enter structure 10k through a door and exit structure 10k through a door. Each door can comprise any suitable dimensions to accommodate a desired size of vehicle, such as, for example, between 10 and 30 feet in length and between 10 and 30 feet in height, and in other embodiments, a length of less than 10 feet or greater than 30 feet, and/or a height of less than 10 feet or greater than 30 feet. Roof 18k can be constructed and/or installed as described in this disclosure. For example, roof 18k can be a flat roof, or a flat roof in combination with any other type of roof described in this disclosure, including a gable roof. In some embodiments, a majority (e.g., greater than 50%, such as 55%, 60%, 65%, 70%, 75%, or more) of roof 18k is substantially parallel to floor 14k. In some embodiments, less than a majority (e.g., 50%, 45%, 40%, 35%, or less) of roof 18k can be substantially parallel to floor 14k. In some embodiments, roof 18k comprises a pitch from zero to 12:12. In some embodiments, roof 18k can be substantially non-parallel to ground beneath floor 14k. In some embodiments, a majority (e.g., 51%, 60%, 70%, 80%, or more) of roof 18k occupies substantially the same plane (e.g., whether parallel or non-parallel to floor 14k and/or ground beneath floor 14k). As an example, roof 18e depicted in FIGS. 5A-5B, which is at least partially supported by supporting structures 20e and which comprises ¼ inch thermoplastic polyolefin (TPO) roofing, ⅝ inch oriented strand board (OSB), R-18 insulation, 8 inch cold-rolled purlin, a wide flange beam, and 1.5 inch R panel can be used with the present structures. As another example, roof 18f depicted in FIGS. 6A-6B, which is at least partially supported by supporting structures 20f and which comprises ¼ inch thermoplastic polyolefin (TPO) roofing, ⅝ inch oriented strand board (OSB), 8 inch cold-rolled purlin, a wide flange beam, and 1.5 inch R panel can be used with the present structures. As still another example, roof 18g depicted in FIGS. 7A-7D, which is at least partially supported by supporting structures 20g and which comprises ¼ inch thermoplastic polyolefin (TPO) roofing, ⅝ inch oriented strand board (OSB), R-18 insulation, 8 inch cold-rolled purlin, a joist, and 1.5 inch R panel can be used with the present structures. As a further example, roof 18h depicted in FIGS. 8A-8D, which is at least partially supported by supporting structures 20h and which comprises ¼ inch thermoplastic polyolefin (TPO) roofing, ⅝ inch oriented strand board (OSB), metal decking, R-18 insulation, a joist, and 1.5 inch R panel can be used with the present structures. The materials and dimensions to construct a roof of the present structures can be altered or supplemented to provide a roof that is suitable in a given environment (e.g., cold, hot, mild), a roof that is a suitable strength, a roof that is a suitable surface area, a roof that is a suitable pitch, and the like. Roof 18k can be supported by plurality of supporting structures, which can comprise any suitable material, such as steel. If roof 18k is substantially parallel to floor 14k, supporting structures can comprise substantially the same length. Roof 18k can be positioned non-parallel to ground beneath floor 14k at any desired angle to, for example, permit precipitation (e.g., rain, snow, and the like) to drain from roof 18k. In some embodiments, floor 14k is substantially parallel to ground beneath structure 10k; and, in other embodiments, floor 14k is non-parallel to ground beneath structure 10k, and can comprise a gradient (e.g., can extend at an angle with respect to ground beneath structure 10k and/or at an angle with respect to another portion of floor 14k). As with the pitch of roof 18k, a gradient of floor 14k (or a portion thereof) can be selected based on topography, enabling the present structures to be located on previously unsuitable topography.

Structure 10k (and, more specifically, first side 22k, second side 30k, front side 38k, and back side 46k) can comprise any suitable dimensions to accommodate a desired number of livestock. Furthermore, structure 10k can be modified and/or supplemented such that a length and/or a width of an existing structure can be extended to accommodate additional livestock. In the embodiment shown in FIGS. 12A and 12C, front side 38k and back side 46k are 1,086 feet in length; however, in other embodiments front side 38k and/or back side 46k can comprise less than 1,086 feet (e.g., 1,000 feet, 900 feet, 800 feet, 700 feet, 600 feet, or less) or greater than 1,086 feet (e.g., 1,100 feet, 1,200 feet, 1,300 feet, 1,400 feet, 1,500 feet, 1,600 feet, 1,700 feet, 1,800 feet, 1,900 feet, 2,000 feet, or more). Similarly, first side 22k and second side 30k are 1,242 feet in length; however, in other embodiments first side 22k and/or second side 30k can comprise less than 1,242 feet (e.g., 1,200 feet, 1,100 feet, 1,000 feet, 900 feet, 800 feet, or less) or greater than 1,242 feet (e.g., 1,300 feet, 1,400 feet, 1,500 feet, 1,600 feet, 1,700 feet, 1,800 feet, 1,900 feet, 2,000 feet, or more). For example, structure 10k can be sized to accommodate between zero and 200 head of livestock, between 200 and 500 head of livestock, between 500 and 1,000 head of livestock, between 1,000 and 4,000 head of livestock, between 4,000 and 8,000 head of livestock, between 8,000 and 10,000 head of livestock, between 10,000 and 15,000 head of livestock, between 15,000 and 20,000 head of livestock, between 20,000 and 25,000 head of livestock, between 25,000 and 30,000 head of livestock, between 30,000 and 35,000 head of livestock, between 35,000 and 40,000 head of livestock, between 40,000 and 45,000 head of livestock, between 45,000 and 50,000 head of livestock, between 50,000 and 60,000 head of livestock, between 60,000 and 70,000 head of livestock, between 70,000 and 80,000 head of livestock, between 80,000 and 90,000 head of livestock, between 90,000 and 100,000 head of livestock or more.

Structure 10k can further comprise a plurality of fans positioned on first side 22k (e.g., coupled to a first side wall) such that, if the plurality of fans are activated, air is removed from structure 10k by the plurality of fans (e.g., by pulling air from within structure 10k toward a first side wall). Structure 10k can further comprise a plurality of fans positioned on second side 30k (e.g., coupled to a second side wall) such that, if the plurality of fans are activated, air is removed from structure 10k by the plurality of fans (e.g., by pulling air from within structure 10k toward a second side wall). For example, fans 62c depicted in FIG. 3A are examples of fans that can used in structure 10k. Structure 10j can be modified and/or supplemented to comprise any suitable number of fans.

Structure 10k additionally comprises opening 82k in roof 18k. Structure 10j can be modified and/or supplemented to comprise opening 82k in roof 18k. Opening 82k is configured to permit air to enter structure 10k through roof 18k (e.g., which air can eventually be removed from structure 10k by a plurality of fans). Opening 82k extends substantially parallel to first side 22k and second side 30k and can extend for at least a portion of the length of first side 22k and second side 30k (e.g., 1%, 5%, 10%, 15% 30%, 45%, 60%, 75%, 90%, the length of first side 22k and second side 30k, or more). In the embodiment shown, opening 82k comprises a width of less than 54 feet (e.g., 50 feet, 40 feet, 30 feet, 20 feet, 10 feet, 5 feet, or less); however, in other embodiments, opening 82k comprises a width of less than 5 feet or equal to or greater than 54 feet. Structure 10k can further comprise one or more fans positioned near opening 82k such that air from outside structure 10k is further encouraged to enter structure 10k. Structure 10k can also comprise a steeple (e.g., similar to steeple 86a depicted in FIG. 1H) coupled to roof 18k and configured to discourage fluid from entering structure 10k through opening 82k while permitting air to enter structure 10k through opening 82k. One or more partitions (e.g., such as partitions 90a depicted in FIG. 1H), such as curtains, louvers, and the like, can be coupled to a steeple to assist in discouraging fluid from entering structure 10k through opening 82k. Partitions can be rigid or flexible, and can be adjustable (manually or automatically).

Structure 10k, and more specifically milking parlor portion 74k, is configured to accommodate at least one milking parlor, such as at least one herringbone parlors, at least one parallel parlor, at least one rotary parlor, and the like.

Milking parlor portion 74k and/or first side 22k, second side 30k, front side 38k, and/or back side 46k can be sized, modified, and/or supplemented to accommodate any number of milking parlors. One or more milking parlors can be positioned in structure 10k such that at least a portion of the one or more milking parlors is beneath at least a portion of opening 82k to permit air entering structure 10k through opening 82k to engage any livestock in the one or more milking parlors. Structure 10j can be modified and/or supplemented such that milking parlor portion 74k is positioned between rows of housing pens 63k, or such that milking parlor portion 74k is not positioned between rows of housing pens 63k (e.g., extending from a side of structure 10k). Floor 14k can have (or can be modified or supplemented to have) a gradient that extends into milking parlor portion 74k toward the milking parlor(s). Floor 14k can additionally comprise a gradient in other parts of structure 10k. Floor 14k can comprise any desired gradient, which can depend, for example, on type of livestock bedding, the waste management system(s), the gradient of the ground beneath floor 14k, and other factors. For example, a structure that has compost bedding may have a floor at least a portion of which is a lesser gradient, and a structure that has sand bedding may have a floor at least a portion of which is a greater gradient. As another example, a structure with a flush waste management system may have a floor at least a portion of which is a greater gradient, and a structure with a dry scrape, mechanic scrape, and/or auto scrape waste management system may have a floor at least a portion of which is a lesser gradient. For example, floor 14k can comprise a gradient of 2.5 to 3 degrees (e.g., is angled at 2.5 to 3 degrees with respect to ground beneath floor 14k); however, in other embodiments, floor 14k can comprise any suitable gradient that is less than 2.5 degrees (e.g., 2 degrees, 1.5 degrees, 1 degrees, 0.5 degrees, or less) or greater than 3 degrees (e.g., 3.5 degrees, 4 degrees, 4.5 degrees, 5 degrees, or more). In some embodiments, first portions of floor 14k can comprise a first gradient, and second portions of floor 14k (e.g., beneath first portions of floor 14k) can comprise a second gradient.

Structure 10k can further comprise (and, more specifically, can be modified or supplemented to comprise) a basement positioned beneath floor 14k of structure 10k and configured to be accessible by at least one vehicle (e.g., one, two, three, four, five, six, or more vehicles) such that milk from livestock in one or more milking parlors can pass to the at least one vehicle (e.g., directly or indirectly from one or more milk storage tanks) if livestock are milked in the one or more milking parlors. Distinguishable from a milking parlor basement immediately below a milking parlor, but above a floor of a structure, the basements of this disclosure can be positioned beneath floor 14k of structure 10k. For example, a basement can be configured to accommodate at least a portion of at least one vehicle (e.g., part or all of at least one vehicle can enter the basement such that milk can pass to the vehicle). For example, milk can pass from one or more milking parlors to the at least one vehicle without passing into a milk storage tank (e.g., after washing, cooling, purification, and/or filtration). At least a portion of one or more milking parlors can be positioned above the basement such that gravity can assist in enabling milk to pass from the one or more milking parlors into the basement and into one or more milk storage tanks and/or at least one vehicle. One or more pumps can also assist in enabling milk to pass from the one or more milking parlors into the basement and into one or more milk storage tanks and/or at least one vehicle. Milk wash systems, cooling systems, purification systems, filtration systems, vacuum systems, and related processes and systems can also be at least partially located in the basement.

Structure 10k can further comprise (and, more specifically, can be modified or supplemented to comprise) a commodity basement, similar to commodity basement 94d depicted in FIGS. 4A-4D. The commodity basement can be positioned beneath floor 14k of structure 10k. Structure 10k can be configured to accommodate at least a portion of at least one vehicle such that, if a vehicle passes into structure 10k (e.g., on floor 14k over the commodity basement), the vehicle can dispose commodity in the commodity basement from floor 14k of structure 10k (e.g., commodity can be disposed in commodity cells similar to commodity cells 102d depicted in FIGS. 4A-4D). Similarly to that depicted in FIGS. 4A-4D, floor 14k can comprise a gradient to enable the at least one vehicle to be positioned over the commodity basement.

FIGS. 13A-14B depict another example of modifying and/or supplementing existing structures to comprise one or more features described in this disclosure. As above, any existing structure can be modified and/or supplemented with any of the one or more features described with respect to the other embodiments, such as those depicted in FIGS. 1A-10E or described with respect thereto.

Figure 13A:
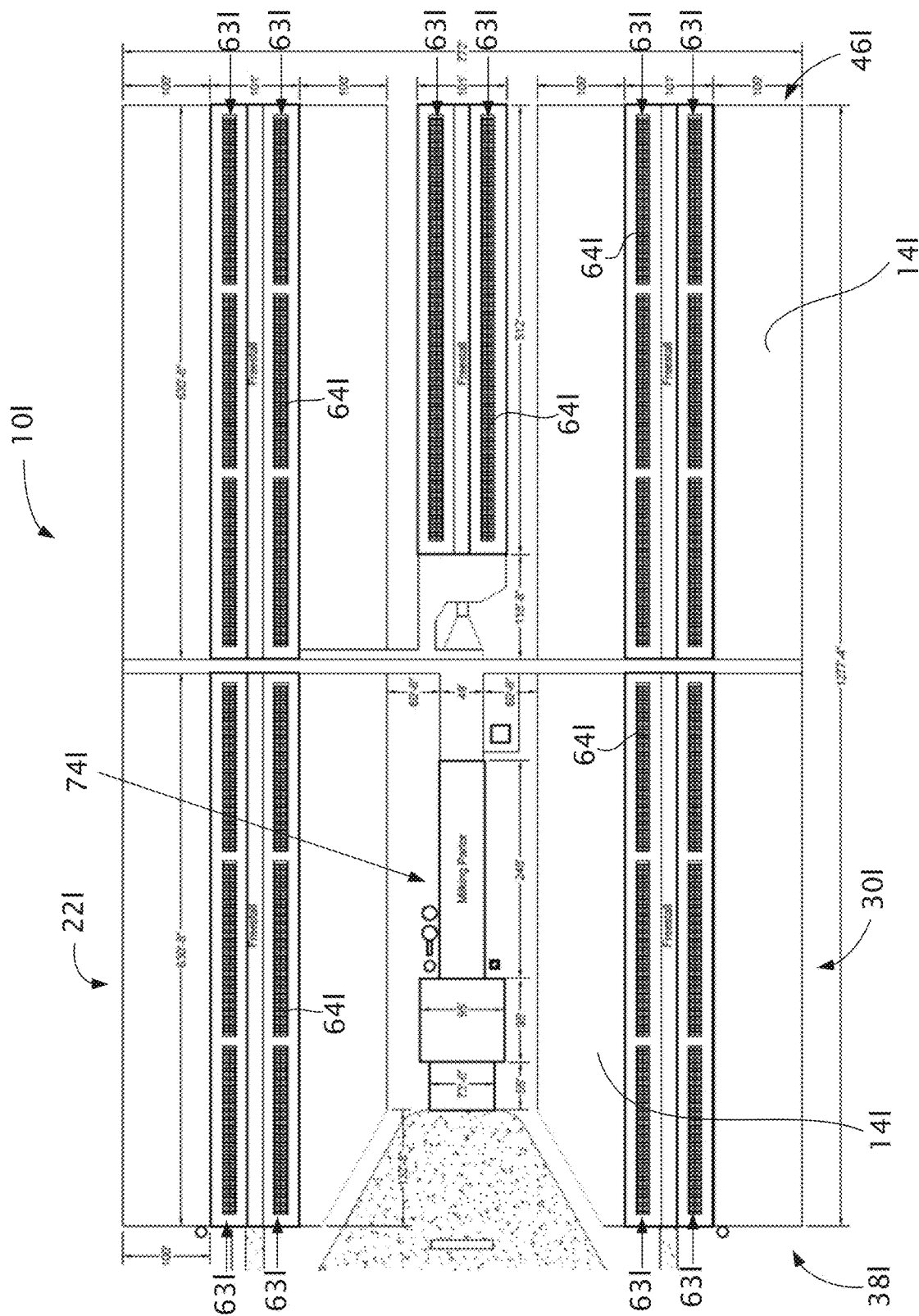
FIGS. 13A-13B depict one embodiment of an existing structure, which can be modified and/or supplemented to comprise one or more features of this disclosure.
Figure 13B:
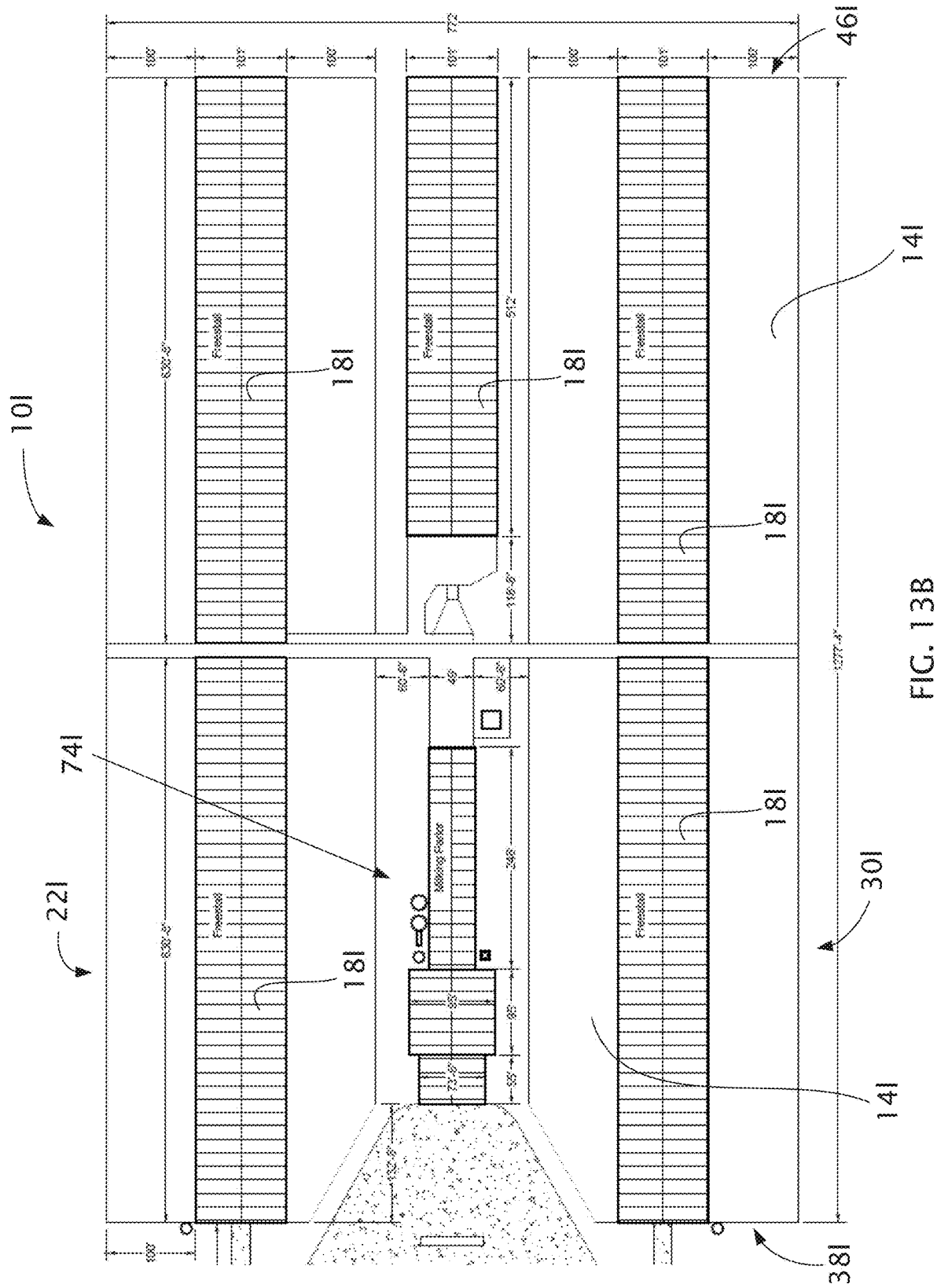

For example, FIG. 13A-13B depicts existing structure 10l comprising floor 14l. As described above, floor 14l can comprise one surface or a combination of surfaces, such as, for example, a natural surface (e.g., dirt) and/or a man-made surface (e.g., concrete). Structure 10l further comprises rows of housing pens 63l. Each housing pen 64l in a row of housing pens 63l is configured to accommodate a head of livestock such that the head of livestock can rest and/or sleep in housing pen 64l. In some embodiments, a head of livestock can eat and/or drink in each housing pen 64l in a row of housing pens 63l. Structure 10l does not comprise a roof over the rows of housing pens 63l. Structure 10l further comprises milking parlor portion 74l, which is sized and positioned to accommodate at least one milking parlor (e.g., one, two, three, four, five, or more milking parlors). Structure 10l further comprises gabled roof 18l, which is depicted in FIG. 13B.

Figure 14A:
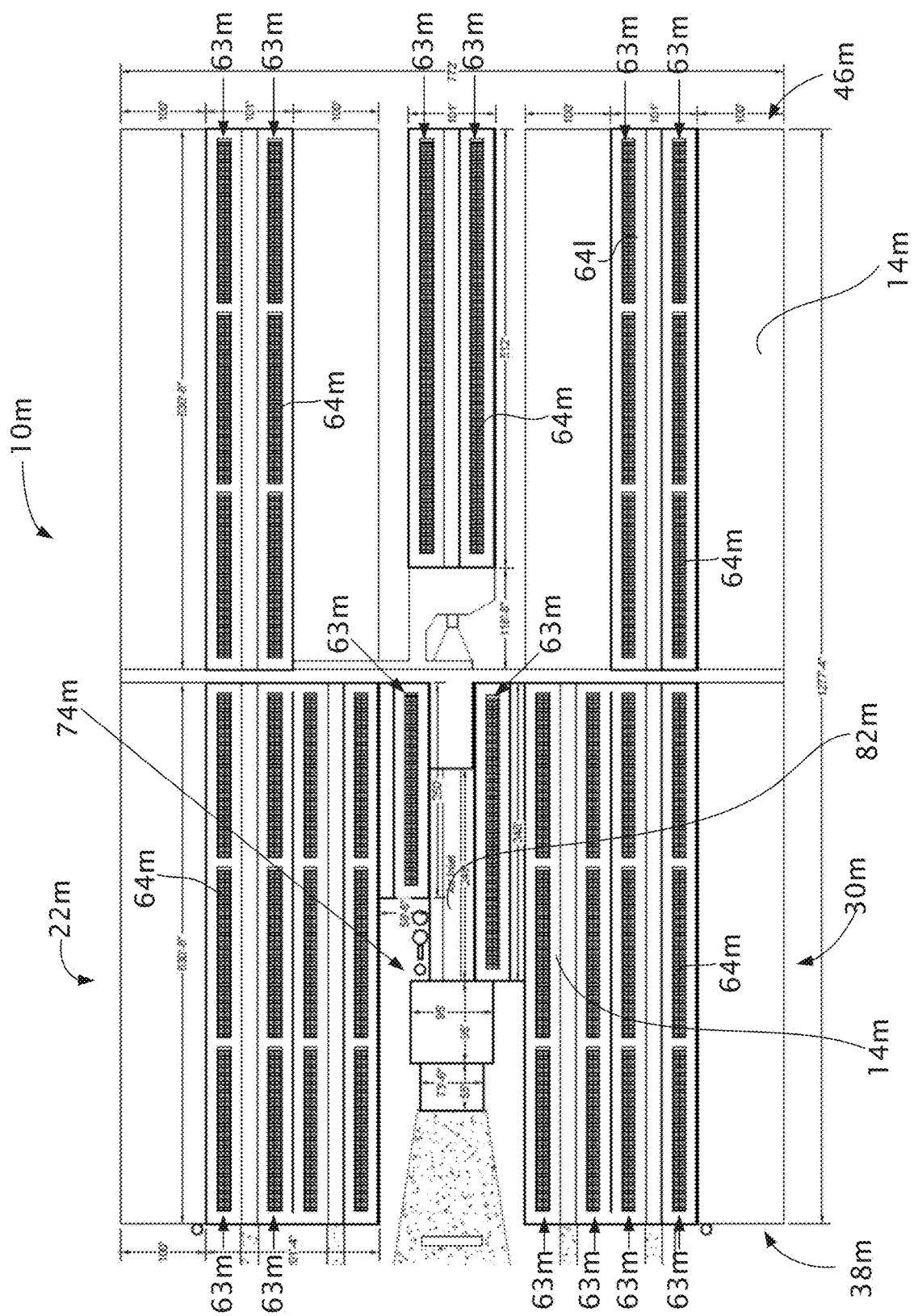
FIGS. 14A-14B depict of embodiment of the present structures in which the existing structure of FIGS. 13A-13B was modified and/or supplemented to comprise one or more features of this disclosure.
Figure 14B:
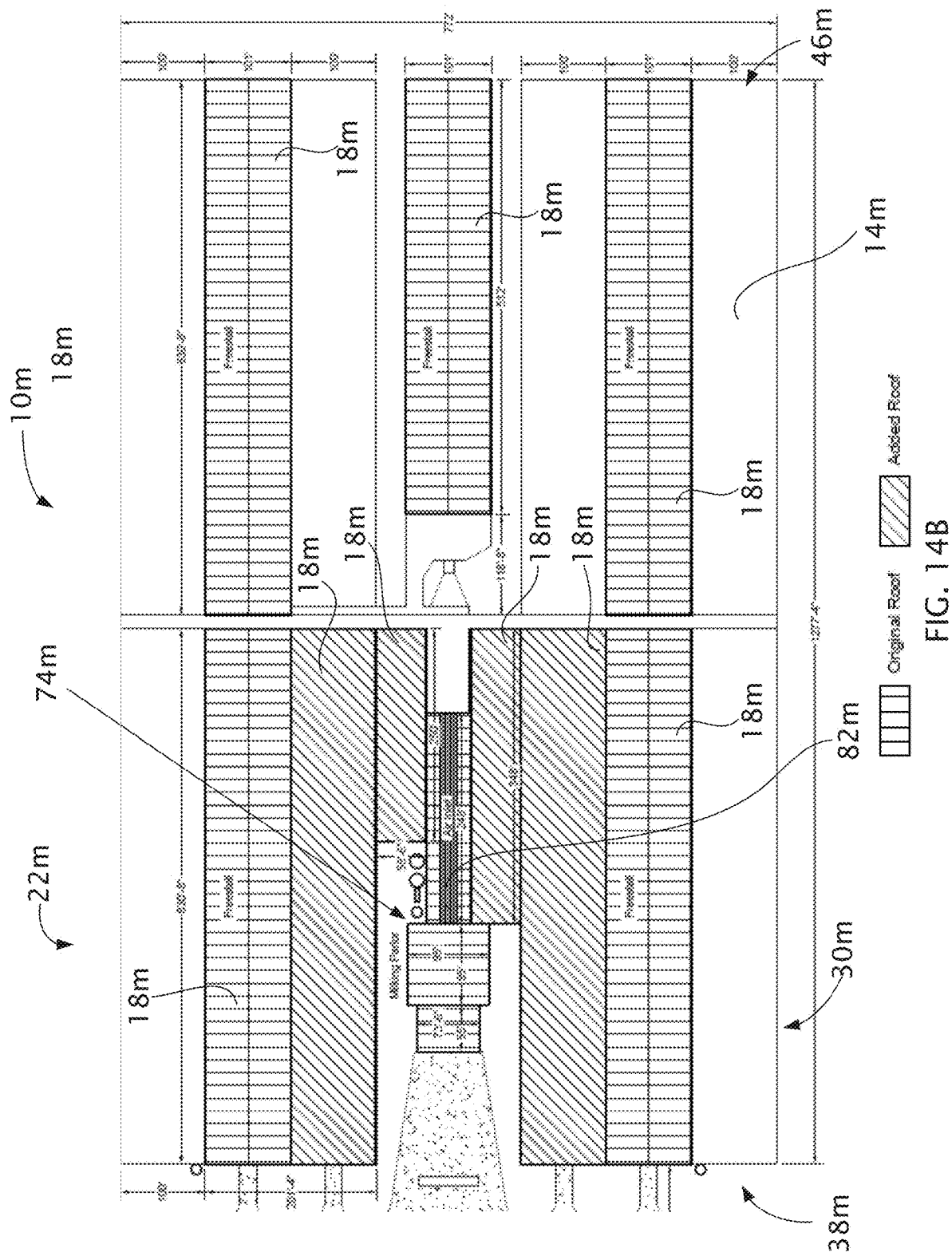

FIGS. 14A-14B depict one embodiment of the present structures 10m in which the structure 10l of FIGS. 13A-13B was modified and/or supplemented to comprise one or more features of this disclosure. In other words, at least a portion of structure 10l, such as, for example, floor 14l, milking parlor portion 74l, housing pens 64l, and gabled roof 18l, existed prior to other features of structure 10m that are described below. For example, structure 10m comprises floor 14m, rows of housing pens 63m, milking parlor portion 74m, and gabled roof 18m, which are substantially similar to floor 14l, milking parlor portion 74l, rows of housing pens 63l, and gabled roof 18l depicted in FIGS. 13A-13B. Furthermore, additional housing pens 64m were installed to create additional rows of housing pens 63m (e.g., to accommodate additional head of livestock). Structure 10m comprises milking parlor portion 74k, which is sized and positioned to accommodate at least one milking parlor (e.g., one, two, three, four, five, or more milking parlors), as described above.

In the embodiment shown, roof 18m has been installed over rows of housing pens 63m. Additional roof 18m is represented with diagonal lines in FIG. 14B to distinguish it from gabled roof 18m. In the embodiment shown, structure 10m includes first side 22m, second side 30m, front side 38m, and back side 46m, each of which can be configured to support a portion of roof 18*m* with, for example, sidewalls/supporting structures. For example, first side 22*m* can comprise a first sidewall configured to support a portion of roof 18*m*, and second side 30*k* can comprise a second sidewall configured to support a portion of roof 18*m*. Any of first side 22*m*, second side 30*m*, front side 38*m*, and back side 46*m* can comprise one or more doors that permit entry and exit from structure 10*m* and are configured to accommodate at least a portion of a vehicle such that at least a portion of a vehicle can enter structure 10*m* through a door and exit structure 10*m* through a door. Each door can comprise any suitable dimensions to accommodate a desired size of vehicle, such as, for example, between 10 and 30 feet in length and between 10 and 30 feet in height, and in other embodiments, a length of less than 10 feet or greater than 30 feet, and/or a height of less than 10 feet or greater than 30 feet. Roof 18*m* can be constructed and/or installed as described in this disclosure. For example, roof 18*m* can be a flat roof, or a flat roof in combination with any other type of roof described in this disclosure, including a gable roof. In some embodiments, a majority (e.g., greater than 50%, such as 55%, 60%, 65%, 70%, 75%, or more) of roof 18*m* is substantially parallel to floor 14*m*. In some embodiments, less than a majority (e.g., 50%, 45%, 40%, 35%, or less) of roof 18*m* can be substantially parallel to floor 14*m*. In some embodiments, roof 18*m* comprises a pitch from zero to 12:12. In some embodiments, roof 18*m* can be substantially non-parallel to ground beneath floor 14*m*. In some embodiments, a majority (e.g., 51%, 60%, 70%, 80%, or more) of roof 18*m* occupies substantially the same plane (e.g., whether parallel or non-parallel to floor 14*m* and/or ground beneath floor 14*m*). As an example, roof 18*e* depicted in FIGS. 5A-5B, which is at least partially supported by supporting structures 20*e* and which comprises ¼ inch thermoplastic polyolefin (TPO) roofing, ⅝ inch oriented strand board (OSB), R-18 insulation, 8 inch cold-rolled purlin, a wide flange beam, and 1.5 inch R panel can be used with the present structures. As another example, roof 18*f* depicted in FIGS. 6A-6B, which is at least partially supported by supporting structures 20*f* and which comprises ¼ inch thermoplastic polyolefin (TPO) roofing, ⅝ inch oriented strand board (OSB), 8 inch cold-rolled purlin, a wide flange beam, and 1.5 inch R panel can be used with the present structures. As still another example, roof 18*g* depicted in FIGS. 7A-7D, which is at least partially supported by supporting structures 20*g* and which comprises ¼ inch thermoplastic polyolefin (TPO) roofing, ⅝ inch oriented strand board (OSB), R-18 insulation, 8 inch cold-rolled purlin, a joist, and 1.5 inch R panel can be used with the present structures. As a further example, roof 18*h* depicted in FIGS. 8A-8D, which is at least partially supported by supporting structures 20*h* and which comprises ¼ inch thermoplastic polyolefin (TPO) roofing, ⅝ inch oriented strand board (OSB), metal decking, R-18 insulation, a joist, and 1.5 inch R panel can be used with the present structures. The materials and dimensions to construct a roof of the present structures can be altered or supplemented to provide a roof that is suitable in a given environment (e.g., cold, hot, mild), a roof that is a suitable strength, a roof that is a suitable surface area, a roof that is a suitable pitch, and the like. Roof 18*m* can be supported by plurality of supporting structures, which can comprise any suitable material, such as steel. If roof 18*m* is substantially parallel to floor 14*m*, supporting structures can comprise substantially the same length. Roof 18*m* can be positioned non-parallel to ground beneath floor 14*m* at any desired angle to, for example, permit precipitation (e.g., rain, snow, and the like) to drain from roof 18*m*. In some embodiments, floor 14*m* is substantially parallel to ground beneath structure 10*m*; and, in other embodiments, floor 14*m* is non-parallel to ground beneath structure 10*m*, and can comprise a gradient (e.g., can extend at an angle with respect to ground beneath structure 10*m* and/or at an angle with respect to another portion of floor 14*m*). As with the pitch of roof 18*m*, a gradient of floor 14*m* (or a portion thereof) can be selected based on topography, enabling the present structures to be located on previously unsuitable topography.

Structure 10*m* (and, more specifically, first side 22*m*, second side 30*m*, front side 38*m*, and back side 46*m*) can comprise any suitable dimensions to accommodate a desired number of livestock. Furthermore, structure 10*m* can be modified and/or supplemented such that a length and/or a width of an existing structure can be extended to accommodate additional livestock. In the embodiment shown in FIGS. 14A-14B, front side 38*m* and back side 46*m* are 772 feet in length; however, in other embodiments front side 38*m* and/or back side 46*m* can comprise less than 772 feet (e.g., 700 feet, 600 feet, 500 feet, 400 feet, or less) or greater than 772 feet (e.g., 800 feet, 900 feet, 1,000 feet, 1,100 feet, 1,200 feet, 1,300 feet, 1,400 feet, 1,500 feet, 1,600 feet, 1,700 feet, 1,800 feet, 1,900 feet, 2,000 feet, or more). Similarly, first side 22*m* and second side 30*m* are 1,277 feet in length; however, in other embodiments first side 22*m* and/or second side 30*m* can comprise less than 1,277 feet (e.g., 1,200 feet, 1,100 feet, 1,000 feet, 900 feet, 800 feet, or less) or greater than 1,277 feet (e.g., 1,300 feet, 1,400 feet, 1,500 feet, 1,600 feet, 1,700 feet, 1,800 feet, 1,900 feet, 2,000 feet, or more). For example, structure 10*m* can be sized to accommodate between zero and 200 head of livestock, between 200 and 500 head of livestock, between 500 and 1,000 head of livestock, between 1,000 and 4,000 head of livestock, between 4,000 and 8,000 head of livestock, between 8,000 and 10,000 head of livestock, between 10,000 and 15,000 head of livestock, between 15,000 and 20,000 head of livestock, between 20,000 and 25,000 head of livestock, between 25,000 and 30,000 head of livestock, between 30,000 and 35,000 head of livestock, between 35,000 and 40,000 head of livestock, between 40,000 and 45,000 head of livestock, between 45,000 and 50,000 head of livestock, between 50,000 and 60,000 head of livestock, between 60,000 and 70,000 head of livestock, between 70,000 and 80,000 head of livestock, between 80,000 and 90,000 head of livestock, between 90,000 and 100,000 head of livestock or more.

Structure 10*m* can further comprise a plurality of fans positioned on first side 22*m* (e.g., coupled to a first side wall) such that, if the plurality of fans are activated, air is removed from structure 10*m* by the plurality of fans (e.g., by pulling air from within structure 10*m* toward a first side wall). Structure 10*m* can further comprise a plurality of fans positioned on second side 30*m* (e.g., coupled to a second side wall) such that, if the plurality of fans are activated, air is removed from structure 10*m* by the plurality of fans (e.g., by pulling air from within structure 10*k* toward a second side wall). For example, fans 62*c* depicted in FIG. 3A are examples of fans that can used in structure 10*m*. Structure 10*l* can be modified and/or supplemented to comprise any suitable number of fans.

Structure 10*m* additionally comprises opening 82*m* in roof 18*m*. Structure 10*l* can be modified and/or supplemented to comprise opening 82*m* in roof 18*m*. Opening 82*m* is configured to permit air to enter structure 10*m* through roof 18*m* (e.g., which air can eventually be removed from structure 10*m* by a plurality of fans). Opening 82*m* extends substantially parallel to first side 22*m* and second side 30*m* and can extend for at least a portion of the length of first side 22*m* and second side 30*m* (e.g., 1%, 5%, 10%, 15% 30%, 45%, 60%, 75%, 90%, the length of first side 22*m* and second side 30*m*, or more). In the embodiment shown, opening 82*m* comprises a width of between 20 and 40 feet; however, in other embodiments, opening 82*m* comprises a width of less than 20 feet or greater than 40 feet. Structure 10*m* can further comprise one or more fans positioned near opening 82*m* such that air from outside structure 10*m* is further encouraged to enter structure 10*m*. Structure 10*m* can also comprise a steeple (e.g., similar to steeple 86*a* depicted in FIG. 1H) coupled to roof 18*m* and configured to discourage fluid from entering structure 10*m* through opening 82*m* while permitting air to enter structure 10*m* through opening 82*m*. One or more partitions (e.g., such as partitions 90*a* depicted in FIG. 1H), such as curtains, louvers, and the like, can be coupled to a steeple to assist in discouraging fluid from entering structure 10*m* through opening 82*m*. Partitions can be rigid or flexible, and can be adjustable (manually or automatically).

Structure 10*m*, and more specifically milking parlor portion 74*m*, is configured to accommodate at least one milking parlor, such as at least one herringbone parlors, at least one parallel parlor, at least one rotary parlor, and the like. Milking parlor portion 74*m* and/or first side 22*m*, second side 30*m*, front side 38*m*, and/or back side 46*m* can be sized, modified, and/or supplemented to accommodate any number of milking parlors. One or more milking parlors can be positioned in structure 10*m* such that at least a portion of the one or more milking parlors is beneath at least a portion of opening 82*m* to permit air entering structure 10*m* through opening 82*m* to engage any livestock in the one or more milking parlors. Structure 10*l* can be modified and/or supplemented such that milking parlor portion 74*m* is positioned between rows of housing pens 63*m*, or such that milking parlor portion 74*m* is not positioned between rows of housing pens 63*m* (e.g., extending from a side of structure 10*m*). Floor 14*m* can have (or can be modified or supplemented to have) a gradient that extends into milking parlor portion 74*m* toward the milking parlor(s). Floor 14*m* can additionally comprise a gradient in other parts of structure 10*m*. Floor 14*m* can comprise any desired gradient, which can depend, for example, on type of livestock bedding, the waste management system(s), the gradient of the ground beneath floor 14*m*, and other factors. For example, a structure that has compost bedding may have a floor at least a portion of which is a lesser gradient, and a structure that has sand bedding may have a floor at least a portion of which is a greater gradient. As another example, a structure with a flush waste management system may have a floor at least a portion of which is a greater gradient, and a structure with a dry scrape, mechanic scrape, and/or auto scrape waste management system may have a floor at least a portion of which is a lesser gradient. For example, floor 14*m* can comprise a gradient of 2.5 to 3 degrees (e.g., is angled at 2.5 to 3 degrees with respect to ground beneath floor 14*m*); however, in other embodiments, floor 14*m* can comprise any suitable gradient that is less than 2.5 degrees (e.g., 2 degrees, 1.5 degrees, 1 degrees, 0.5 degrees, or less) or greater than 3 degrees (e.g., 3.5 degrees, 4 degrees, 4.5 degrees, 5 degrees, or more). In some embodiments, first portions of floor 14*k* can comprise a first gradient, and second portions of floor 14*m* (e.g., beneath first portions of floor 14*k*) can comprise a second gradient.

Structure 10*m* can further comprise (and, more specifically, can be modified or supplemented to comprise) a basement positioned beneath floor 14*m* of structure 10*m* and configured to be accessible by at least one vehicle (e.g., one, two, three, four, five, six, or more vehicles) such that milk from livestock in one or more milking parlors can pass to the at least one vehicle (e.g., directly or indirectly from one or more milk storage tanks) if livestock are milked in the one or more milking parlors. Distinguishable from a milking parlor basement immediately below a milking parlor, but above a floor of a structure, the basements of this disclosure can be positioned beneath floor 14*m* of structure 10*m*. For example, a basement can be configured to accommodate at least a portion of at least one vehicle (e.g., part or all of at least one vehicle can enter the basement such that milk can pass to the vehicle). For example, milk can pass from one or more milking parlors to the at least one vehicle without passing into a milk storage tank (e.g., after washing, cooling, purification, and/or filtration). At least a portion of one or more milking parlors can be positioned above the basement such that gravity can assist in enabling milk to pass from the one or more milking parlors into the basement and into one or more milk storage tanks and/or at least one vehicle. One or more pumps can also assist in enabling milk to pass from the one or more milking parlors into the basement and into one or more milk storage tanks and/or at least one vehicle. Milk wash systems, cooling systems, purification systems, filtration systems, vacuum systems, and related processes and systems can also be at least partially located in the basement.

Structure 10*m* can further comprise (and, more specifically, can be modified or supplemented to comprise) a commodity basement, similar to commodity basement 94*d* depicted in FIGS. 4A-4D. The commodity basement can be positioned beneath floor 14*m* of structure 10*m*. Structure 10*m* can be configured to accommodate at least a portion of at least one vehicle such that, if a vehicle passes into structure 10*m* (e.g., on floor 14*m* over the commodity basement), the vehicle can dispose commodity in the commodity basement from floor 14*m* of structure 10*m* (e.g., commodity can be disposed in commodity cells similar to commodity cells 102*d* depicted in FIGS. 4A-4D). Similarly to that depicted in FIGS. 4A-4D, floor 14*m* can comprise a gradient to enable the at least one vehicle to be positioned over the commodity basement.

The present disclosure further includes methods, such as methods of passing milk from a milking parlor (e.g., first milking parlor 66*a* and/or second milking parlor 70*a*) to a vehicle. Such methods can comprise milking livestock (e.g., cows) in a milking parlor (e.g., first milking parlor 66*a* and/or second milking parlor 70*a*) disposed in a structure (e.g., structure 10*a*); cooling milk from the livestock (e.g., to 30 to 38 degrees Celsius); positioning at least a portion of a vehicle in a basement (e.g., basement 78*a*) beneath a floor (e.g., floor 14*a*) of the structure; and at least one of: permitting gravity to assist in enabling milk to be passed from the milking parlor to the vehicle or a milk storage tank; and pumping milk from the milking parlor to the vehicle or a milk storage tank. The methods can further comprise removing air from the structure with a plurality of fans (e.g., plurality of fans 62*c*). Such methods can further comprise permitting air to enter the structure through an opening (e.g., opening 82*a*) in a roof (e.g., roof 18*a*) of the structure. In some embodiments, the milking parlor is positioned such that the method further comprises permitting air entering the structure through the opening to engage livestock in the milking parlor. The methods can further comprise positioning a vehicle at least partially above a commodity basement (e.g., commodity basement 94*d*) beneath the floor of the structure; and disposing commodity in the commodity basement. In some embodiments, the methods comprise positioning livestock in a structure in a milking parlor or in holding pens near a milking parlor within the structure; and permitting air entering the structure through an opening in a roof to engage livestock in the milking parlor or in the holding pens.

Some embodiments of the present methods include modifying or supplementing an existing structure, where an existing structure comprises a floor (e.g., floor 14k) and a milking parlor portion (e.g., milking parlor portion 74k) configured to accommodate a milking parlor, and where the structure is configured to accommodate livestock, the method comprising: installing roofing material such that at least a portion of the roof (e.g., roof 18k) of the structure is a flat roof. In some embodiments, prior to installing roofing material such that at least a portion of the roof of the structure is a flat roof, the method comprises: installing a first side comprising a first sidewall configured to support a portion of the roof; and installing a second side comprising a second sidewall configured to support a portion of the roof. In some embodiments, the methods comprise installing a plurality of fans positioned on the first side of the structure such that, if the plurality of fans are activated, air is removed from the structure by the plurality of fans; and installing an opening in the roof configured such that air can enter the structure through the roof and be removed from the structure by the plurality of fans. In some embodiments, the methods further comprise positioning at least one milking parlor within the structure such that at least a portion of the at least one milking parlor is beneath at least a portion of the opening to permit air entering the structure through the opening to engage any livestock in the at least one milking parlor. In some embodiments, the methods further comprise installing a steeple such that the steeple is coupled to the roof and configured to discourage fluid from entering the structure through the opening while permitting air to enter the structure through the opening. In some embodiments, the opening is installed substantially parallel to the first side and the second side of the structure, and the opening comprises a width of 20 feet to 40 feet. In some embodiments, the at least one milking parlor is positioned between the first side and the second side of the structure. In some embodiments, the methods further comprise installing a basement beneath the floor of the structure and configured to be accessible by at least one vehicle such that milk from livestock in the at least one milking parlor can pass to the at least one vehicle if livestock are milked in the at least one milking parlor. In some embodiments, the basement is configured to accommodate at least a portion of at least one vehicle. In some embodiments, the methods further comprise installing a commodity basement beneath the floor of the structure, where the structure is configured to accommodate at least a portion of at least one vehicle such that, if at least a portion of a vehicle passes into the structure, the vehicle can dispose commodity in the commodity basement from the floor of the structure. In some embodiments, the methods further comprise modifying or supplementing the structure such that the structure is configured to accommodate at least 200 head of livestock, at least 4,000 head of livestock, at least 8,000 head of livestock, at least 10,000, at least 15,000 head of livestock, at least 20,000 head of livestock, at least 25,000 head of livestock, at least 30,000 head of livestock, between 30,000 and 40,000 head of livestock, or more. In some embodiments, at least a portion of the floor is a natural surface; and in some embodiments, at least a portion of the floor comprises a man-made surface.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present structures and methods are not intended to be limited to the particular forms disclosed. Rather, they include all modifications and alternatives falling within the scope of the claims, and embodiments other than the ones shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An agricultural structure defining an enclosure configured to house livestock and/or agricultural commodity, the agricultural structure comprising:
   a floor comprising a non-zero gradient that is less than or equal to 2.5 degrees relative to horizontal, wherein the gradient of the floor is configured to be substantially equal to a gradient of underlying ground;
   a substantially flat roof, wherein a majority of the substantially flat roof is substantially parallel to the floor;
   a first side comprising a first sidewall configured to support a first portion of the substantially flat roof, the first sidewall extending between a front wall and a back wall of the structure; and
   a second side comprising a second sidewall configured to support a second portion of the substantially flat roof, the second sidewall extending between the front and back walls of the structure;
   one or more supporting structures configured to support the roof, the one or more supporting structures being disposed along the floor between:
   the first sidewall and the second sidewall; and
   the front and back walls;
   wherein the floor is configured to accommodate a plurality of housing pens or a means for housing livestock;
   wherein the substantially flat roof is sloped toward the front wall to cause precipitation to drain from the substantially flat roof of the agricultural structure; and
   wherein the floor is configured such that a bottom of the back wall is vertically higher than a bottom of the front wall, the respective bottoms of the front and back walls being level with the underlying ground.

2. The agricultural structure of claim 1, wherein a majority of the substantially flat roof occupies substantially the same plane.

3. The agricultural structure of claim 1, comprising the plurality of housing pens beneath the substantially flat roof, each of which is configured to accommodate one or more head of livestock.

4. The agricultural structure of claim 1, wherein a length of the first sidewall is greater than or equal to 360 feet.

5. The agricultural structure of claim 1, wherein:
the floor, the substantially flat roof, the first sidewall, and the second sidewall cooperate to define the enclosure; and
the slope of the floor is between about 0.5 and about 2.5 degrees.

6. The agricultural structure of claim 1, comprising an air ventilation system.

7. The agricultural structure of claim 6, wherein the air ventilation system includes a plurality of fans positioned such that, if the plurality of fans are activated, air is removed from the structure by the plurality of fans.

8. The agricultural structure of claim 7, wherein the roof comprises an opening configured such that air can enter or exit the structure through the roof and be removed from the structure by the plurality of fans.

9. The agricultural structure of claim 8, comprising a first milking parlor disposed within the structure and positioned such that at least a portion of the first milking parlor is beneath at least a portion of the opening to permit air entering the structure through the opening to engage one or more livestock in the first milking parlor.

10. The structure of claim 9, comprising a basement positioned beneath the floor of the structure and configured to be accessible by at least one vehicle such that milk from livestock in the first milking parlor can pass to the at least one vehicle if livestock are milked in the first milking parlor.

11. The agricultural structure of claim 1, wherein the slope of the floor is between about 0.5 and about 2.5 degrees and a length of the first sidewall is greater than or equal to 600 feet.

12. The agricultural structure of claim 1, wherein an entirety of the roof is substantially parallel to the floor.

13. The agricultural structure of claim 1, wherein the underlying ground is natural ground.

14. The agricultural structure of claim 1, wherein a pitch of the majority of the substantially flat roof is within about 0.25 degrees of the non-zero gradient.

15. A structure comprising:
a floor comprising a non-zero gradient that is less than or equal to about 2.5 degrees relative to horizontal, wherein the gradient of the floor is configured to be equal to a gradient of underlying ground;
a roof, wherein a majority of the roof includes a pitch that is substantially parallel to the floor;
a first side comprising a first sidewall configured to support a first portion of the roof, the first sidewall extending between a front wall and a back wall of the structure; and
a second side comprising a second sidewall configured to support a second portion of the roof, the second sidewall extending between the front and back walls of the structure;
wherein the floor is configured to accommodate a plurality of housing pens;
wherein the roof is sloped toward one of the front and back walls to cause precipitation to drain from the roof; and
wherein the floor is configured such that a bottom of the front or back wall towards which the roof is sloped is at an elevation lower than that of a bottom of the other of the front and back walls, the respective bottoms of the front and back walls being level with the underlying ground.

16. The structure of claim 15, comprising:
one or more supporting structures configured to support the roof, the one or more supporting structures being disposed along the floor between:
the first sidewall and the second sidewall; and
the front and back walls.

17. The structure of claim 15, comprising the plurality of housing pens beneath the roof, each of which is configured to accommodate one or more head of livestock.

18. An agricultural structure comprising:
a floor comprising a non-zero gradient that is less than or equal to about 2.5 degrees relative to horizontal, wherein the gradient of the floor is configured to be substantially equal to a gradient of underlying ground;
a roof that is substantially flat, at least a majority of the roof inclined at a pitch;
a first wall;
a second wall opposite the first wall;
a third wall configured to support a first portion of the roof, the third wall extending between the first wall and the second wall; and
a fourth wall configured to support a second portion of the roof, the fourth wall extending between the first wall and the second wall;
wherein the floor is configured to accommodate a plurality of housing pens;
wherein the pitch of the roof and the gradient of the underlying ground each include non-zero angles that are within 1 degree of the non-zero gradient. wherein the roof is sloped toward the second wall to cause precipitation to drain from the roof; and
wherein a first portion of the floor adjacent the first wall is disposed at a first elevation, a second portion of the floor adjacent the second wall is disposed at a second elevation that is vertically lower than the first elevation, and a bottom of the first wall is disposed at a third elevation that is equal to or lower than the first elevation.

19. The agricultural structure of claim 18, wherein a bottom of the second wall is disposed at the second elevation.

20. The agricultural structure of claim 18, wherein the pitch of the roof, the gradient of the underlying ground, and the non-zero gradient of the floor are parallel to one another.

* * * * *